(12) United States Patent
Nakanishi et al.

(10) Patent No.: US 6,185,064 B1
(45) Date of Patent: Feb. 6, 2001

(54) TAPE PLAYER HAVING A CAM AND A MODE DETECTING GEAR

(75) Inventors: Yasuyuki Nakanishi; Takao Morimoto; Kenichirou Minemoto; Takashi Matsuda, all of Hyogo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/291,284

(22) Filed: Apr. 14, 1999

Related U.S. Application Data

(62) Division of application No. 08/808,313, filed on Feb. 28, 1997, which is a continuation of application No. 08/313,119, filed as application No. PCT/JP94/00312 on Oct. 13, 1994, now Pat. No. 5,986,849.

(30) Foreign Application Priority Data

Feb. 26, 1993 (JP) .................................................. 5-037874

(51) Int. Cl.$^7$ ................................................. G11B 5/008
(52) U.S. Cl. .......................................................... 360/96.3
(58) Field of Search ............................... 360/96.3, 99.03, 360/99.07, 96.1

(56) References Cited

U.S. PATENT DOCUMENTS

| 4,043,149 | 8/1977 | Tuninetti ................................ 464/46 |
| 4,069,724 | 1/1978 | Sobotta .................................. 74/569 |
| 4,272,792 | 6/1981 | Nakamichi et al. ................... 360/69 |
| 4,599,662 | 7/1986 | Iwasaki ............................... 360/96.4 |
| 4,639,800 | 1/1987 | Tanaka et al. ........................ 360/90 |
| 4,652,947 | 3/1987 | Oka et al. .............................. 360/85 |
| 4,656,552 | 4/1987 | Takahashi et al. ................... 360/137 |
| 4,809,100 | * 2/1989 | Tanaka et al. ....................... 360/96.1 |
| 4,873,597 | 10/1989 | Hatanaka .............................. 360/105 |
| 4,896,234 | 1/1990 | Watanabe et al. .................... 360/105 |
| 4,907,110 | 3/1990 | Ando ...................................... 360/85 |
| 4,956,731 | 9/1990 | Yoshimura ........................... 242/333 |
| 4,964,001 | 10/1990 | Hirayama et al. ..................... 360/94 |
| 5,062,015 | 10/1991 | Maeng ................................. 360/96.5 |
| 5,063,455 | 11/1991 | Yoshimura ........................... 360/965 |
| 5,105,320 | * 4/1992 | Hayashi ............................... 360/105 |
| 5,179,871 | * 1/1993 | Orimoto et al. ..................... 360/96.3 |
| 5,413,483 | 5/1995 | Choi ...................................... 434/11 |

FOREIGN PATENT DOCUMENTS

| 2601221B2 | 8/1976 | (DE) . |
| 2540534A1 | 3/1977 | (DE) . |
| 3104147 | 2/1982 | (DE) . |
| 3908469 (A1) | 12/1989 | (DE) . |
| 4220702 | 1/1993 | (DE) . |
| 549355 (A2) | 6/1993 | (EP) . |
| 2679060 | 1/1993 | (FR) . |
| 62-76047 | 4/1987 | (JP) . |
| 235650 | 2/1990 | (JP) . |
| 2113826 | 9/1990 | (JP) . |
| 410136 | 2/1992 | (JP) . |

\* cited by examiner

*Primary Examiner*—David Davis

(57) ABSTRACT

A tape player is provided to simplify a mechanical part, eliminate parts, and provide efficient assembly of the mechanical part and a more compact apparatus. The tape player includes pins respectively moving in four different grooves provided in one disk-like cam, and a lever in conjunction with the movement of the pins to use movement of the lever so as to perform a cassette tape carry in/out operation, a head base moving operation, a playback running direction switching operation, and a selective operation to transfer driving force to a reel rest during fast forward.

6 Claims, 52 Drawing Sheets

Fig. 60 (PRIOR ART)

| | CAM ANGLE OF ROTATION | | | | | |
|---|---|---|---|---|---|---|
| | (PLAY) 0° | 45° | 105° | (EJECT) 180° | 255° | 315° |
| CASSETTE HORIZONTAL CAM | | | | | | |
| CASSETTE VERTICAL CAM | | | | | | |
| HEAD BASE BACKWARD CAM | | | | | | |

TAPE PLAYER HAVING A CAM AND A MODE DETECTING GEAR

This application is a divisional of co-pending application Ser. No. 08/808,313, filed on Feb. 28, 1997, which is a Rule 62 continuation of application Ser. No. 08/313,119, filed on Oct. 13, 1994 now U.S. Pat. No. 5,986,849, which is the national phase of PCT International Application No. PCT/JP94/00312 filed on Feb. 25, 1994 under 35 U.S.C. § 371. The entire contents of each of the above-identified applications are hereby incorporated by reference.

TECHNICAL FIELD

The present invention relates to a tape player, and more particularly to improvement of an auto-reverse tape player mounted on a vehicle.

BACKGROUND OF THE INVENTION

In recent years, as a multi-function tape player has been more developed, more electronic devices have been employed in an apparatus. FIG. 59 is a sectional view of a cam device for mechanically actuating a cassette tape in a conventional tape player apparatus disclosed in Japanese Patent Publication (Kokoku) No. 4-10136. In the drawing, reference numeral 301 denotes an operation mode switching cam, 302 is a horizontal head base backward cam for the cassette tape, and 303 is a cassette vertical cam. As shown in FIG. 60, these cams are rotated to move links 304, 305, and 306 respectively having pins engaging cam grooves in the respective cams so as to actuate mechanisms for a carry in/out operation of the cassette, movement of the head, switch-over of a run direction during playing back, and so forth.

Though many electronic devices have been increasingly employed and multi-functional operations have been required, complicated mechanical links as shown in the conventional embodiment are in actuality essential for drive (such as fast forward, or playback) of the tape. Consequently, as more electronic devices have been employed in the apparatus, the need to simplify these mechanical portions, reduce the number of parts, and so forth has grown. Further, there are caused important problems relating to fabrication of the apparatus, in that the mechanical portions should be assembled at higher efficiency, the apparatus should be made more compact, and so forth.

SUMMARY OF THE INVENTION

The present invention is made to overcome the problems as described above, and it is an object of the present invention to provide a tape player which can simplify the mechanical portions, reduce the number of parts, and can solve the problems in the fabrication of the apparatus, about the higher efficient assembly of the apparatus, a more compact apparatus, and so forth.

A tape player according to the present invention is provided to operate pins engaging four different grooves provided in one disk-like cam so as to move in the respective grooves according to rotation of the disk-like cam, a member having a lever working in conjunction with the movement of the pins, for performing a carry in/out operation of a cassette tape engaging the lever by the operation of the lever, a member for a moving operation of a head base, a member for a playback running direction switching operation, and a member for selective operation to transfer driving force to a cassette tape driving mechanism during fast forward.

Thereby, the one disk-like cam enables the cassette tape carry in/out operation, the head base moving operation, the playback running direction switching operation, and the selective operation to transfer the driving force to the cassette tape driving mechanism during fast forward.

Alternatively, in a tape player according to the present invention, a first groove for a cassette carry in/out operation, and a second groove for a playback running direction switching operation are provided in a first surface of a disk-like cam. Further, a third groove for a head base moving operation, and a fourth groove for a selective operation to transfer driving force to a cassette tape driving mechanism during fast forward are provided in a second surface.

Thereby, the grooves in both sides of the one disk-like cam enable the cassette tape carry in/out operation, the head base moving operation, the playback running direction switching operation, and the selective operation to transfer the driving force to the cassette tape driving mechanism during fast forward.

Alternatively, in a tape player according to the present invention, in four operations including a cassette tape carry in/out operation, a head base moving operation, a playback running direction switching operation, and a selective operation to transfer driving force to a cassette tape driving mechanism during fast forward, the operations are performed according to rotation of a disk-like cam from a starting point in the following order: a cassette tape take-in and cassette tape mounted to tape driving mechanism mode; a tape L direction fast forward mode; a tape R direction playback mode; a tape L direction playback mode; and a tape R direction fast forward mode.

Thereby, only one disk-like cam enables the cassette take-in and cassette tape mounted to tape driving mechanism mode operation, the tape L direction fast forward operation, the tape R direction playback operation, the tape L direction playback operation, and the tape R direction fast forward operation.

Alternatively, in a tape player according to the present invention, there is a difference in groove width between a first groove and a second groove provided in a first surface of a disk-like cam, or between a third groove and a fourth groove provided in a second surface.

Thereby, pins can be prevented from erroneously engaging wrong grooves since the grooves provided in the one disk-like cam have different groove widths.

Alternatively, in a tape player according to the present invention, a rib is provided for a groove other than first to fourth grooves provided in a disk-like cam.

Thereby, the grooves in the one disk-like cam can clearly be discriminated.

Alternatively, in a tape player according to the present invention, when a disk-like cam is rotated by a predetermined angle, in four operations including a cassette tape carry in/out operation, a head base moving operation, a playback running direction switching operation, and a selective operation to transfer driving force to a cassette tape driving mechanism during fast forward, no force is applied to each pin from members for performing at least three of the operations.

Thereby, at a predetermined position of a groove, no force is applied to the disk-like cam from the members for performing at least three of the four operations, resulting in easier assembly.

Alternatively, in a tape player according to the present invention, an overrun portion is provided at ends of first to fourth grooves in a disk-like cam so as to urge an elastic body used for a member for each operation after the operation.

Thereby, the elastic body used for the member for each operation at the ends of the first to fourth grooves in the disk-like cam can be urged by the overrun portion after the operation.

Alternatively, a tape player according to the present invention includes a disk-like cam, a mode detecting switch to detect each mode of the disk-like cam, a mode detecting gear provided for the mode detecting switch to have the same number of teeth as that of teeth of the disk-like cam, and a transfer gear in which two gears having different diameters are coaxially disposed to engage both the disk-like cam and the mode detecting gear. Further, the two gears having the different diameters in the transfer gear have the same number of teeth, and crests of both the teeth have the same angle.

Thereby, a more compact structure can be provided by coaxially disposing the two gears having the different diameters in the transfer gear engaging both the one disk-like cam and the mode detecting gear, and smooth operation can be expected even if the disk-like cam or the mode detecting gear erroneously engages a wrong gear because the gears are identical in the number of teeth and in the angle of the crest.

Alternatively, a tape player according to the present invention includes a first slide plate moving according to movement of a pin engaging a first groove provided in a disk-like cam for a cassette carry in/out operation, a second slide plate connected to the first slide plate through an elastic body to move in conjunction with movement of the first slide plate in the same direction as that of the movement so as to move a slider for holding a cassette tape in a direction opposed to the above direction, and a detecting lever engaging the slide plate by movement of the slide plate during cassette tape carry in operation to press a switch for actuating a motor to carry in the cassette tape. Further, when the slide plate is moved to a predetermined position, engagement between the detecting lever and the second slide plate is released, and repulsion of the switch returns the detecting lever to an original position.

Thereby, a more compact apparatus can be provided by directly relating the movement of the slide plate to pressing of the switch, and information of the switch can be used even in other modes by returning the detecting lever by the repulsion of the switch at the predetermined position of the slide plate.

Alternatively, in a tape player according to the present invention, when a cassette tape is mounted on a reel rest, a side surface of the cassette tape engages a detecting lever to press a switch.

Thereby, a type of the cassette tape can be discriminated by using the detecting lever.

Alternatively, a tape player according to the present invention includes a first slide plate having a pin engaging a first groove provided in a disk-like cam for a cassette tape carry in/out operation, and a second slide plate connected to the first slide plate through an elastic body to move in conjunction with movement of the first slide plate in the same direction as that of the movement so as to move a slider for holding a cassette tape in a direction opposed to the above direction. Since a moving distance of the second slide plate is shorter than that of the first slide plate, the second slide plate is urged by the elastic body at movement terminal end.

Thereby, a more compact apparatus can be provided by using one disk-like cam, and a stable operation can be realized by applying urging force between the mutual slide plates at the movement terminal end of the slide plate.

Alternatively, a tape player according to the present invention includes a slide plate moving according to movement of a first pin engaging a first groove provided in a disk-like cam for a cassette tape carry in/out operation so as to move a slider for holding a cassette tape, a holder arm movably supporting the slider, and vertically moving the cassette tape in a holder by engaging a second pin with a guide hole provided in the slide plate so as to release the cassette tape from a reel rest or mount the cassette tape on the reel rest, and an elastic body whose annular portion is disposed on a convex portion extending from the slide plate, for engaging a first cut-raised portion provided for the slide plate such that one end extending from the annular portion is disposed on extension of the guide hole, and for engaging a second cut-raised portion such that the other end applies elastic force to the one end in a direction of the first cut-raised portion. When the slider is moved, the second pin engages the one end of the elastic body disposed on extension of the guide hole.

Thereby, a more compact apparatus can be provided by using the one disk-like cam, and elastic force can be applied to a part of an engaging portion between the slide plate and the holder arm.

Alternatively, a tape player according to the present invention includes a reel pedestal rotated by transferring driving force, a friction member disposed on the reel pedestal, a slip gear contacting the friction member to transfer driving force to the reel pedestal through the friction member, an elastic body urging the slip gear in a direction to press the friction member, and a stopper adjustable pressing force of the elastic body on the friction member. Further, a mark indicating pressing force is put on the stopper.

Thereby, operability can be improved by marking the stopper for assembly of the reel rest.

Alternatively, a tape player according to the present invention includes a reel pedestal rotated by transferring driving force, a friction member disposed on the reel pedestal, and a slip gear contacting the friction member to transfer driving force to the reel pedestal through the friction member. Further, a taper portion is provided for the slip gear at a portion contacting the reel pedestal, and lubricant is applied to the taper portion.

Thereby, the lubricant can be applied after assembling the reel pedestal, the friction member, and the slip gear, and operability can be improved.

Alternatively, in a tape player according to the present invention, a reel rest, a mode detecting switch, and a circuit to detect signals from the reel rest and the mode detecting switch are disposed on one base.

Thereby, a more compact apparatus can be provided, and operability can be improved by disposing the reel rest, the mode detecting switch, and the circuit to detect the signals from the reel rest and the mode detecting switch on the one base.

Alternatively, in a tape player according to the present invention, a printed-like wired circuit is mounted on a board to provide a circuit to detect a signal, and when the board is mounted on a base, the printed-like wired circuit is removed from a periphery of a board mounting portion provided for the base.

Thereby, operability and reliability of an apparatus can be improved by removing the printed-like wired circuit from the periphery of the board mounting portion.

Alternatively, a tape player according to the present invention includes a reel base on which reel rests are disposed, and a main base on which the reel base is mounted. Further, hole portions are provided in the main base to pass a cassette tape rewind portion of the reel rest positioned between the reel base and the main base therethrough, and hollow portions are provided at a periphery of the hole portion in the main base to protect gear portions for driving the reel rest.

Thereby, a more compact apparatus can be provided, and entrance of dust or the like into the reel rest can be further reduced by providing the hollow portion for the main base to protect the gear portion of the reel rest.

Alternatively, a tape player according to the present invention includes a reel base having a printed-like wired circuit to transfer a signal from a reel rest or a mode detecting switch, a main base on which the reel base is mounted, and a belt disposed on a reel base mounting surface of the main base to transfer driving force to flywheels. Further, a guide portion is provided for a part of the reel base so as not to contact a part of the printed-like wired circuit derived from the reel base in a direction of the main base with the belt.

Thereby, reliability of an apparatus can be improved by providing the guide portion so as not to contact the printed-like wired circuit derived from the reel base to the main base with the belt for transferring the driving force to the flywheel.

Alternatively, in a tape player according to the present invention, a switch is disposed on a guide portion to discriminate a cassette tape.

Thereby, a space can be more reduced, and a more compact apparatus can be provided by disposing the switch on the guide portion.

Alternatively, a tape player according to the present invention includes a head base on which a head is mounted for recording and playback of a cassette tape, an elastic body disposed on the head base, and a lever having one end engaging a groove provided in a disk-like cam for moving the head base, and the other end engaging the head base directly or through the elastic body. When the cassette tape is carried in or carried out, the other end of the lever directly engages and presses the head base to urge the head base in a direction to move the head apart from the mounted cassette tape. When the tape is played back, the other end of the lever urges the head base through the elastic body in a direction to press onto the mounted cassette tape.

Thereby, reliability of an apparatus can be improved by driving the head base through the elastic body, and continuously urging the head base by elastic force.

Alternatively, in a tape player according to the present invention, when a cassette tape is carried in or carried out, the other end of a lever directly engages and presses a head base, and an elastic body concurrently engages the other end of the lever to press in a direction opposed to the pressing direction.

Thereby, when the cassette tape is carried in or carried out, the head base can be pressed by the other end of the lever directly engaging the head base, and the elastic body can concurrently be pressed in the direction opposed to the pressing direction by engaging the other end of the lever.

Alternatively, in a tape player according to the present invention, in four operations including a cassette tape carry in/out operation, a head base moving operation, a playback running direction switching operation, and a selective operation to transfer driving force to a cassette tape driving mechanism during fast forward, the operations are performed according to rotation of a disk-like cam from a starting point in the following order: a cassette tape take-in and cassette tape mounted to cassette tape driving mechanism mode; a tape L direction fast forward mode; a tape R direction playback mode; a tape L direction playback mode; and a tape R direction fast forward mode. Further, a distance between a head and a tape in the tape L direction fast forward mode is longer than that between the head and the tape in the R direction fast forward mode.

Thereby, it is possible to avoid collision of the cassette tape with the head generated during loading, and improve reliability of an apparatus by providing a longer distance between the head and the tape in the tape L direction fast forward mode than the distance between the head and the tape in the R direction fast forward mode.

Alternatively, in a tape player according to the present invention, a thickness removed portion is provided for a lever having one end engaging a groove provided in a disk-like cam for a selective operation to transfer driving force to a cassette tape driving mechanism for tape fast forward, and the other end including a gear idler which engages a flywheel.

Thereby, the lever can be protected from forced engagement between the flywheel and the gear idler, and reliability of an apparatus can be improved by providing the thickness removed portion for the lever including the one end engaging the groove in the disk-like cam and the other end including the gear idler engages the flywheel.

Alternatively, a tape player according to the present invention includes a cassette holder for holding a cassette tape, and a holder arm positioned to be coplanar with the cassette holder when a cassette is inserted into the cassette holder, for providing a predetermined angle at a connecting portion of the holder arm and the cassette holder when the cassette tape is moved to a position to be mounted on a cassette tape driving mechanism. Further, an elastic member urges in a direction in which the holder arm and the cassette holder are coplanar with each other.

Thereby, the cassette tape can be prevented from being removed before mounting the cassette tape onto a cassette tape driving apparatus, and reliability of an apparatus can be improved by the elastic member urging in the direction in which the holder arm and the cassette holder are coplanar with each other.

BRIEF DESCRIPTION OF THE DRAWINGS

FIG. 60 is an explanatory view for illustrating operations of the cam devices in the conventional tape player.

DETAILED DESCRIPTION OF THE PREFERRED EMBODIMENTS

Figure 1:
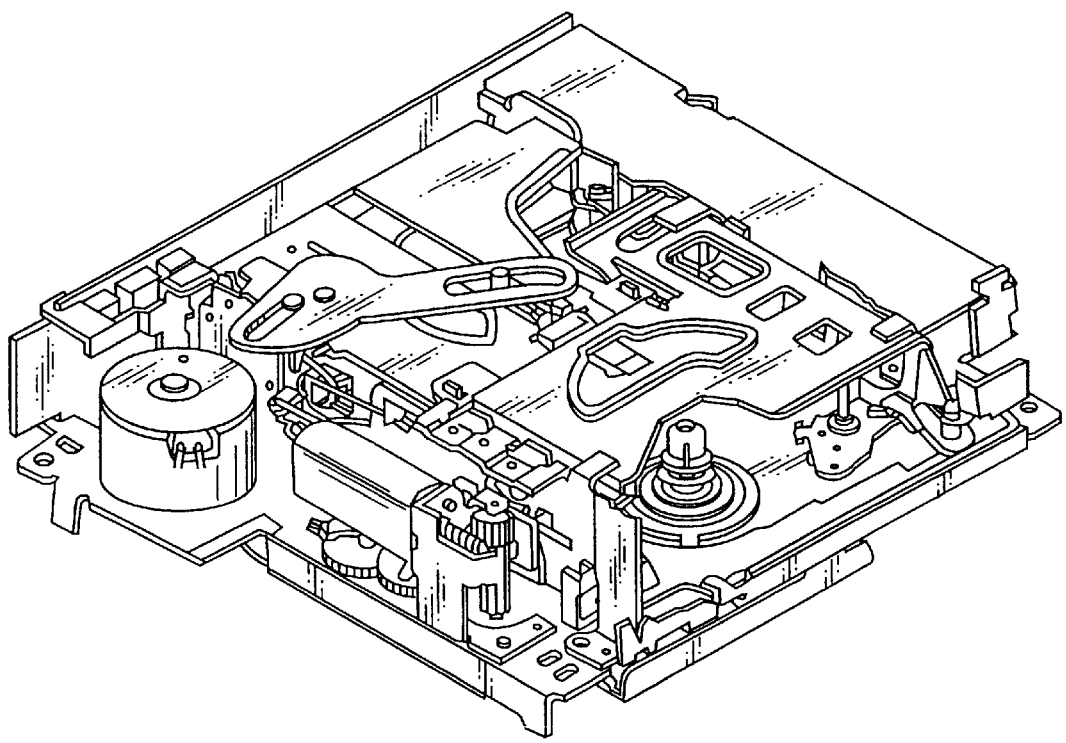
FIG. 1 is a perspective view showing an overall construction of one embodiment according to the present invention.

A description will now be given of preferred embodiments of a tape player according to the present invention with reference to the drawings. FIG. 1 is a view showing an overall construction of one embodiment of the tape player according to the present invention. In view of mechanism, the tape player can be divided into six major sections: a cassette carry in/out mechanism, a playback running direction switching mechanism, a head driving mechanism, reel rests and reel rests peripheral mechanism including a cam gear for control of mechanical operation, a reel rest driving force transmission mechanism, and a power motor peripheral mechanism. Descriptions will be sequentially given of structures of the respective mechanisms.

Cassette Carry In/Out Mechanism

Figure 2:
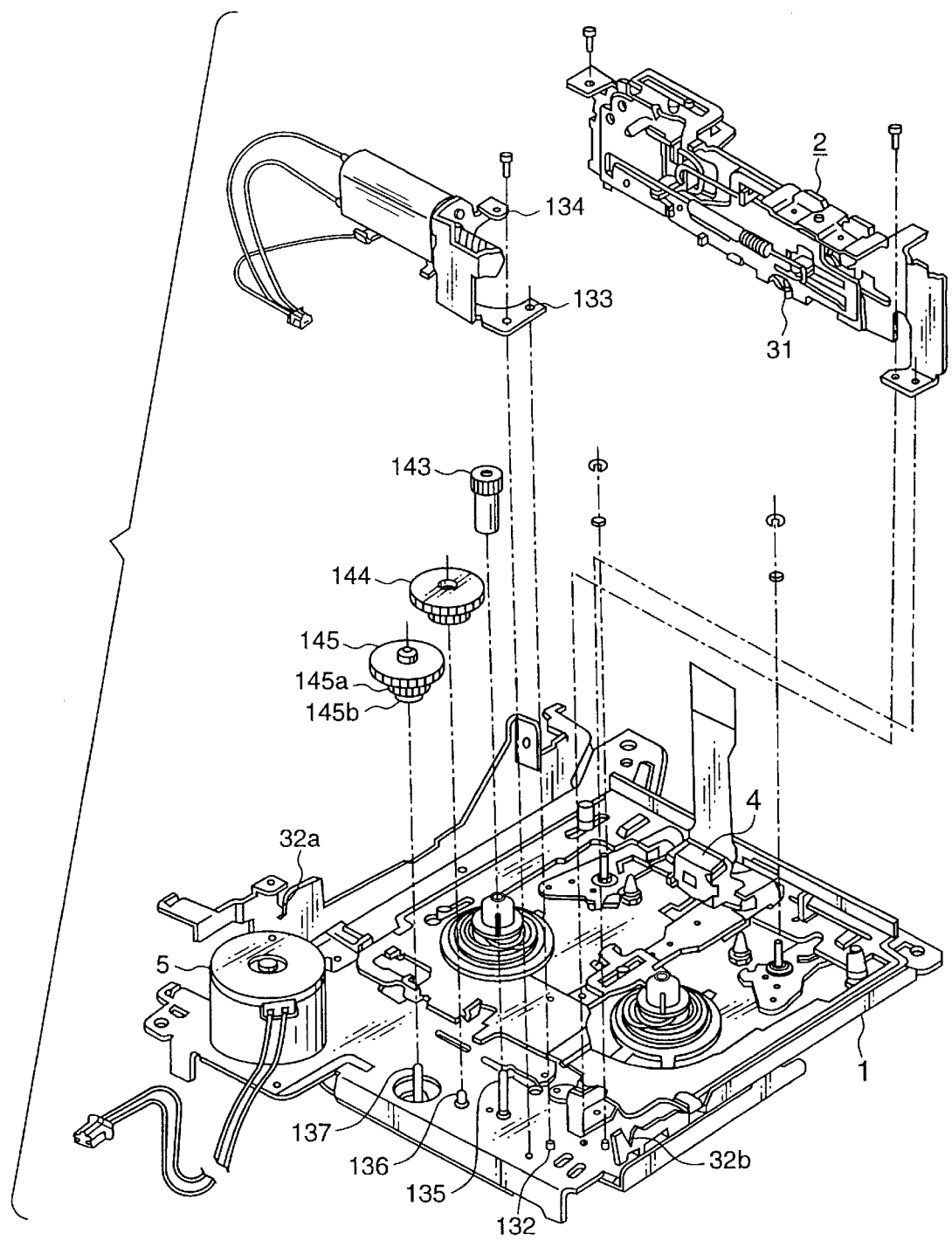
FIG. 2 is an assembling diagram of the embodiment according to the present invention.
Figure 3:
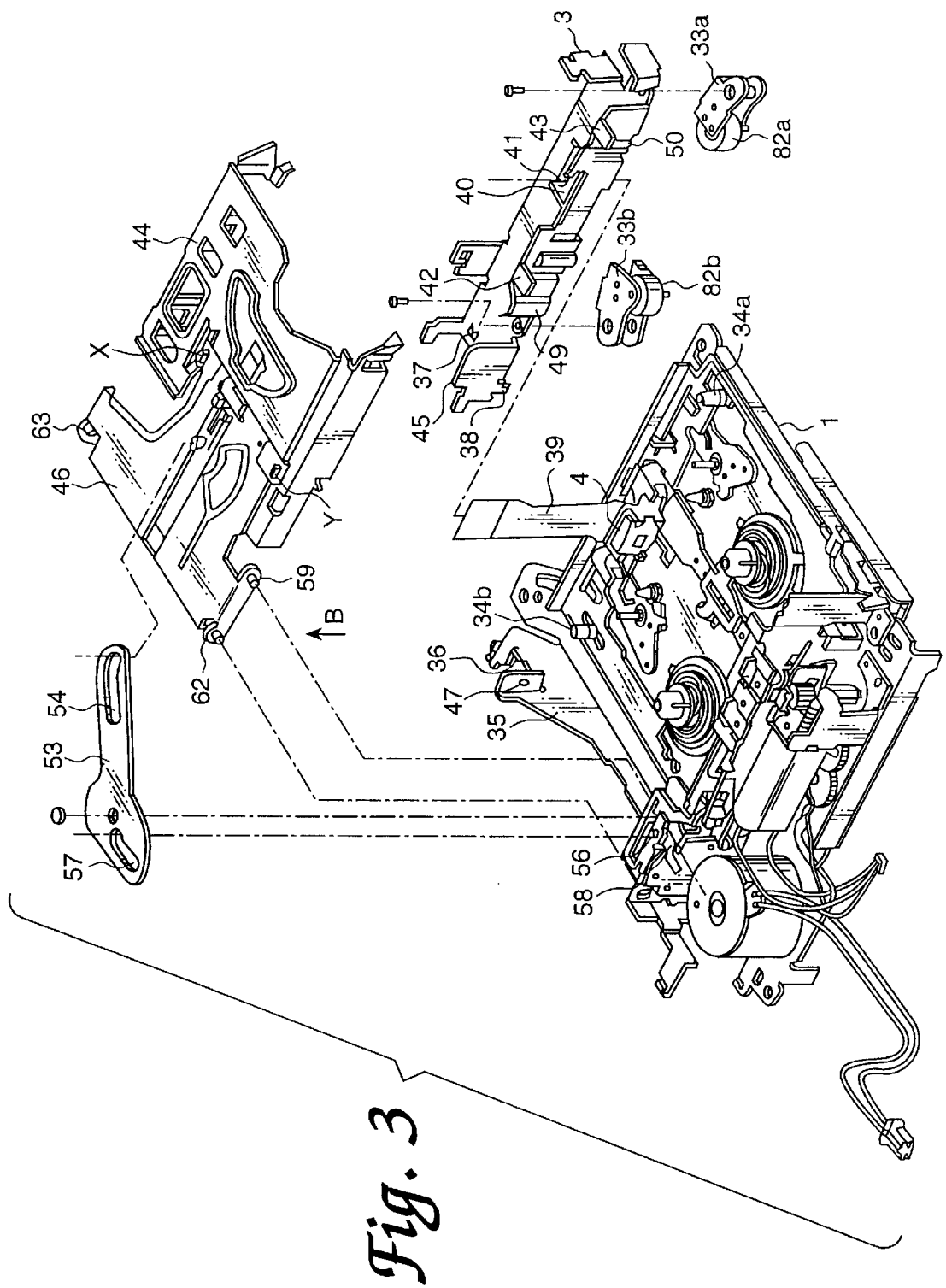
FIG. 3 is an assembling diagram of the embodiment according to the present invention.

The cassette carry in/out mechanism includes a side base unit 2, a bracket 3, a cassette holder 44, and a holder arm 46 which are mounted to a main base 1 shown in FIGS. 2 and 3.

Side Base Unit 2

Figure 4:
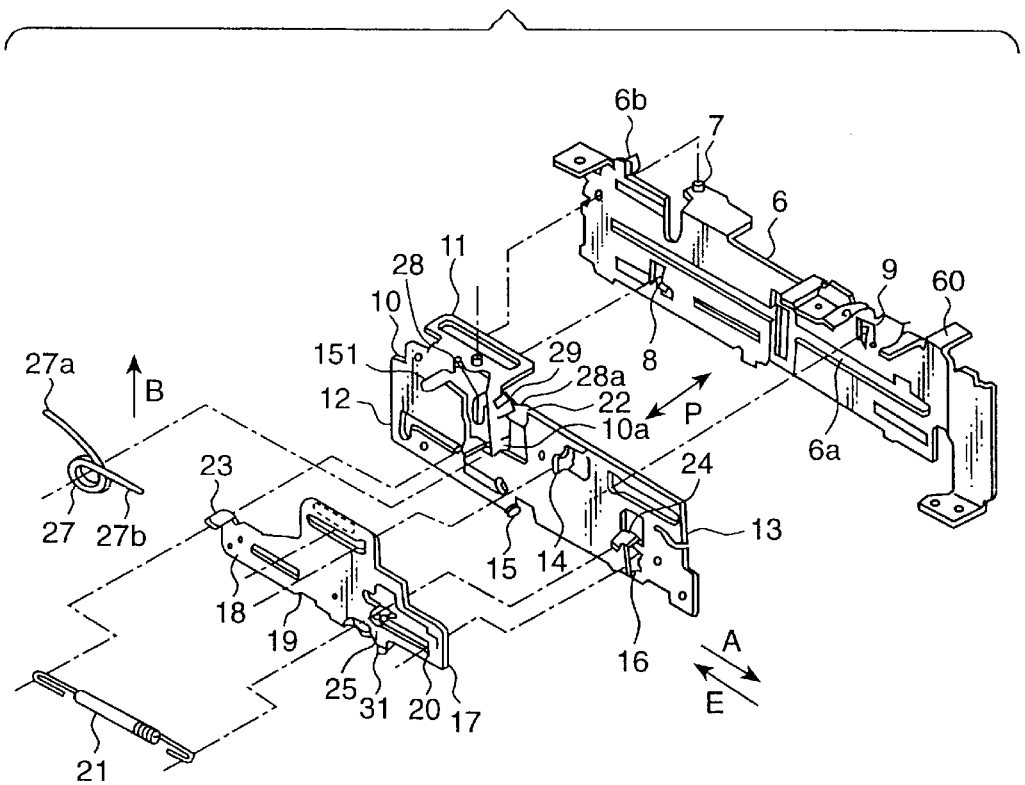
FIG. 4 is an assembling diagram showing an embodiment of a side base unit according to the present invention.

As shown in FIG. 2, the side base unit 2 is mounted onto the main base 1 on the side of a main motor 5 opposed to the side including a head 4. As shown in FIG. 4, in the structure, a pin 7, cut-raised portions 8 and 9 mounted on the side base 6 are inserted with a tilt angle into guide holes 11, 12, and 13 provided in a slide plate 10. Consequently, the slide plate 10 is slidable in a direction of the arrow A or of the arrow E in the drawing. At this time, the pin 7 is mounted on a plane perpendicular to the cut-raised portions 8 and 9 to restrict the slide plate 10 so as not to move in a direction of the arrow P from the side base 6. As a result, it is possible to reduce chattering caused when the slide plate 10 is slid. Further, since the slide plate 10 is inserted with the tilt angle, the slide plate 10 never drops off the side base 6 in a normal sliding operation, thereby eliminating the need for clamping parts. In addition, cut-raised portions 14, 15, and 16 of the slide plate 10 are inserted into a guide hole 18, a notch 19, and a guide hole 20 which are provided in a slide plate 17. Thus, the slide plate 17 is similarly slidable in the direction of the arrow A or of the arrow E in the drawing. The side base 6, the slide plate 10 and the slide plate 17 are assembled according to the procedure as set forth above. Thereafter, one end of a spring 21 is anchored to a cut-raised portion 22 of the slide plate 10 and a cut-raised portion 23 of the slide plate 17, and the other end is anchored to a cut-raised portion 24 of the slide plate 10 and a cut-raised portion 25 of the slide plate 17. Therefore, the slide plate 10 and the slide plate 17 can be integrally mounted and moved together by clamping force of the spring 21. Further, the respective slide plates 10 and 17 can not be slid to positions at a time of insertion, and can be prevented from dropping out. Since the two slide plates 10 and 17 are mounted to the side base 6 in such a structure, it is possible to surely mount without the clamping parts such as retaining ring.

Figure 52:
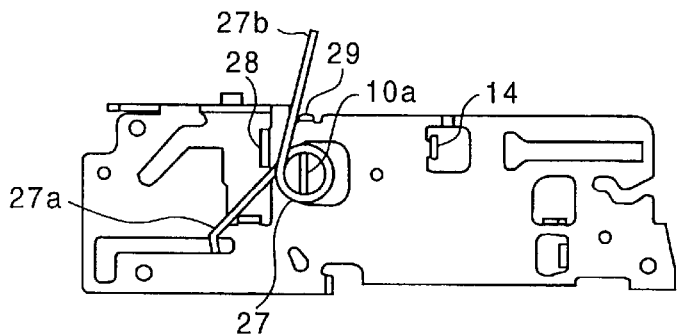
FIG. 52 is an explanatory view for explaining an embodiment of a mounted spring according to the present invention.
Figure 53:
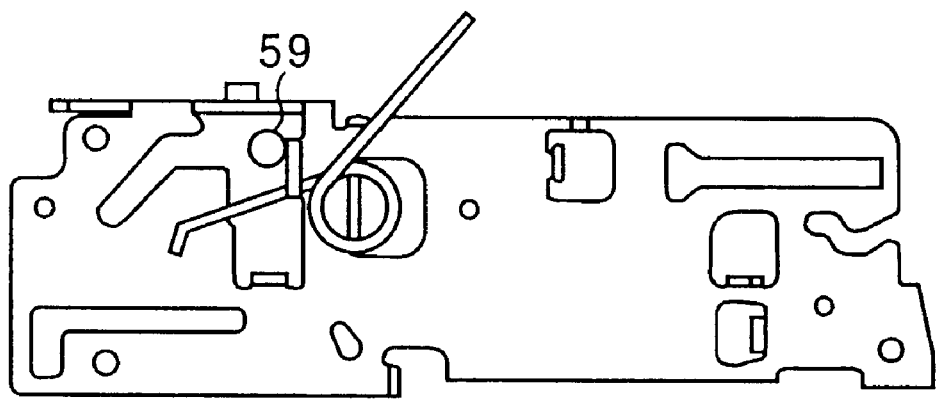
FIG. 53 is an explanatory view for explaining the embodiment of the mounted spring according to the present invention.

Additionally, an annular portion of the spring 27 is inserted into a cut-raised portion 10a of the slide plate 10 (see FIG. 52), and subsequently the spring 27 is put in a temporarily stationary state during assembly. That is, one spring arm portion 27b is rotated clockwise to move past a folded portion 29 provided for the slide plate 10 while bending the spring arm portion 27b. As the spring 27 is more rotated clockwise, the other spring arm portion 27a is more inserted into a groove portion 28a of a cut-raised portion 28. Thus, the other spring arm portion 27a is never released in a direction opposed to an insertion direction of the cut-raised portion 10a of the spring 27 (see FIG. 53). In the temporarily stationary state of the spring 27, the spring 27 can be freely rotated about the cut-raised portion 10a in a counterclockwise range in which the spring arm portion 27b can contact the folded portion 29, and in a clockwise range in which the spring 27a can contact the cut-raised portion 28. Effects of the temporarily stationary state of the spring 27 will be discussed in the following description concerning to the cassette holder 44, and the holder arm 46.

Figure 54:
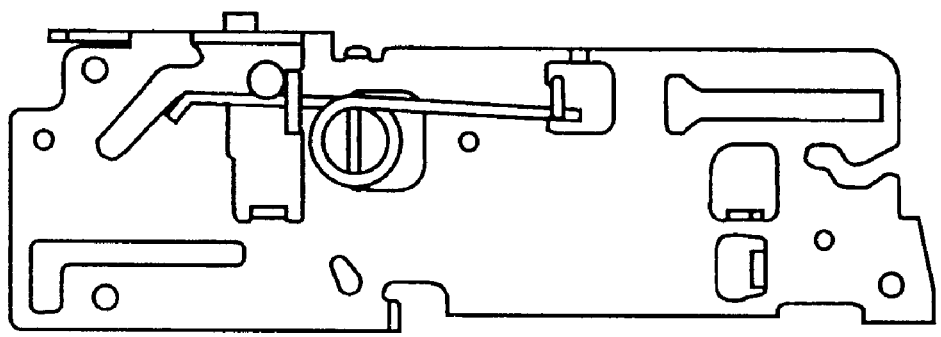
FIG. 54 is an explanatory view for explaining the embodiment of the mounted spring according to the present invention.

After the assembly, the arm portions 27a and 27b of the spring 27 engage the cut-raised portion 28 and the cut-raised portion 14. Thus, the arm portions 27a and 27b of the spring 27 urge the cut-raised portions 28 and 14 in a direction of the arrow B in the drawing (see FIG. 54). Effects thereof will be discussed in the following description concerning to a cassette carry in/out operation.

The slide plate 17 is provided with a pin 31 to engage a first groove 139 (see FIG. 17) in a cam gear 30 (see FIG. 9) mounted to a back portion of the main base 1.

The side base unit 2 is fixed onto the main base 1 by screws. In order to position the side base unit 2 at the time of screwing, as shown in FIG. 2, both sides of the main base 1 are provided with groove portions 32a and 32b having inclined portions which become narrower in an insertion direction, and having portions extending parallel to the insertion direction in the vicinity of bottoms thereof. Then, the side base 6 can be temporarily positioned at the portions (see FIG. 55).

Further, as shown in FIG. 4, the side base 6 is provided with a convex portion 6a extending in a direction perpendicular to and in a direction parallel to a cassette inserting direction on the side of the cassette holder 44. Consequently, the convex portion 6a serves as a restricting portion to prevent the cassette holder 44 from largely moving in a left direction with respect to the cassette inserting direction.

Bracket 3

The bracket 3 has a shape as shown in FIG. 3, and is positioned on the side of the main base 1 on which head 4 is mounted, and is positioned above the head 4 to be fixed by screws at pivotal shaft edges 34a and 34b of pinch arms 33a and 33b. In such a structure, even if the pinch arms 33a and 33b are deviated from correct positions toward the side of the bracket 3, the pinch arms are never deviated from the correct positions exceeding positions at which the bracket 3 is mounted. In order to secure the positions used at a time of screwing, a convex portion 36 is provided for a printed board mounting portion 35 upward extending from the main base 1 at a side portion of the main base 1, and the convex portion 36 is inserted into a hole portion 37 in the bracket 3 with some degree of clearance. Concurrently, a convex portion 38 provided for the bracket 3 is fitted into a concave portion provided in the printed board mounting portion 35.

A printed board is mounted on the bracket 3, or a drive mechanism is mounted to the bracket 3 because the head 4 must be rotated by 180 degrees when a digital compact cassette (hereinafter referred to as DCC) is inserted. A structure of a tape player fitting for DCC will be discussed in another embodiment. A hole portion 40 is provided in the bracket 3 at a portion above the head 4 so as to connect a flexible print circuit (hereinafter referred to as FPC) 39 for transmitting output from the head 4 with the printed board at the minimum distance. A folded portion 41 is provided so as to avoid damage of the FPC 39 even if the FPC 39 contacts an edge of the hole portion 40.

The cassette holder 44 contacts folded portions 42 and 43 to restrict an amount of rise of the cassette holder 44 during a cassette carrying out operation so as to provide a correct ejecting position of the cassette tape. Further, it is possible to avoid deformation due to an excessive rise of the cassette holder 44 even if the cassette holder 44 is directly caught (when the tape player is carried by hand).

In addition, the folded portion 45 prevents the holder arm 46 from dropping off a holder arm mounting hole 47 provided in the printed board mounting portion 35.

The cassette holder 44 merely engages the holder arm 46 at two points X and Y and at a convex portion 48 (see FIG. 5) so that the cassette holder 44 may be horizontally deviated from a correct position by an amount of chattering when the cassette is carried in or carried out. At this time, convex portions 49 and 50 provided for the bracket 3 serve as restricting portions to restrict the cassette holder 44 so as not to excessively move in a right direction with respect to the cassette inserting direction.

Figure 33:
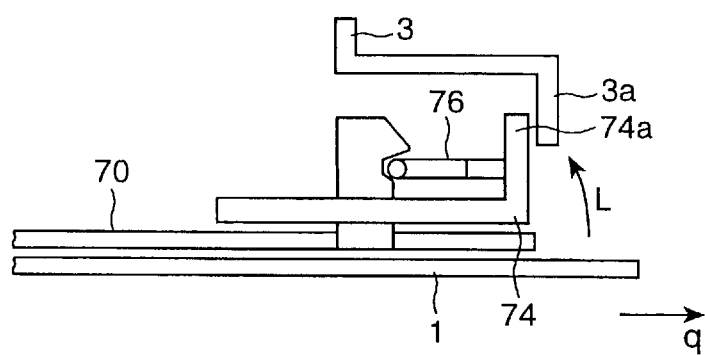
FIG. 33 is a partial side view showing the embodiment of the playback running direction switching mechanism according to the present invention.

A folded portion 6b is provided at a back portion of the bracket 3 to contact a folded portion 74a of a head base 74. It is thereby possible to restrict movement of the head base 74 in a direction q due to, for example, dropping impact of an apparatus (see FIG. 33).

Cassette Holder 44, and Holder Arm 46

Figure 5:
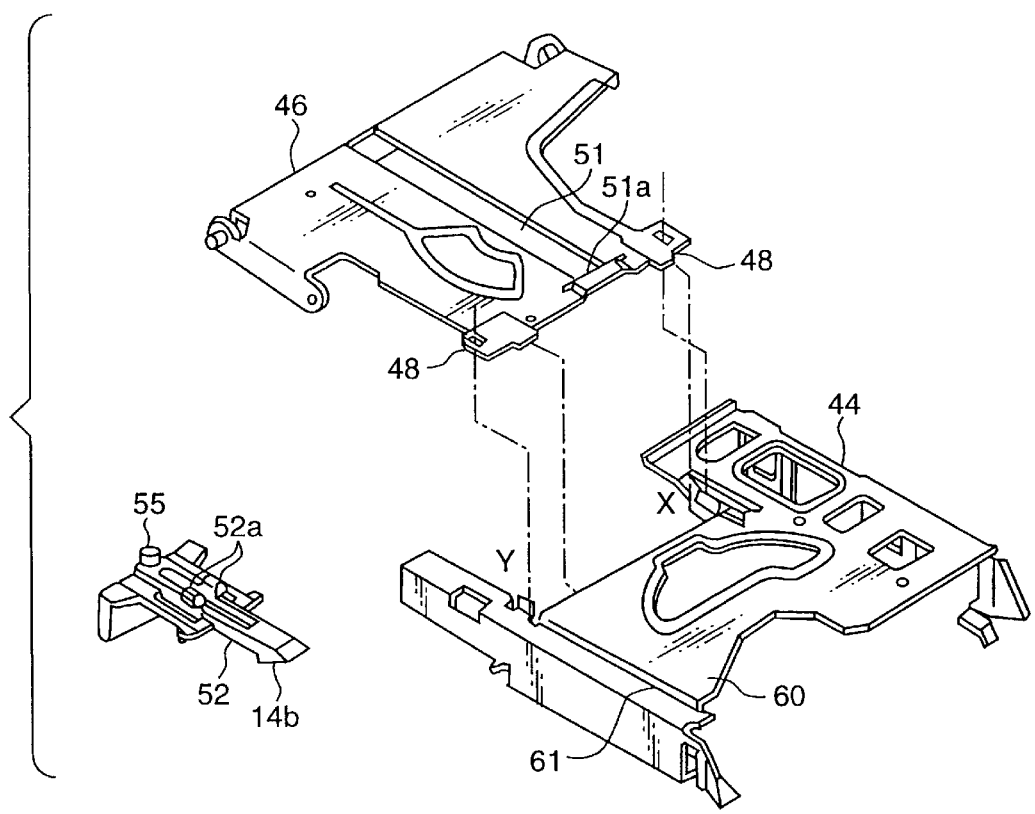
FIG. 5 is an assembling diagram showing an embodiment of a cassette holder periphery according to the present invention.

As shown in FIG. 5, the cassette holder 44 and the holder arm 46 only engage one another at the two points X and Y and at the convex portion 48 as set forth above, and are not fixed by, for example, screws. A slider 52 engages a hole portion 51 in the holder arm 46 to be slid by using the hole portion 51 as guide. At this time, in order to avoid burrs of a sheet metal around the hole portion 51, a thickness of a corner portion contacting the sheet metal around the hole portion is removed from the slider 52. The slider 52 has a convex portion 55 engaging a hole portion 54 of an ejector 53 (see FIG. 3), and the ejector 53 is rotated about the pin 7 (see FIG. 4). A convex portion 56 provided for a slide plate 10 engages a hole portion 57 in the ejector 53 such that the ejector 53 can be rotated in combination with movement of the slide plate 10. A pin 59 extends from a side portion of the holder arm 46 to be inserted into a hole portion 58 provided in the side base 6 of the bracket 2. A lower portion of the pin 59 is positioned on the spring 27 at a cassette tape inserting position, and force of the spring urges the holder arm 46 in the direction of the arrow B. However, as set forth above, the folded portions 42, 43 of the bracket 3, and the folded portion 6c of the side base 6 push down a stage upper portion 60 of the cassette holder 44 so that the cassette holder 44 never rises unnecessarily.

Figure 55:
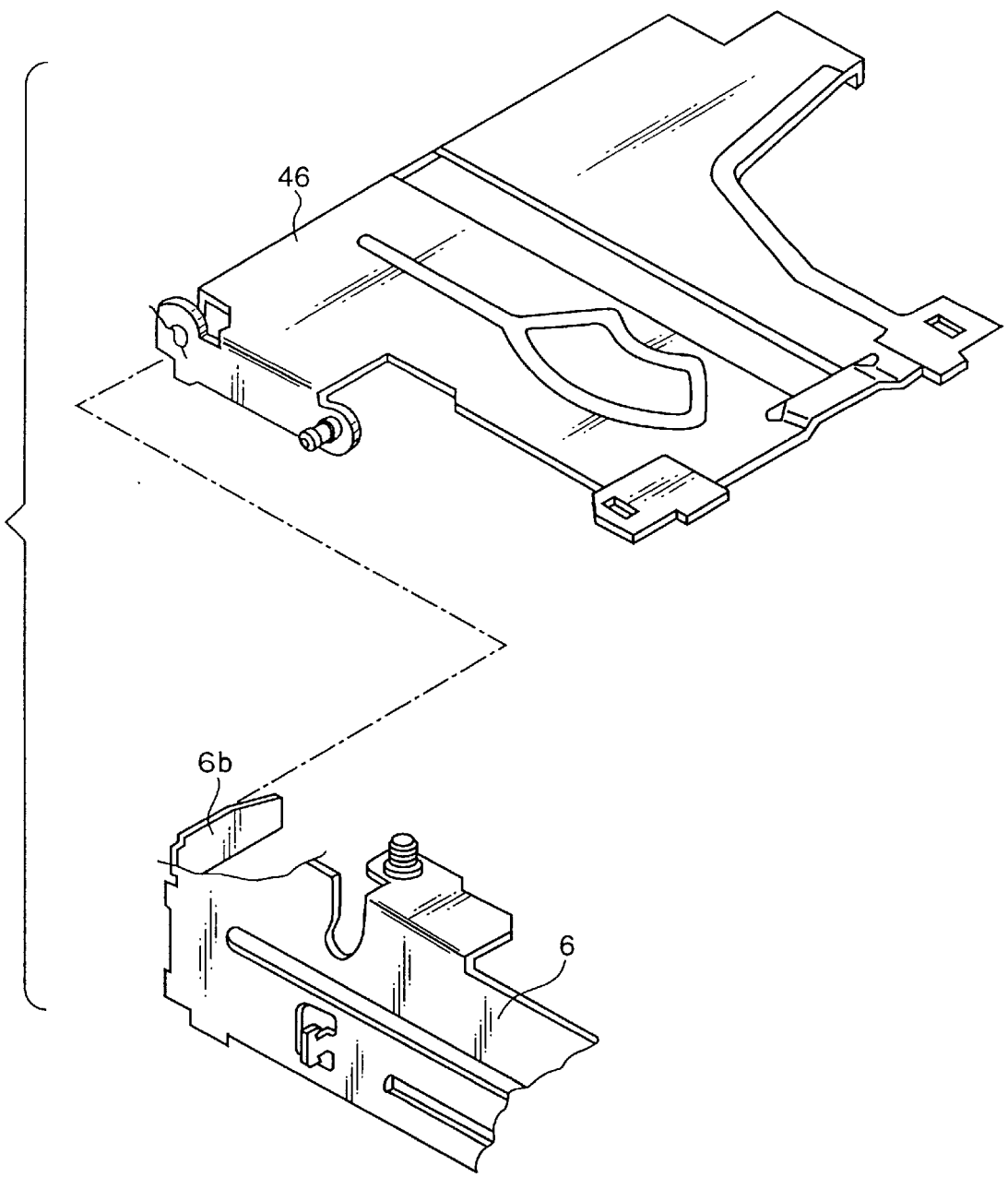
FIG. 55 is an explanatory view for explaining an embodiment of a mounted holder arm according to the present invention.

The stage upper portion 60 is pushed down because another cassette holder used for the DCC also employs the folded portions 42, 43, and 6c as stoppers in spite of a different position of a stage portion 61. In order to improve an operational efficiency when the holder arm 46 is rotatably mounted to the side base 6, and the main base 1, the pins 59, 62, and 63 extending from the holder arm 46 are set to become higher in the order of the pin 63, the pin 62, and the pin 59. Thereby, the pins are sequentially inserted at a built-in time, and two of them are never inserted concurrently. Further, as shown in FIG. 55, the side base 6 is provided with a folded portion 66, at a time of inserting the pins, a notch in the holder arm 46 is guided onto an upper end surface of the folded portion 66 so as to support the holder arm 46 thereon. Thereby, the side base 6 can be easily built into the holder arm 46.

When the pin 59 is inserted into the slide plate 10, the spring 27 is put in the temporarily stationary state as set forth above. It is thereby possible to smoothly insert the pin 59 without urging force by the spring arm 27a.

Figure 56:
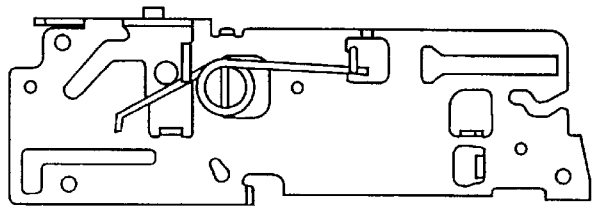
FIG. 56 is an explanatory view for explaining the embodiment of the mounted spring according to the present invention.

In addition, it is necessary to avoid deformation of the cassette holder 44 at a cassette ejecting position due to pressure on the stage upper portion 60, and avoid incapability of insertion of the cassette tape into the cassette holder 44. For this purpose, when the stage upper portion 60 is pressed, force is transferred to the holder arm 46 combined with the cassette holder 44 so as to rotate the holder arm 46 in a cassette mounting direction about the pins 62 and 63 serving as rotary axes. The pin 59 extending from a side surface of the holder arm bends the spring 27a counterclockwise against the urging force of the arm portion 27a to absorb force to press the stage upper portion 60 (see FIG. 56).

Playback Running Direction Switching Mechanism

Figure 6:
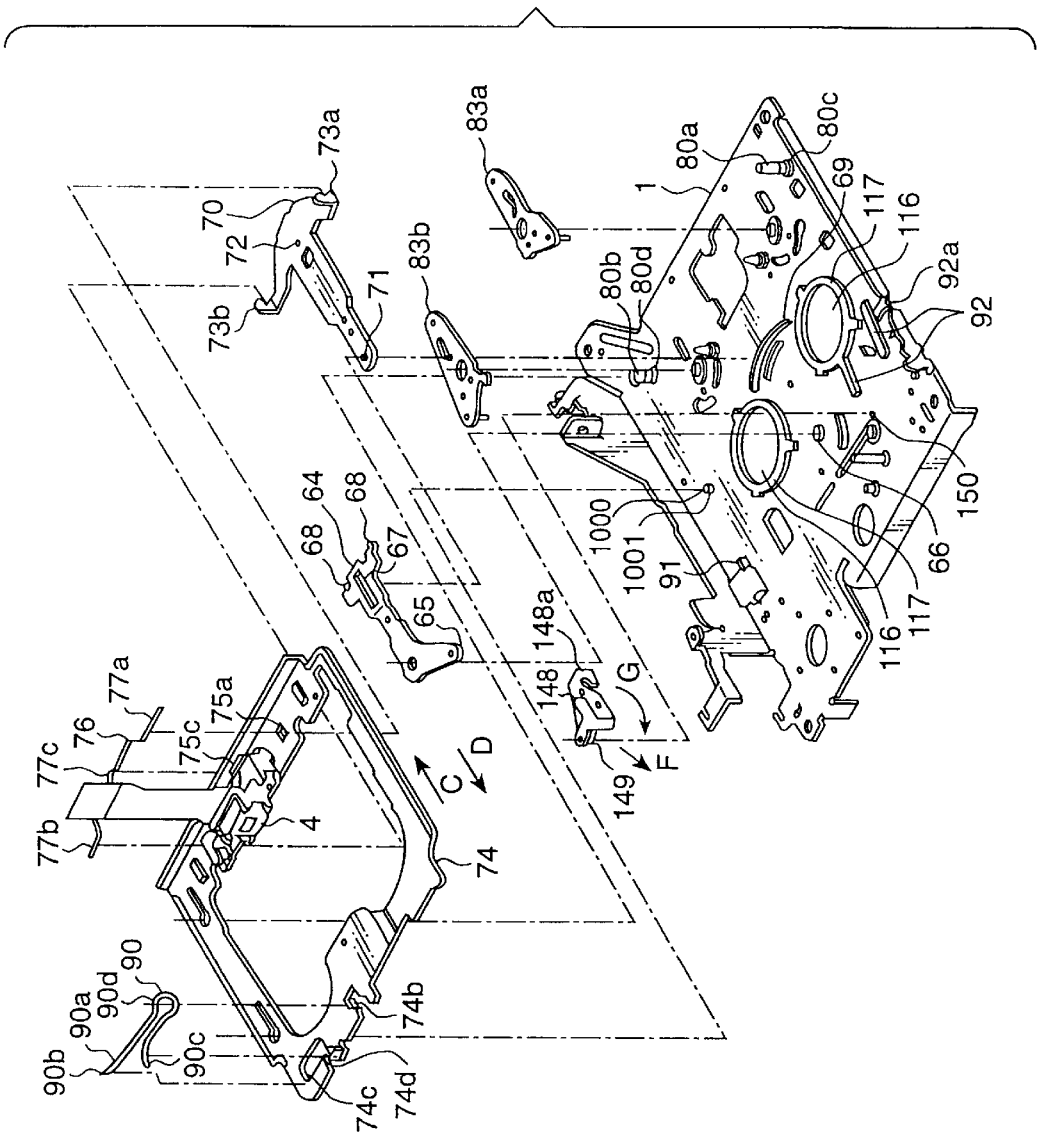
FIG. 6 is an assembling diagram of the embodiment according to the present invention.

FIG. 6 is an assembling diagram of the playback running direction switching mechanism. In the drawing, a pin 65 is provided at an end of a lever 64 to engage a second groove 140 (see FIG. 17) in the cam gear 30 (see FIG. 9), and is rotated about a shaft 66 according to movement of the cam gear 30. A hole portion 67 is provided in and a claw portion 68 is provided at the other end of the lever 64. The claw portion 68 engages a hole portion 69 provided in the main base 1 to prevent the lever 64 from floating. The lever 64 engages the claw portion 68 with a lower side of the main base 1 (see FIG. 9), and the lever 64 on the side of the pin 65 is pushed down by the head base 74 to avoid vertical chattering and dropping. A convex portion 71 provided for a switching arm 70 engages the hole portion 67, and the switching arm 70 is rotated about a convex portion 72 in conjunction with rotation of the lever 64.

Figure 7:
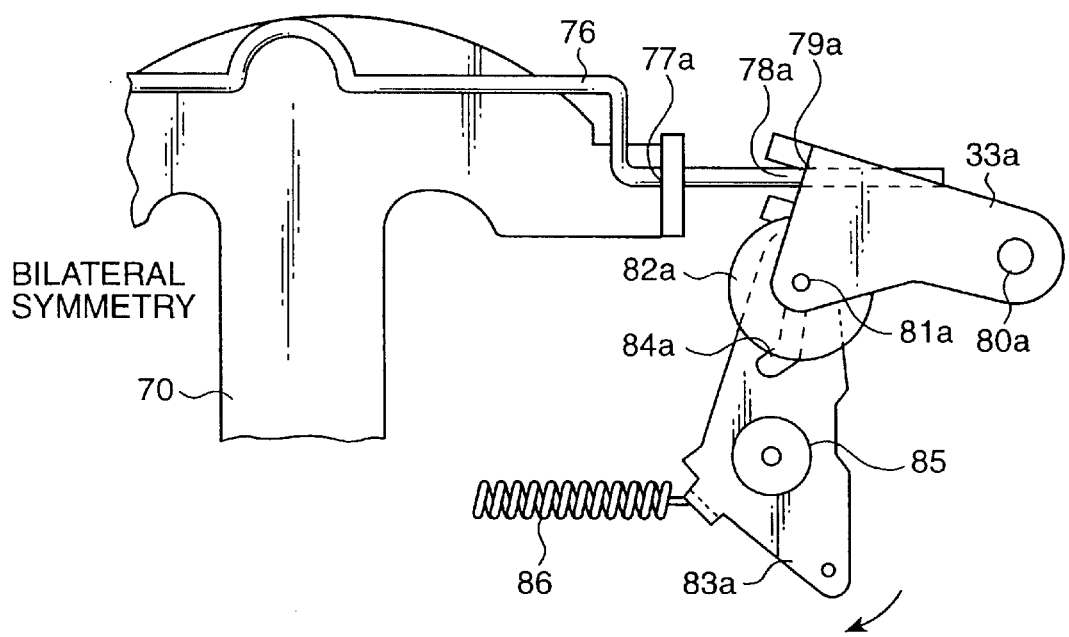
FIG. 7 is an explanatory view for illustrating an embodiment of a playback running direction switching mechanism according to the present invention.
Figure 8:
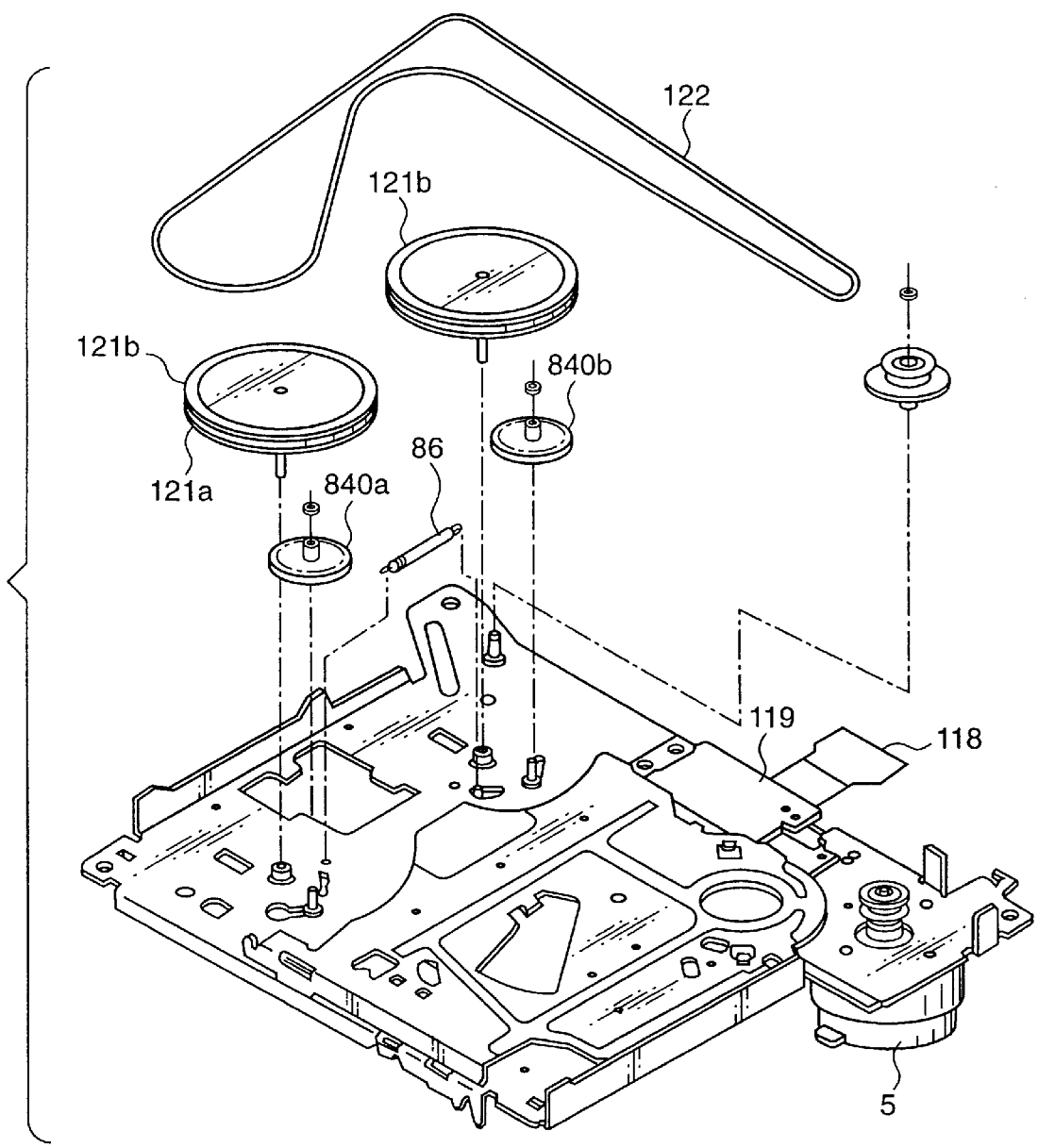
FIG. 8 is an assembling diagram of the embodiment according to the present invention.

Further, the convex portion engages a head base hole 75d (see FIG. 25) to move in conjunction with movement of a head base 75. Claw portions 73a, 73b provided for the switching arm 70 are inserted into hole portions 75a, 75b in the head base 74. Thereafter, the claw portions 73a, 73b engage the spring 76 at portions 77a, 77b, a rotary supporting point 77c of the spring 76 is inserted into a head base notch 75c, and the spring 76 engages the head base notch 75c, the claw portions 73a, 73b with pressure at the three points. Therefore, the switching arm 70 positioned between the head base 74 and the main base 1 is inclined in a direction of the arrow L to push up the head base 74 so as to prevent the head base 74 from chattering (see FIG. 33). As shown in FIG. 7, the ends 77a, 77b of the spring 76 engage claw notches 79a, 79b of the pinch arms 33a, 33b. The pinch arms 33a, 33b are rotated about shafts 80a, 80b, and pinch rollers 82a, 82b are rotated about pins 81a, 81b. Ends of the pins 81a, 81b engage hole portions 84a, 84b of gear arms 83a, 83b. Gear idlers 840a, 840b (see FIG. 8) are mounted to the gear arms 83a, 83b to transfer rotary force of flywheels to the reel rests. A sequence of link mechanisms as described above can select a combination of the pinch roller 82a and the gear idler 840a, or a combination of the pinch roller 82b and the gear idler 840b in conjunction with movement of the cam gear 30. A sequence of operation will be described below.

In FIG. 7, in order to reduce load when the head base 74 is moved, the spring 76 applies no force to the pinch arms 33a, 33b except a case where the spring 76 secures the pinch arms 33a, 33b to capstans 85a, 85b with pressure. Hence, the pinch arms 33a, 33b may cause chattering if the pinch arms 33a, 33b are not secured to the capstans 85a, 85b with pressure. Then, a spring 86 is interposed between the gear arms 83a, 83b to clockwise urge the gear arm 83a, and a hole portion 84a in the gear arm 83a engages the pin 81a to press the pinch arm 33a. Further, the gear arm 83b is urged counterclockwise, and a hole portion 84b in the gear arm 83b engages the pin 81b to press the pinch arm 33b, resulting in no chattering.

Head Driving Mechanism

A description will now be given of a structure of the head driving mechanism with reference to FIGS. 6 and 9.

Figure 18:
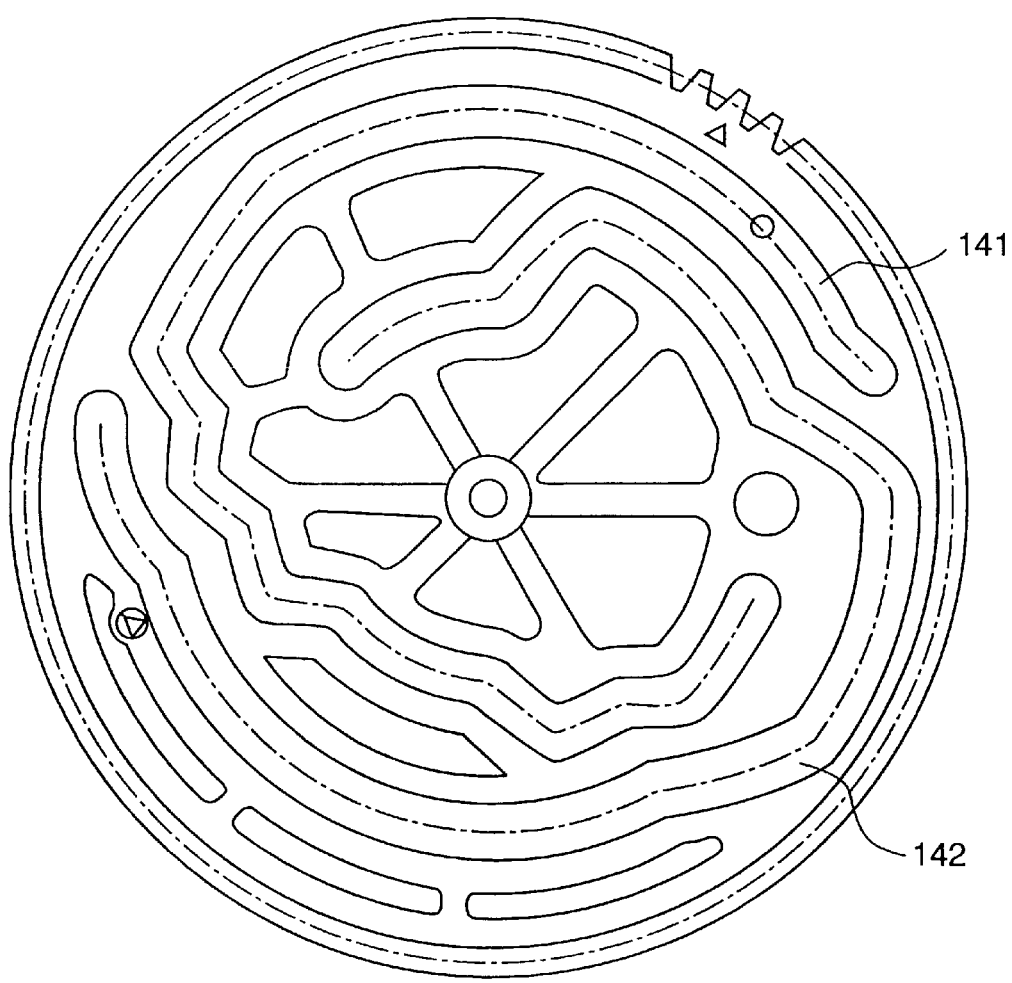
FIG. 18 is a plan view showing an embodiment of a second surface of a cam gear according to the present invention.

A convex portion 88 extending from one end of a driving lever 87 engages a third groove 141 in the cam gear 30 (see FIG. 18). A claw portion 89 is provided at the other end of the driving lever 87, and the claw portion 89 engages a hole end 74a of the head base 74 when the cassette tape is carried in and carried out so as to urge the head base 74 in a direction of the arrow C, that is, in a direction to move the head 4 apart from the mounted cassette tape. An annular portion 90d of a spring 90 anchors a head base folded portion 74b, and a spring distal end 90c anchors a head base folded portion 74d. At a time of playback, the claw portion 89 directly presses a spring portion 90a to urge the head base 74 through the spring 90 in a direction of the arrow D in FIG. 6, that is, in a direction to press the head 4 onto the mounted cassette tape. When the cassette tape is carried in or carried out, the spring 90 engages a spring edge 90b with a claw portion 91 of the main base 1 to press the head base 74 in a direction opposed to the direction pressed by the claw portion 89 (i.e., in the direction of the arrow D in FIG. 6).

The head base 74 is vertically restricted by notches 80c, 80d, 1001 in posts 80a, 80b, 1000, and is further restricted in a downward direction by cut-raised portions 92 on the main base 1, and restricted in an upward direction by a lower portion 92a. The head base 74 moves so as not to prevent rotary operation of the switching arm 70, a detecting lever 148, the lever 64, and the gear arms 83a, 83b which are directly disposed on the main base 1 and are positioned between the head base 74 and the main base 1.

Reel Rest Peripheral Mechanism

Figure 10:
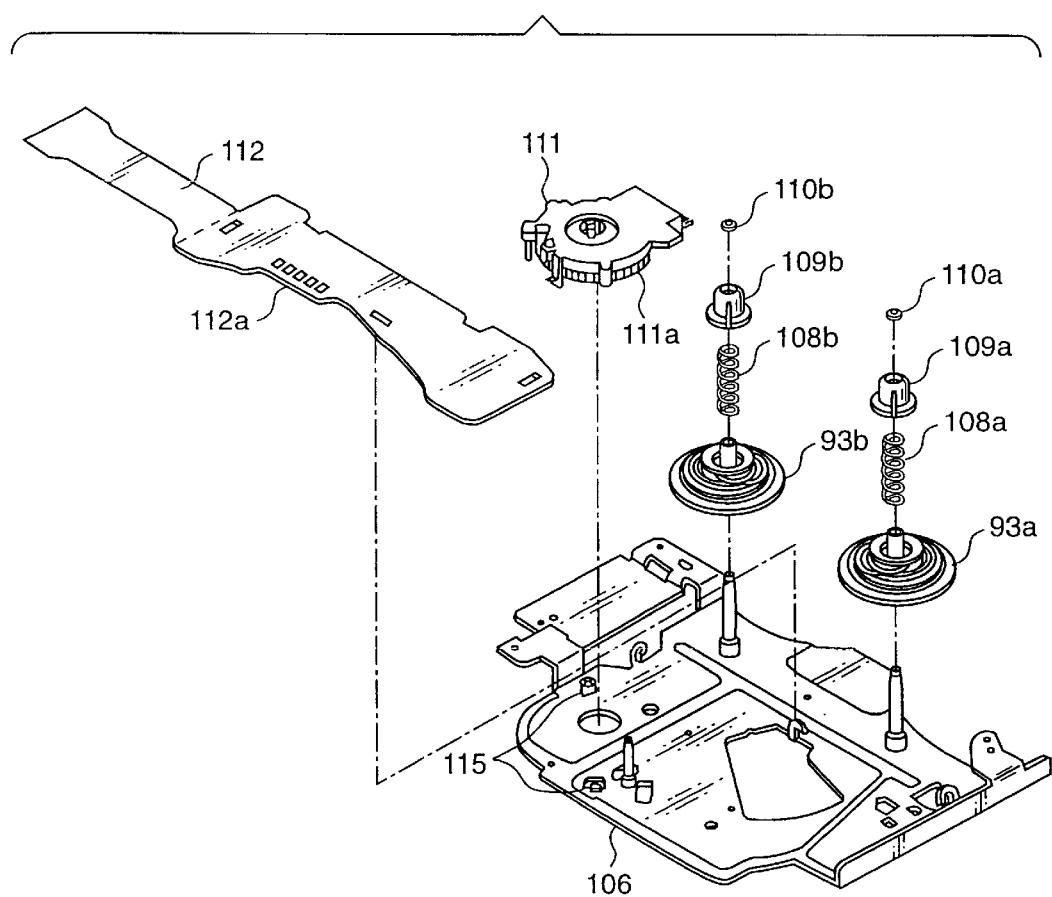
FIG. 10 is an assembling diagram showing an embodiment of a reel rest peripheral mechanism according to the present invention.
Figure 11:
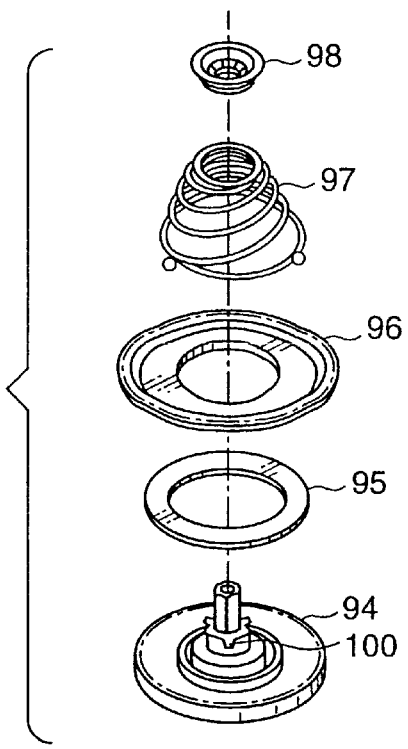
FIG. 11 is an assembling diagram showing the embodiment of the reel rest according to the present invention.
Figure 12:
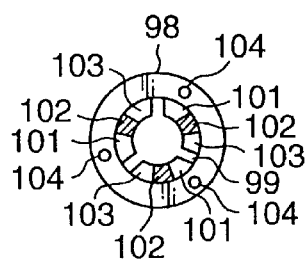
FIG. 12 is an explanatory view showing an embodiment of a stopper according to the present invention.

FIG. 10 is an assembling diagram showing reel rests and its peripheral portion. As shown in FIG. 11, in reel rest lower portions 93a, 93b, a felt 95 is disposed on an annular portion of a reel pedestal 94, and onto the felt, a slip gear 96, and a spring 97 are sequentially disposed to pass a shaft portion of the reel pedestal 94 therethrough. A convex portion 100 provided for the reel pedestal 94 is fitted into a notch 99 provided in a stopper 98 (see FIG. 12), and thereafter the stopper 98 is rotated to engage the convex portion 100 with any one of groove portions 101, 102, and 103 having different heights. Thereby, it is possible to change force of the spring 97 pressing the slip gear 96 so as to adjust torque. As shown in FIG. 12, in the stopper 98, marks 104 are put on a portion indicating the most highest groove portion so as to recognize different heights at a glance. Further, since the slip gear 96 and the reel pedestal 94 are rotated according to the different numbers of revolutions, lubricant such as grease is applied to a portion where two of them contact one another.

Figure 13:
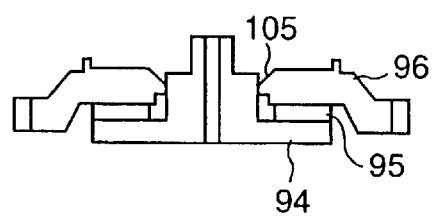
FIG. 13 is a side view of the embodiment of the reel rest according to the present invention.

Conventionally, the grease is directly applied to the portion where the slip gear 96 contacts the reel pedestal 94 for assembly. However, in the assembly, the applied grease may flow onto a back surface of the slip gear 96, and may enter a gap between the felt 95 and the slip gear 96. As a result, there is a drawback in that variation may occur in torque of the assembled reel rest. Hence, as shown in FIG. 13, the slip gear 96 is provided with a taper portion 105, and the grease can be applied to the taper portion 105 after the assembly.

Figure 14:
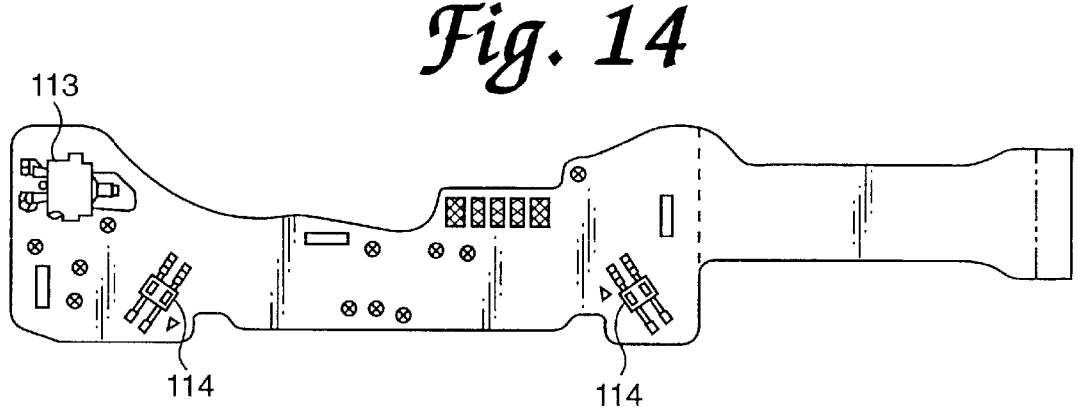
FIG. 14 is a plan view showing an embodiment of an FPC according to the present invention.

The reel rest lower portions 93a, 93b are disposed to pass shafts 107a, 107b of the reel base 106 therethrough, and coil springs 108a and 108b, reel keys 109a and 109b are subsequently disposed to pass the shafts therethrough, thereafter fixing by washers 110a, 110b to form the reel rest. Further, the reel base 106 is provided with a mode detecting switch 111 to detect a mode of the cam gear 30, and an FPC 112 to transmit a signal detected in the mode detecting switch 111. A reinforcing plate 112a is applied to a back surface of the FPC 112. As shown in FIG. 14, the FPC 112 is provided with a switch 113 to, for example, actuate a cassette carry in/out mechanism, and a sensor 114 to detect rotation of the reel pedestal 94. These detected signals are also transmitted by the FPC on the reinforcing plate. Apart from a connector portion, a test land is mounted to the FPC 112 at a portion to which the test land can be directly connected from an upper direction after assembling the FPC 112, the reel rest lower portions 93a, 93b, and the mode detecting switch 111 on the reel base 106 so as to concurrently perform entire detection of the mode detecting switch 111, the switch 113, and the sensor 114, resulting in an easy-check structure.

Figure 15:
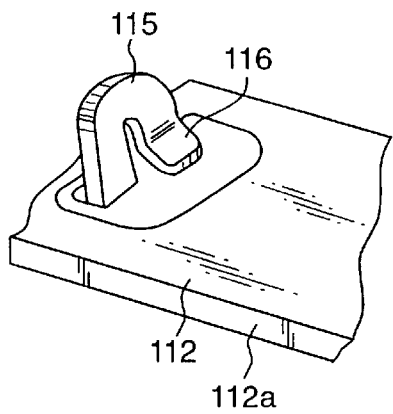
FIG. 15 is an enlarged diagram showing an embodiment of an FPC hook according to the present invention.

In order to mount the FPC 112 onto the reel base 106, as shown in FIG. 15, the reel base 106 is cut and raised, and one end thereof is cut away from the reel base to provide folded convex portions 115. The one end is further bent to form a reinforcing plate pressing portion 116. The convex portion 115 is inserted into a hole portion in the reinforcing plate 112a, and the reinforcing plate 112a is pushed down by the reinforcing plate pressing portion 116 when the reinforcing plate 112a is inserted with pressure. In this case, the reinforcing plate pressing portion 116 may turn up the FPC of the reinforcing plate, resulting in damage to reliability of the FPC. Hence, the FPC around the reinforcing plate pressing portion 116 is removed from the reinforcing plate 112a.

After mounting the reel rest, the FPC 112, and the mode detecting switch 111, the reel base 106 is screwed from a back surface of the main base 1. Hole portions 116 (see FIG. 6) are provided in the main base 1 to externally expose reel rest portions. When the reel base 106 is mounted in case the hole portion 116 has a smaller diameter than that of the slip gear 96 reaching a teeth portion due to restriction on a height direction of an apparatus itself, the teeth portion contacts the main base. In case a diameter of the hole portion is formed to expose the teeth portion of the slip gear 96 so as to avoid the contact, a tape operation in this state may possibly cause jamming of the teeth portion due to dust and so forth. In order to prevent the jamming, conventionally, a cover sheet metal is mounted around the gear from the front side of the main base 1, or the main base 1 is directly bent to form a cover structure. However, additional parts such as sheet metal, and mounting screws are required to mount the cover sheet metal, and the main base 1 folded at the reel rest mounting portion applies excessive force to the main base, resulting in problems of distortion of the main base 1 itself after folding, and so forth. Hence, a half blanking 117 is provided around the hole portion 106, thereby relieving the main base 1 from the teeth portion of the slip gear 96.

Figure 9:
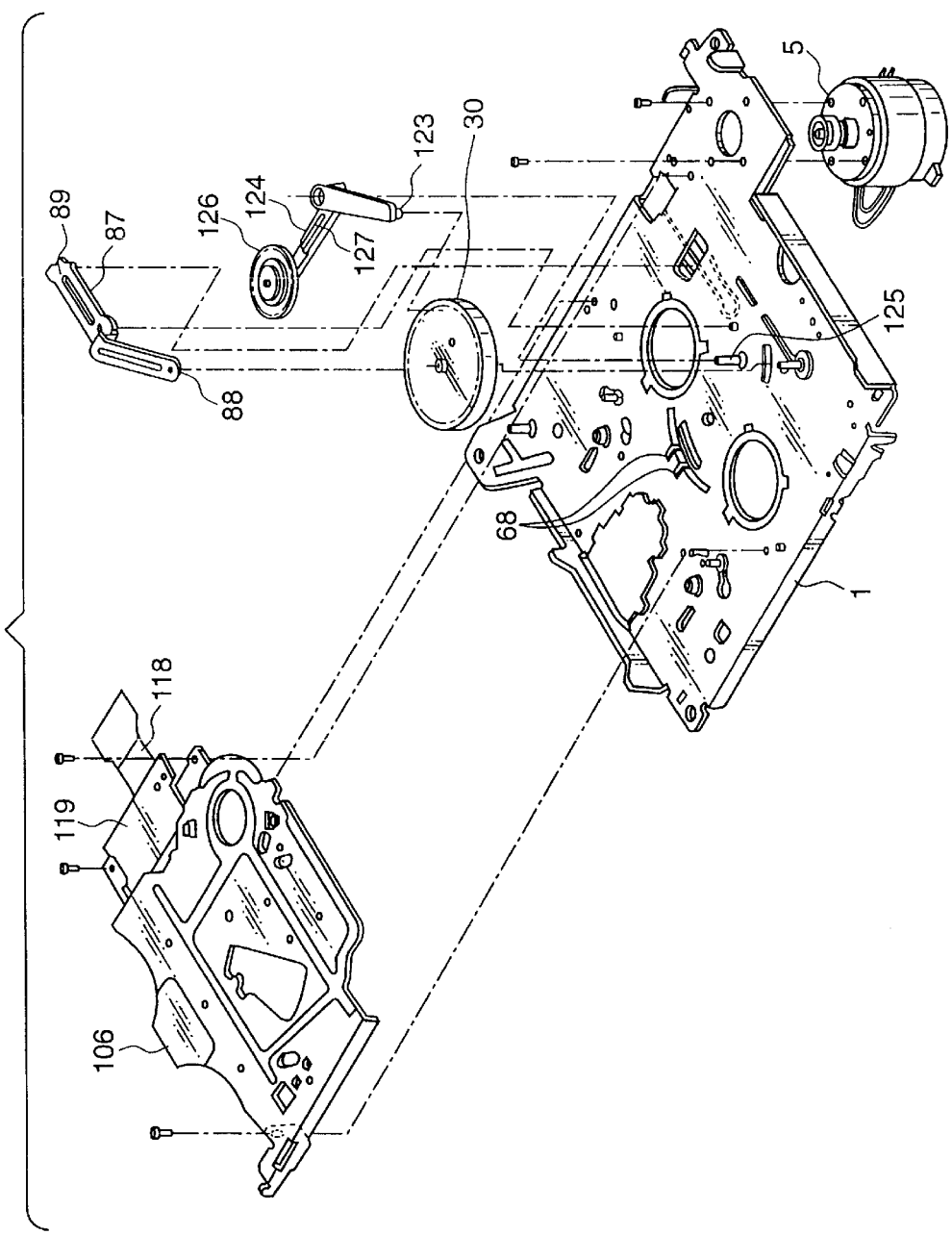
FIG. 9 is an assembling diagram of the embodiment according to the present invention.

As shown in FIG. 9, the reel base 106 is provided with a stage portion 119 such that, when the reel base 106 is mounted to the main base 1, movement of the FPC can be restricted by interposing an FPC portion 118 which is not supported by the reinforcing plate 112a between the two bases. It is thereby possible to prevent the FPC portion 118 from contacting a belt 122 passing above the stage portion 119 shown in FIG. 8 to transfer driving force from the main motor 5 to flywheels 121. Further, a discriminating switch can be mounted on the stage portion 119 to discriminate the DCC from the cassette tape.

Reel Rest Driving Force Transmission Mechanism for Tape Fast Forward

As shown in FIG. 9, a convex portion 123 engaging a fourth groove 142 (see FIG. 18) of the cam gear 30 is disposed at an end of a switching arm 124, and the switching arm 124 is mounted on the back surface of the main base 1 to be rotatable about a pin 125. An idler gear 126 is rotatably mounted at the other end of the switching arm 124. The idler gear 126 is positioned by the operation of the cam gear 30 during tape fast forward at a position for transferring rotary force of the flywheel 121 to the reel rest. A thickness removed portion 127 is provided for the switching arm 124 to avoid deformation of the arm or gear lock generated when the flywheel 121 and the reel rest contact a crest of the gear.

Power Motor Peripheral Mechanism

Figure 16:
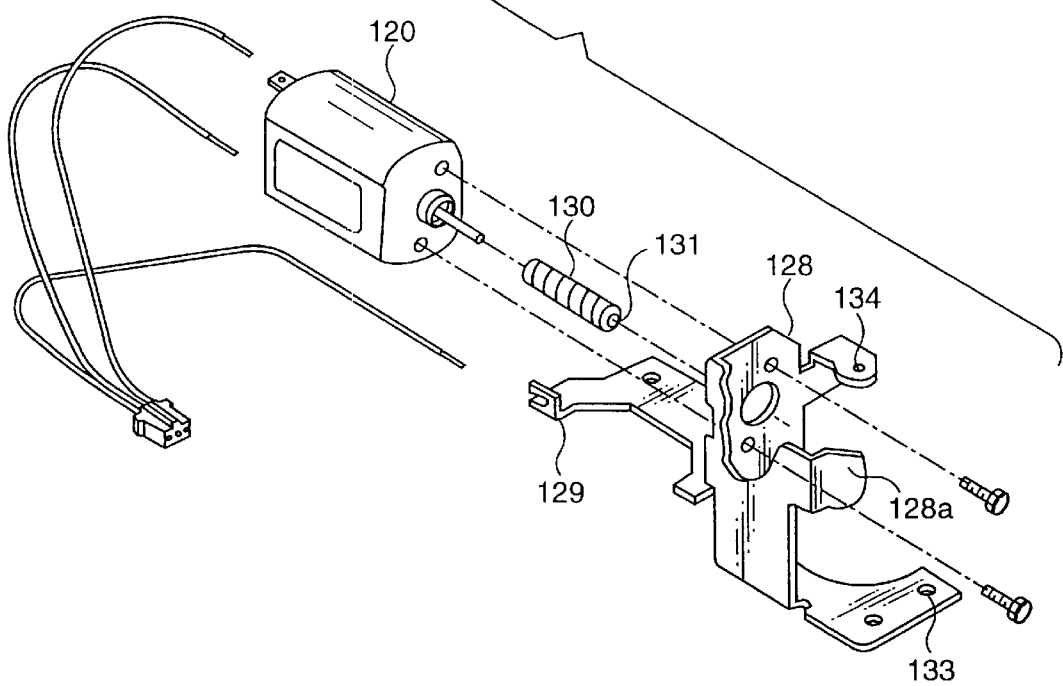
FIG. 16 is an assembling diagram showing attachment of an embodiment of a power motor according to the present invention.

FIG. 16 is an assembling diagram showing a peripheral portion of a power motor 120 to rotate the cam gear 30.

A power motor mounting base 128 includes a galvanized sheet iron which can not easily be soldered. Consequently, in order to solder a lead wire to a bent portion 129, when the bent portion 129 is formed, a plated surface is removed by strongly scrubbing at a time of press processing. In order to more easily pass a motor rotary shaft through a gear 130 under pressure, a hole is provided in a side surface of a gear distal end to serve as an air vent. However, a convex portion 131 having a smooth distal end remains to engage a bent portion 128a when mounting the gear so as to receive thrust force. Further, in order to improve operability at a time of mounting the mounting base 128 onto the main base 1 as shown in FIG. 2, a pin 135 is initially inserted into a hole portion 134, and a convex portion 132 is subsequently inserted into a hole portion 133. Thereafter, pins 136 and 137 engage holes provided in a back portion of the mounting base so that the pin 135 and the convex portion 132 are not inserted concurrently.

Description of Operation of Each Mechanism

A description will now be given of the operation of each mechanism in the tape player structured as set forth above in each mode state for each operation corresponding to the grooves in the cam gear 30.

Figure 17:
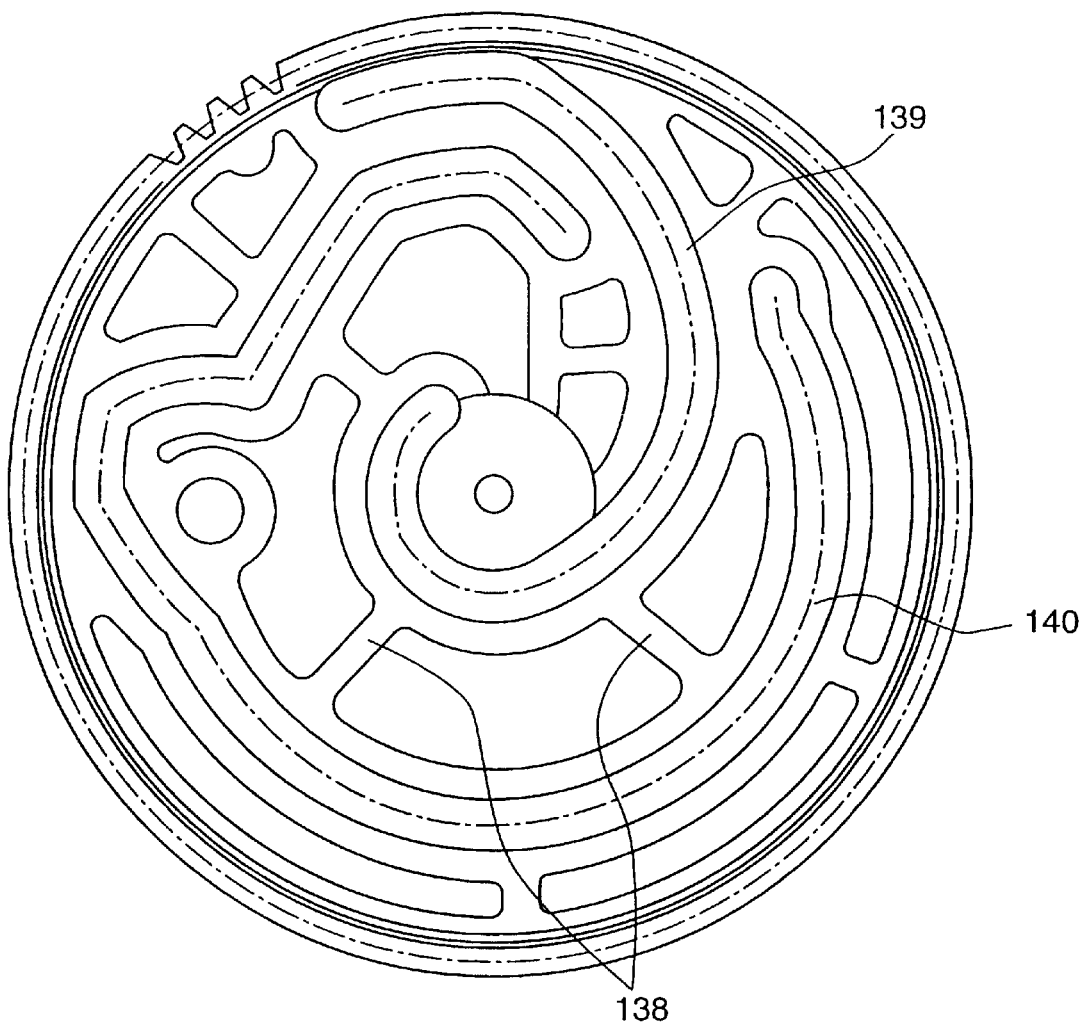
FIG. 17 is a plan view showing an embodiment of a first surface of a cam gear according to the present invention.
Figure 25:
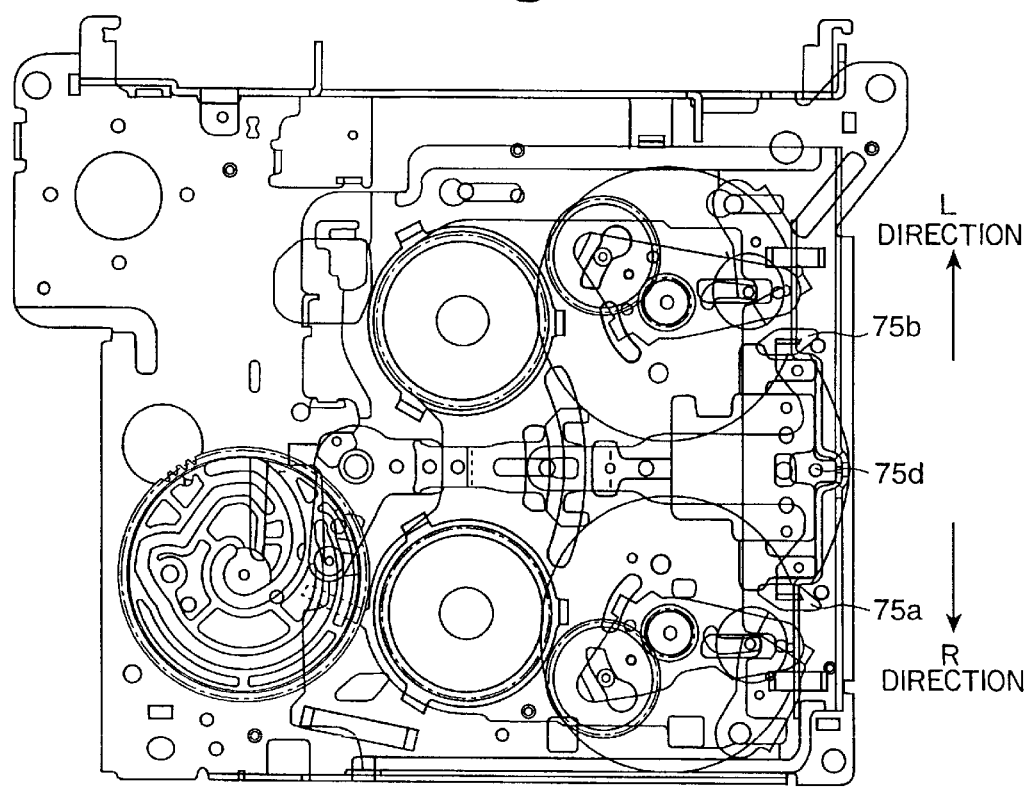
FIG. 25 is an explanatory view for explaining the operation in the embodiment of the cam gear according to the present invention.
Figure 26:
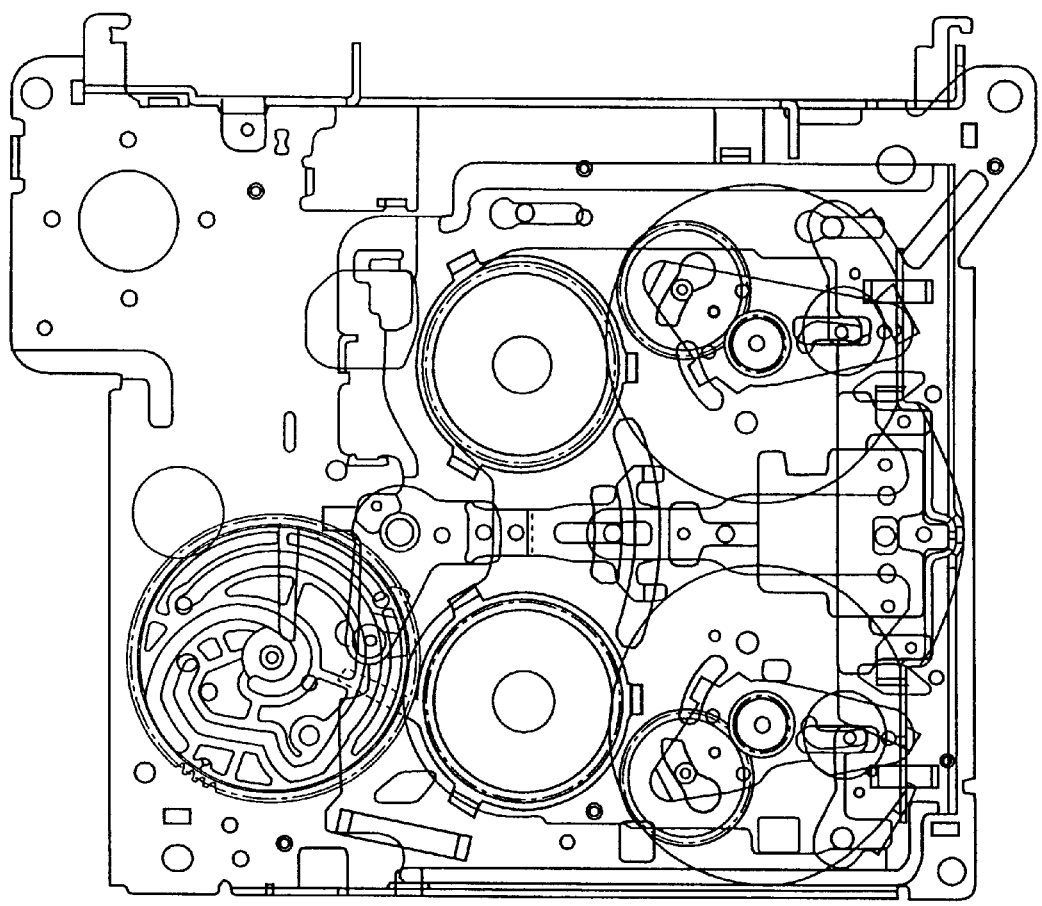
FIG. 26 is an explanatory view for explaining the operation in the embodiment of the cam gear according to the present invention.
Figure 27:
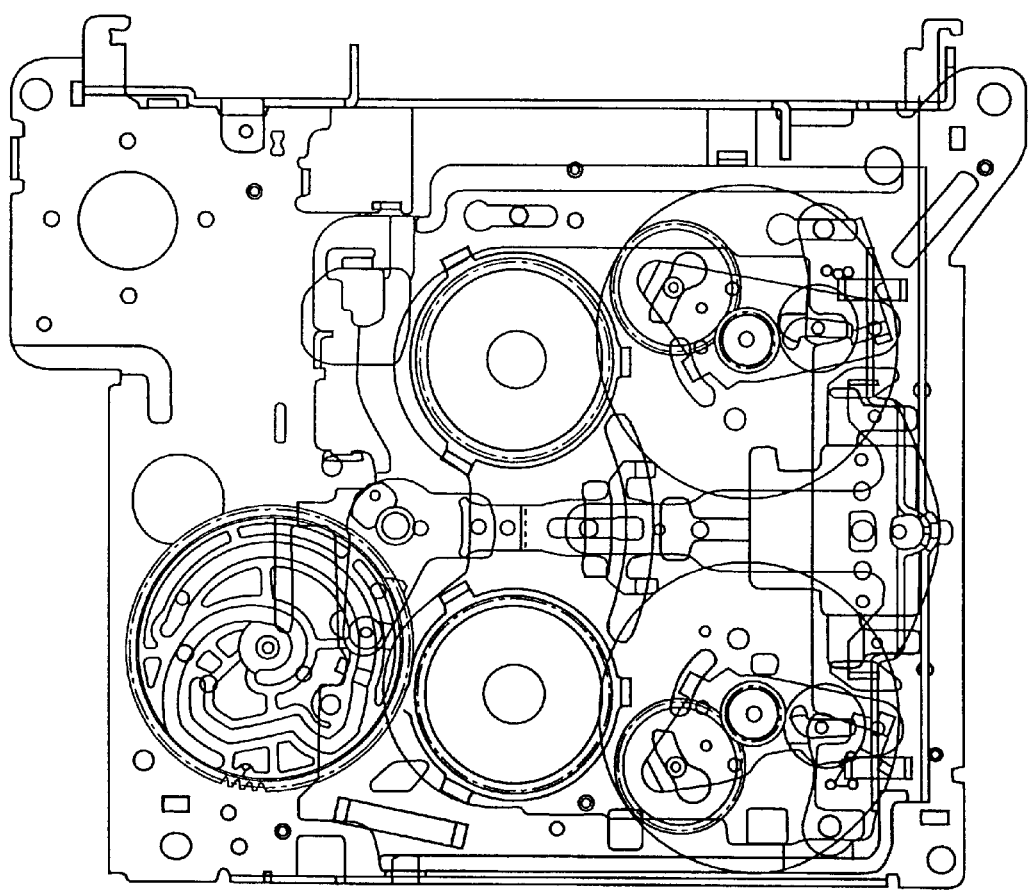
FIG. 27 is an explanatory view for explaining the operation in the embodiment of the cam gear according to the present invention.
Figure 28:
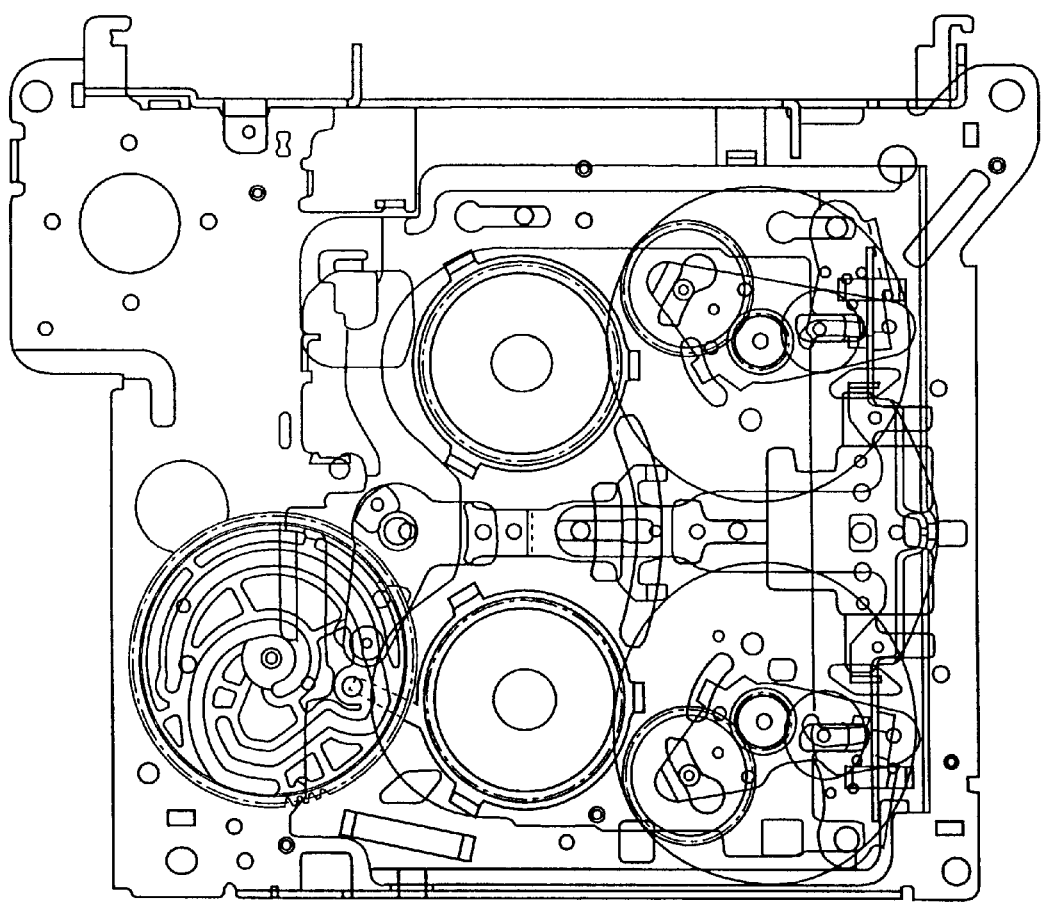
FIG. 28 is an explanatory view for explaining the operation in the embodiment of the cam gear according to the present invention.

The cam gear 30 will be described in order to illustrate "the operation corresponding to the grooves in the cam gear 30," and "each mode state." As shown in FIGS. 17 and 18, grooves are provided in both front and back surfaces of the cam gear 30, and the respective grooves have different widths according to diameters of the pins so as to prevent the pin from erroneously entering a wrong groove. Further, in order to avoid deformation generated when the cam gear 30 is formed, many thickness removed grooves are provided as well as the above grooves so as to provide a uniform thickness for an entire cam. Ribs 138 extend in a normal direction of the gear so as to prevent the pin from entering the thickness removed grooves during assembly, resulting in easy discrimination between the groove and the thickness removed groove. The respective grooves can control four operations, that is, the first groove 139 controls a cassette tape carry in/out operation, the second groove 140 controls a playback running direction switching operation, the third groove 141 controls a head driving operation, and the fourth groove 142 controls a selective operation to transfer driving force to the reel rest during fast forward. Directions of the arrows shown in FIG. 25 are respectively defined as a tape running L direction and a tape running R direction.

Figure 19:
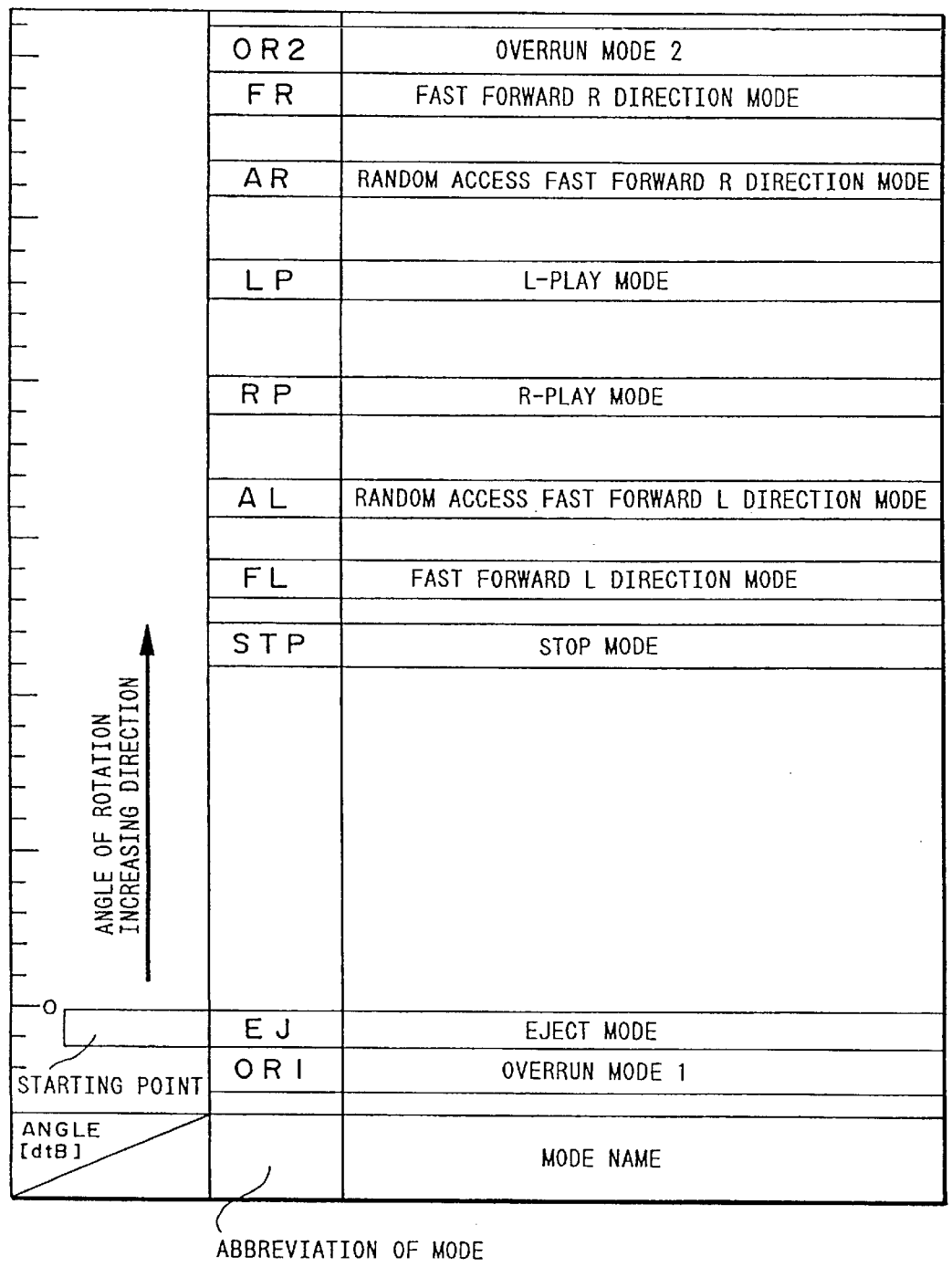
FIG. 19 is a transition diagram illustrating transition of operation in the embodiment of the cam gear according to the present invention.

As shown in FIG. 2, the cam gear 30 transfers driving force of the power motor 120 through a gear 143, a gear 144, and a gear 145. Further, as shown in FIG. 19, the above four operations can be smoothly controlled by eight modes including, in the order in which an angle of rotation becomes larger, EJECT mode (hereinafter referred to as EJ mode), STOP mode (hereinafter referred to as STP mode), fast forward L direction mode (hereinafter referred to as FL mode), random access fast forward L direction mode (hereinafter referred to as AL mode), R-PLAY mode (hereinafter referred to as RP mode), L-PLAY mode (hereinafter referred to as LP mode), random access fast forward R direction mode (hereinafter referred to as AR mode), and fast forward R direction mode (hereinafter referred to as FR mode). In addition, since only one cam gear is provided, the modes can not be jumped to another mode. That is, when the operation proceeds from the FL mode to the FR mode, the target mode can not be reached before momentarily transition of the AL mode, the RP mode, the LP mode, and the AR mode serving as the modes in the course of the proceeding operation.

Another mode is set as an assembling use only mode in which no load is applied to all the four operations set forth above during the operation proceeding from the EJ mode to the STP mode. During assembly, the gear is positioned to the mode to facilitate the assembly. In the assembling mode, a rib 138a of the cam gear 30 is positioned at the same position as that of a hole la (see FIG. 2) in the main base. Further, since the second groove 140 has a narrower groove width than that of the first groove 139 so as to prevent the pin 31 from entering grooves other than the first groove 139 when mounting the side base unit 2.

The cam gear 30 has the same number of teeth as the number of teeth of a mode detecting gear 111a provided for a mode detecting switch 111 so as to facilitate engagement of the gears, resulting in easier assembly. The mode detecting gear 111a has a smaller module than that of the cam gear 30 to make the mode detecting gear 111a smaller. Further, in a gear 145 engaging both of the cam gear 30 and the mode detecting gear 111a, a middle gear 145a engaging the cam gear 30 has the same number of teeth as that of teeth of a small gear 145b engaging the mode detecting gear 111a. Concurrently, the middle gear 145a and the small gear 145b have crests of teeth including the same angle. Thus, even if the middle gear 145a and the small gear 145b have different modules, and gears having the different modules engage one another, no problem occurs in rotation. The cam gear 30 is positioned at an initial state with respect to the main base 1 by passing a pin through holes which are provided in the cam gear 30, the main base 1, and the reel base 106 at a common position. Further, the mode detecting gear is positioned at an initial state by, for example, passing a pin through holes (which may be a concave portion in the mode detecting gear) which are provided in the mode detecting gear, and the reel base at a common position. The gear 145 is thereafter inserted to prevent the cam gear 30 and the mode detecting gear 111a from being deviated from the correct positions.

Cassette Tape Carry In/Out Operation

FIGS. 20(a) to 24(c) show a state in which the pin 31 extending from the slide plate 17 moves along the first groove 139 of the cam gear by rotation of the cam gear 30 for each mode, and show how the side base unit 2 and the cassette holder 44 are actuated by the movement of the pin 31. A description will now be given for each mode.

Figure 20A:
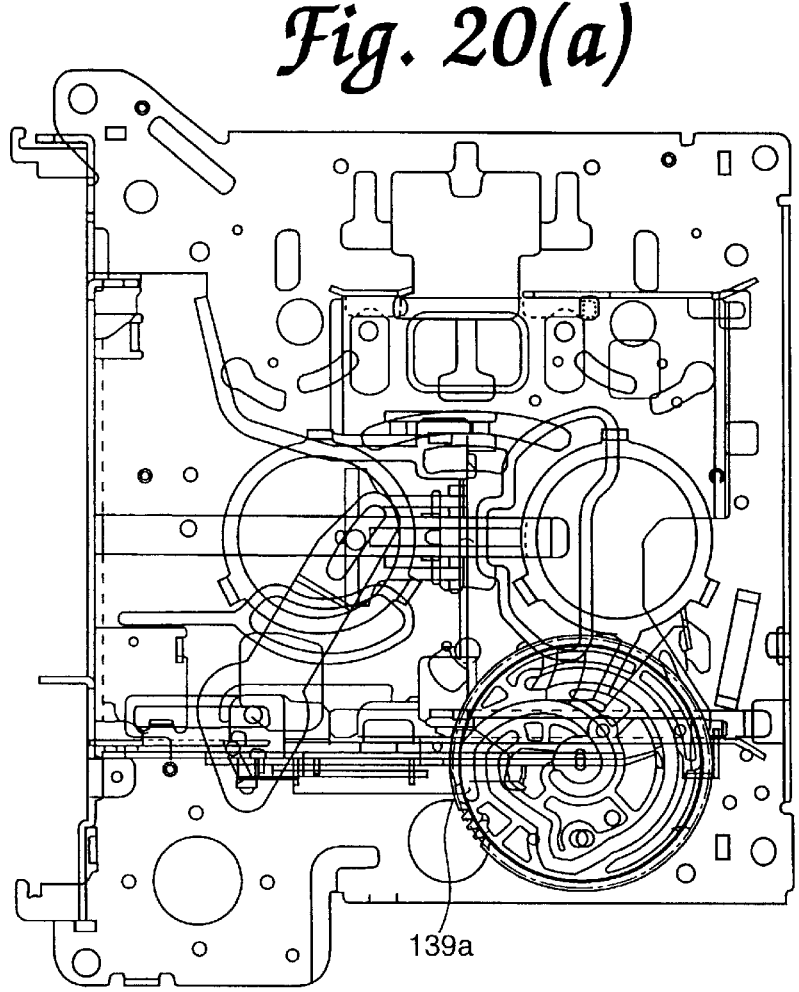
FIG. 20 is an explanatory view for explaining the operation in the embodiment of the cam gear according to the present invention.
Figure 20B:
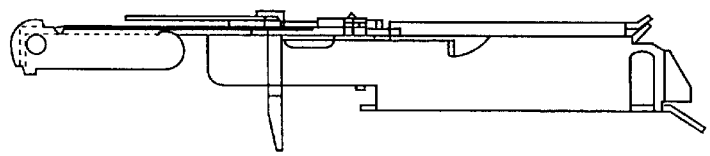
Figure 20C:
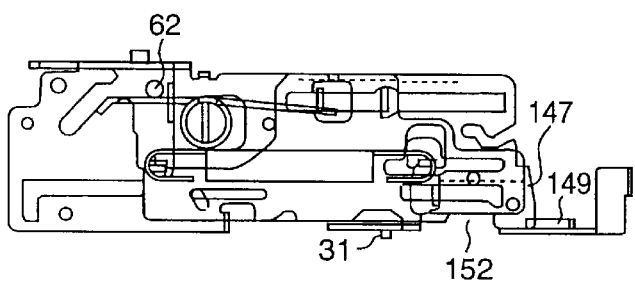
Figure 21A:
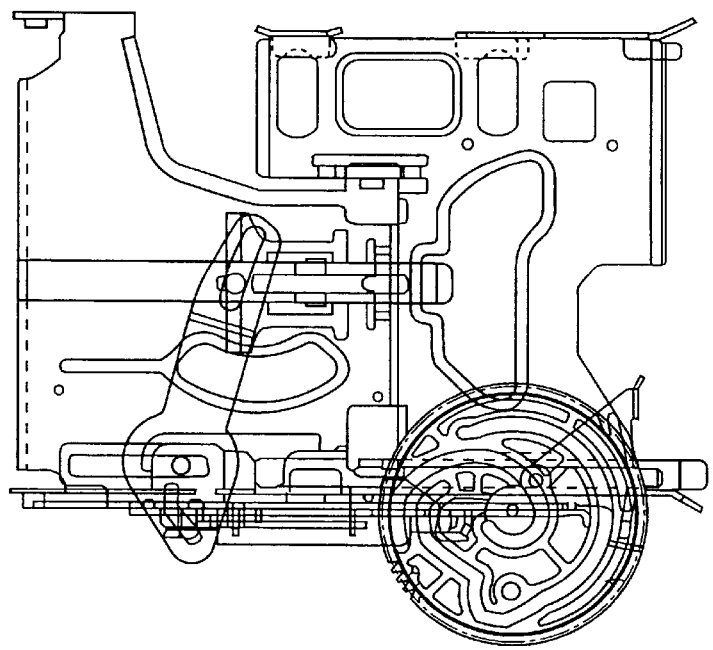
FIG. 21 is an explanatory view for explaining the operation in the embodiment of the cam gear according to the present invention.
Figure 21B:
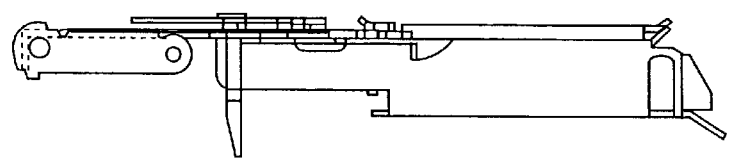
Figure 21C:
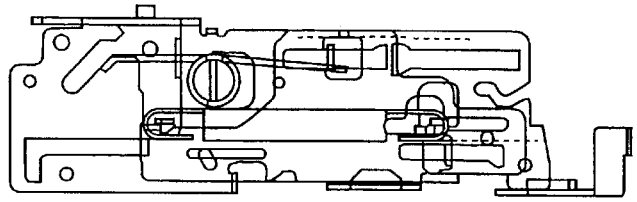
Figure 22A:
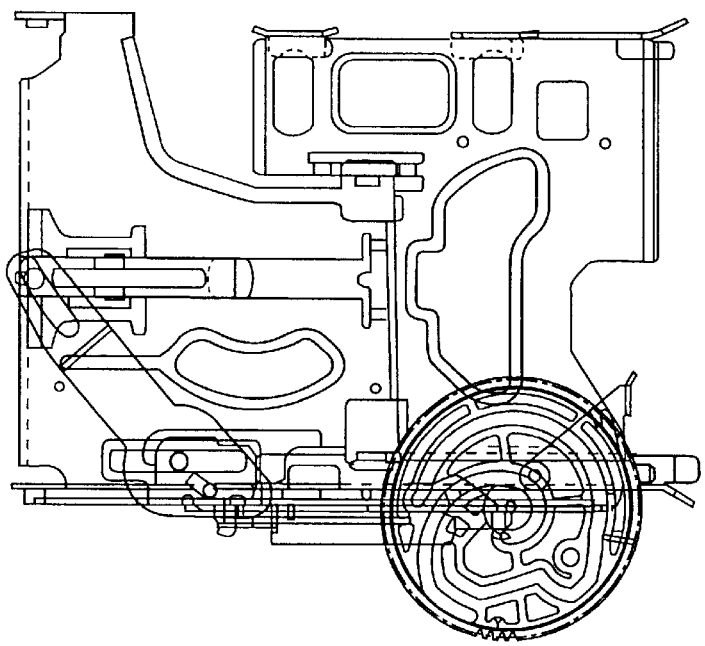
FIG. 22 is an explanatory view for explaining the operation in the embodiment of the cam gear according to the present invention.
Figure 22B:
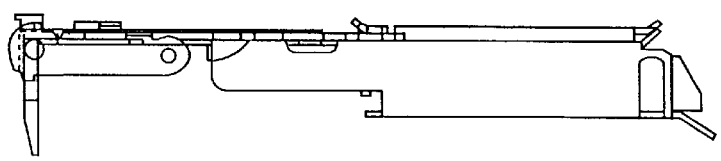
Figure 22C:
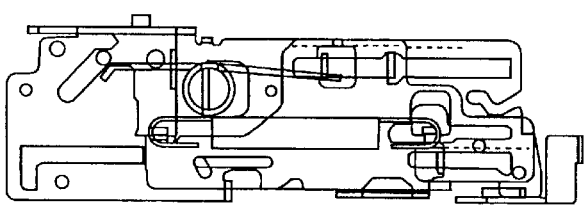
Figure 23A:
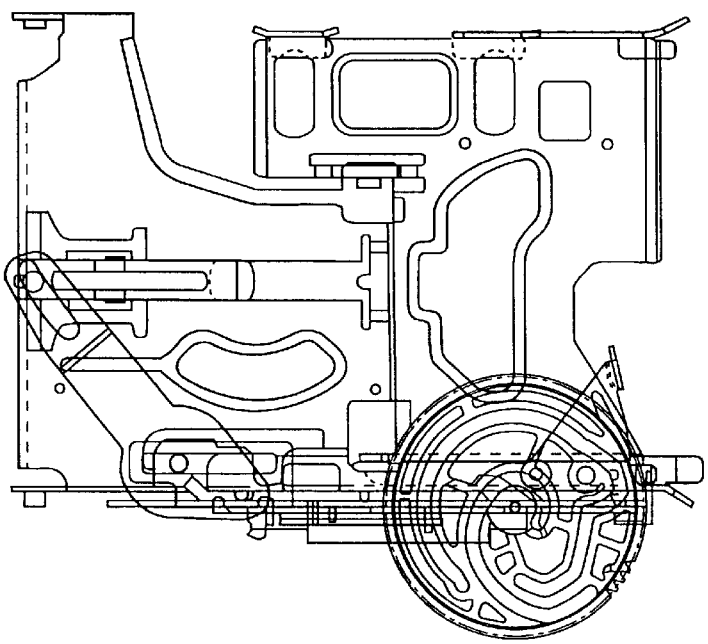
FIG. 23 is an explanatory view for explaining the operation in the embodiment of the cam gear according to the present invention.
Figure 23B:
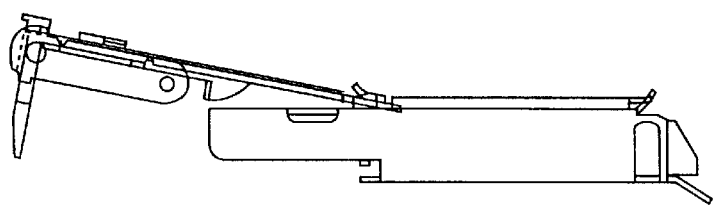
Figure 23C:
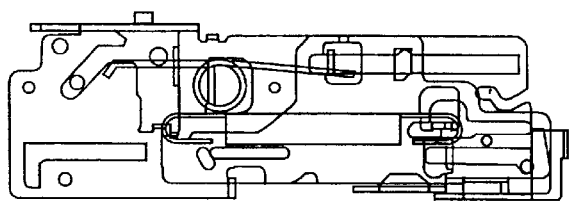
Figure 24A:
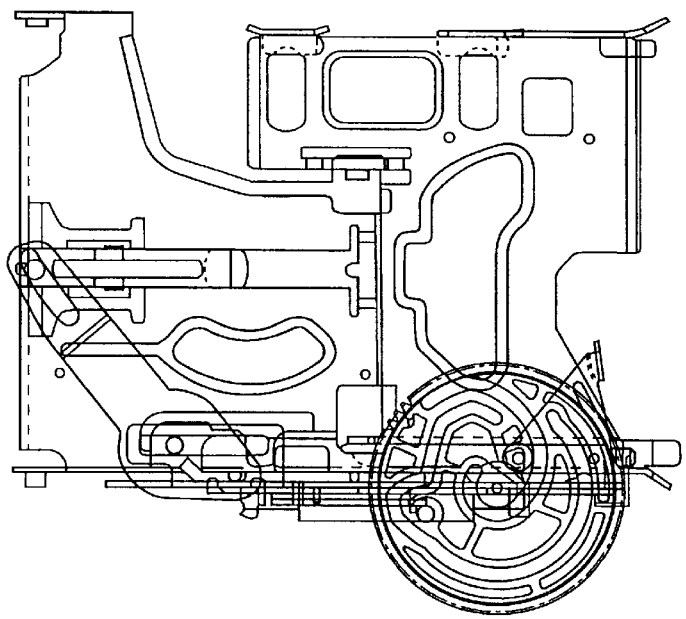
FIG. 24 is an explanatory view for explaining the operation in the embodiment of the cam gear according to the present invention.
Figure 24B:
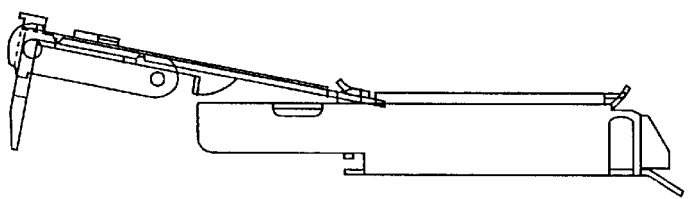
Figure 24C:
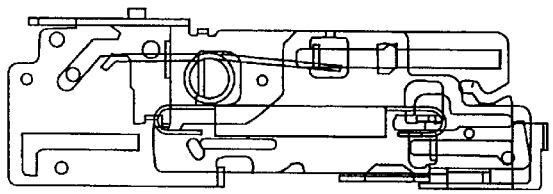

EJ Mode (FIGS. 20(a)–(c)

The drawing shows a state before the cassette tape is inserted into the tape player. The pin 31 is positioned at a position 139a of the first groove 139. As best shown in FIG. 3, the pin 59 extends from a side portion of the holder arm 46 to pass through the side base hole portion 58. The pin 31 is positioned above the arm portion 27a (FIG. 4) of the spring 27 (FIG. 4) to urge the holder arm 46 in an upper direction of the apparatus.

In the EJ mode, stopper portions 52a of the slider 52 contact one end 51a of an elongated hole in the holder arm 46, the ejector 53 can not be rotated clockwise, and the slide plate 10 can not move in the direction of the arrow E since the convex portion 56 contacts the hole portion 57 in the ejector 53. However, the slide plate 17 is stopped while extending the spring 21 at a position slightly moved in the direction of the arrow E. Consequently, elasticity of the spring 21 is applied to the cut-raised portion 24 of the slide plate 10, and is transferred from the convex portion 56 through the ejector 53 to the slider 52 so as to provide urging force to press the one end 51a of the elongated hole 51 in the arm 46.

From a Time of Inserting the Cassette Tape to ON Time of Switch 113 (FIGS. 20(a)–21(c))

When the cassette tape is inserted into the cassette holder 44 (FIG. 5), a take-up hole of the cassette hole engages a claw portion 146 (see FIG. 5) of the slider 52 (see FIG. 20). When the cassette tape is further pushed in, the slider 52 is pushed in along a guide of the hole portion 51. In conjunction with the movement of the slider 52, the convex portion 55 of the slider 52 rotates the ejector 53 (FIG. 3) about the pin 7 (FIG. 4) through the guide hole 54 in the ejector 53. Concurrently, the rotary force moves the slide plate 10 (FIG. 4) in the direction of the arrow A, from which the convex portion 56 (FIG. 3) extends to engage the hole portion 57 in the ejector 53. A distal end 147 (FIG. 20c) of the slide plate 10 engages an end 149 of the detecting lever 148 (see FIG. 6) to turn ON the switch 113. The end 149 is bent in an upper direction perpendicular to the main base 1, and the distal end 147 of the slide plate 10 engages a portion between the bent portion and the slide base 6. The slide plate 10 moves in the direction of the arrow A to rotate the end 149 of the detecting lever 148 to be pushed and opened in a direction of the arrow F. Thus, the detecting lever is rotated about a shaft 150 (FIG. 6) in a direction of the arrow G as a whole. The lever end is actuated by the rotation to turn ON the switch 113. Though the slide plate 10 moves in the direction of the arrow A (FIG. 4), the pin 31 is inserted into the first groove 139 in the cam gear 30, and the cam gear is stopped. Therefore, the slide plate 17 can not move, and the spring 21 is in an extended state.

From ON Time of Switch 113 to STP Mode (FIGS. 21(a) to 23(c))

When the switch 113 is turned ON, the power motor 120 is started, and rotary force of the power motor 120 rotates the cam gear 30 counterclockwise to move the pin 31 along the first groove 139. Thereby, the slide plate 17 (FIG. 4) is moved, and the slide plate 10 (FIG. 4) coupled with the slide plate 17 by the spring 21 is also moved integrally with the slide plate 17. When the slider 52 reaches a termination of the hole portion 51, the rotation of the ejector 53 is stopped. Thereafter, the pin 62 moves along a diagonal guide portion 151 (FIG. 4) provided in the slide plate 10. The movement rotates the holder arm 46 (FIG. 3) about the pin 62 in a direction of the arrow H (see FIGS. 23(a)–(c)). In the operation in conjunction therewith, engaging portions X, Y (FIG. 3) of the holder arm 46 and the cassette holder 44 are bent to move the cassette tape in a vertically downward direction, and the tape take-up hole is fitted into the reel rest, resulting in the cassette tape mounted at a cassette mounting position. While the slide plate 10 is moved, the end 149 of the detecting lever is in a state to be rotated in a thickness F direction of the slide plate 10. At a position immediately before mounting the cassette tape at the cassette mounting position, an engaging portion between the slide plate 10 and the detecting lever end 149 is notched (see a notch 152 in FIG. 20). Therefore, engagement between the slide plate 10 and the detecting lever end 149 is released, and the detecting lever 148 is pressed back to an original position (a position at a time of EJECT) by spring pressure of the switch 113, resulting in OFF.

However, the cassette tape mounted at the cassette mounting position may be a tape cassette which is neither a high position tape nor a metal tape. In this case, since a tape side portion is present, the detecting lever 148 can not be returned to the position at the time of EJECT, thereby holding an ON state of the switch 113. In the metal and high position tapes, a hole portion is provided in the tape side portion, and the detecting lever 148 enters the hole, thereby returning the switch 113 to an OFF state. Thus, it is possible to detect whether the tape is the metal and high position tapes or a normal tape. Here, the switch 113 serves as a starting switch of the power motor 120, and also serves as a cassette type discriminating switch. The switch 113 is switched over by a microcomputer according to each mode of the mode detecting switch 111. At a time of completion of the cassette tape carry in/out operation, that is, from the STP mode to mode having a large angle of rotation, even after the slide plate 10 is stopped at the guide terminal end, the pin 31 engaging the first groove portion 139 in the cam gear 30 is moved to move the slide plate 17 by a distance which is slightly longer than a length to the guide terminal end of the slide plate 10 so as to stop the slide plate 17 after the movement. The position of the slide plate 17 is fixed by the first groove 139 in the cam gear 30 so that elastic force of the spring 21 provides preload in a direction A for the slide plate 10. Consequently, the preload is transferred to the pin 59 through the diagonal cam groove 151 so as to provide urging force to the holder arm 46 in the direction of the arrow H (FIGS. 23(a)–(c)), thereby holding the cassette tape at the cassette mounting position.

From STP Mode to FR Mode (FIGS. 23(a)–(c) and 24(a)–(c))

The cassette carry in operation is ended when the cassette tape is mounted at the cassette mounting position. Since other operations are controlled by the rotation of the cam gear 30, the first groove 139 is positioned to have the same radius from a center of the cam gear 30 so as not to move the pin 31 in the FR and earlier modes.

Cassette Carry Out Operation

A cassette carry out operation is reverse to the above operation.

Playback Running Direction Switching Operation

FIGS. 25 to 32 are diagrams showing the operation of the playback running direction switching mechanism in each mode.

From EJ Mode to AR Mode (FIGS. 25 to 28)

From the EJ mode to the AR mode, there is no operation because a playback running direction is switched. Hence, the pin 31 moves in the second groove 140 at a position having the same diameter from the center of the cam gear 30.

Figure 29:
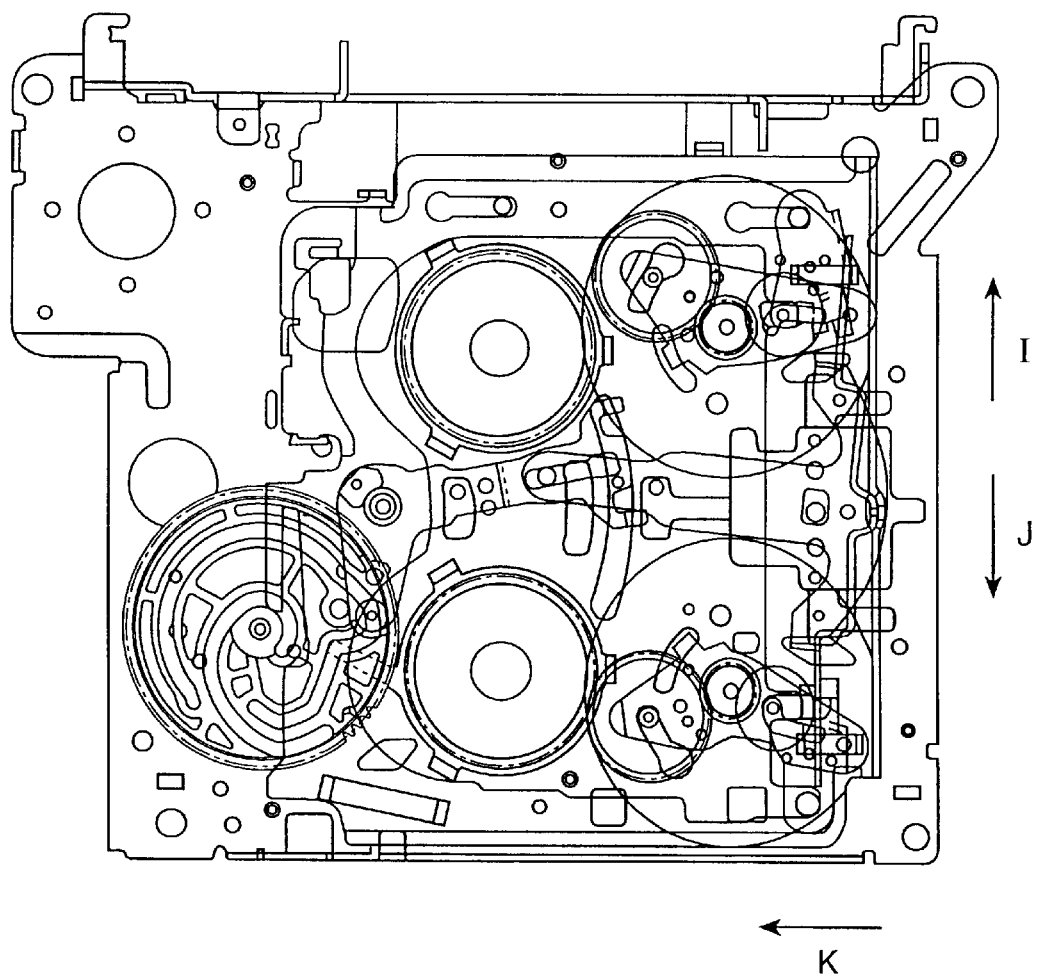
FIG. 29 is an explanatory view for explaining the operation in the embodiment of the cam gear according to the present invention.
Figure 30:
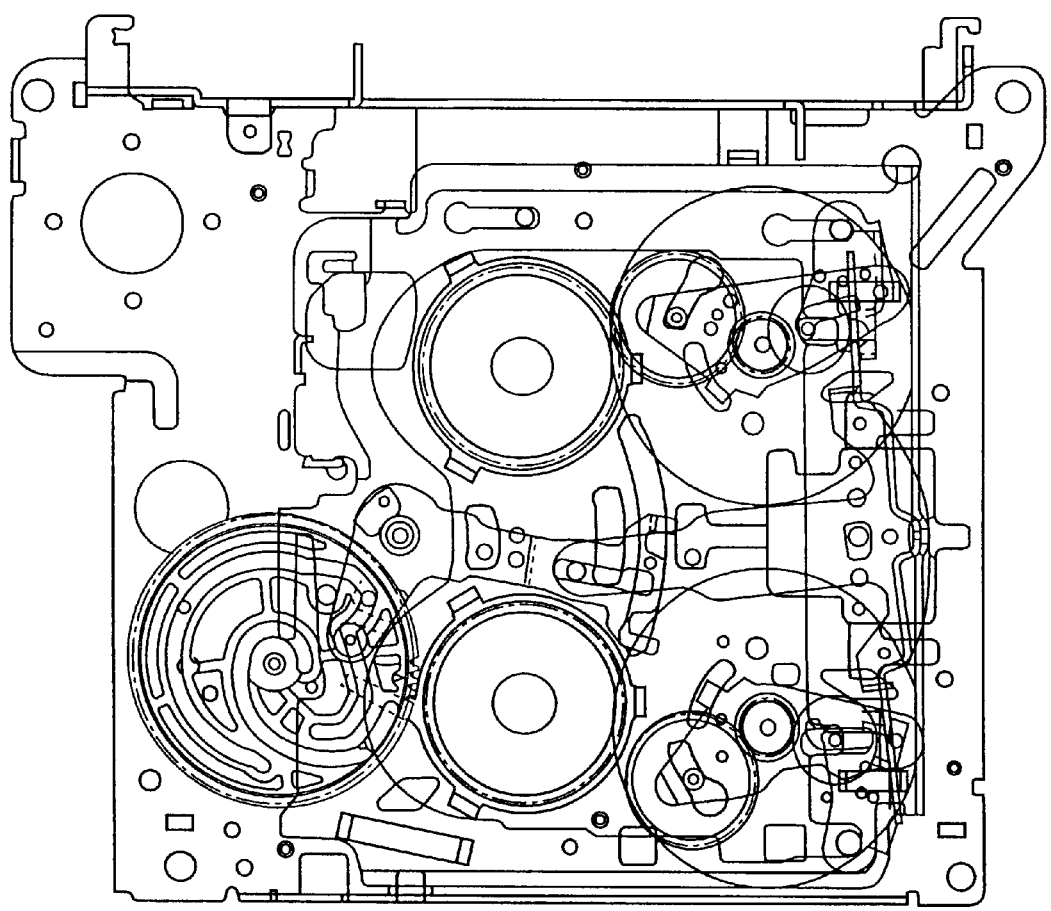
FIG. 30 is an explanatory view for explaining the operation in the embodiment of the cam gear according to the present invention.
Figure 31:
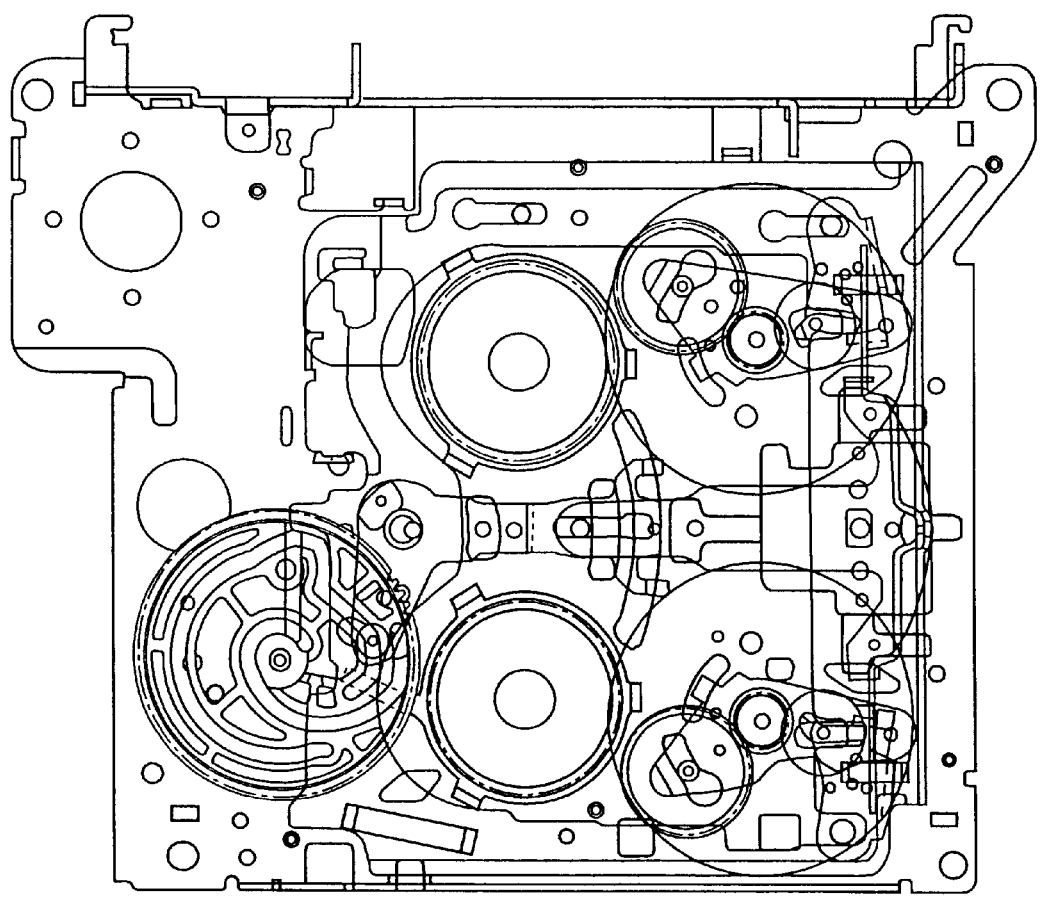
FIG. 31 is an explanatory view for explaining the operation in the embodiment of the cam gear according to the present invention.
Figure 32:
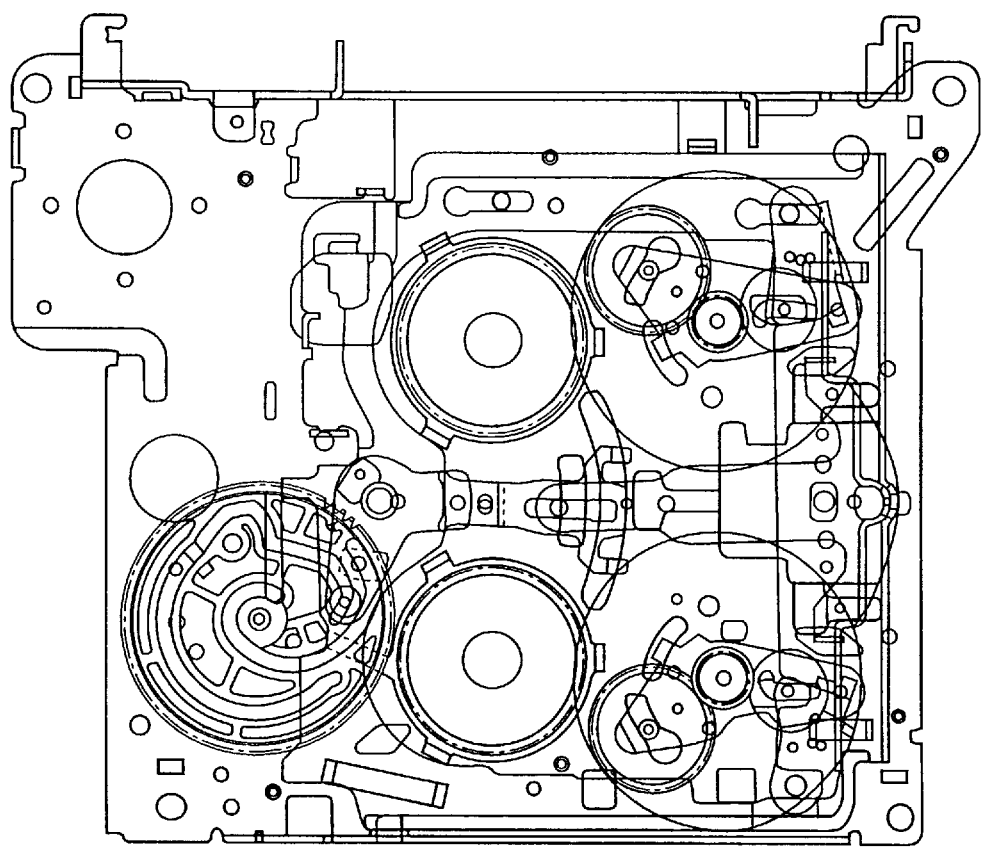
FIG. 32 is an explanatory view for explaining the operation in the embodiment of the cam gear according to the present invention.

From RP Mode to LP Mode (FIGS. 29 and 30)

In the RP mode, the movement of the pin 65 rotates the lever 64 in a direction of the arrow I, and according thereto, the switching arm 70 is rotated in a J direction opposed to the direction of the arrow I. According to the rotation, the spring 76 is rotated about the convex portion 72 in a direction of the arrow K, and the pinch arm 33a engaging the spring 76 is rotated to press the pinch roller 82a onto the capstan 85 to clamp the tape therebetween. At the same time, the gear 840a is attached to the gear arm 83a to continuously engage a small gear of a flywheel 121a, and engages the reel rest lower portion 93a to transfer driving force of the flywheel to the reel rest. A playback operation can be thereby performed. In the LP mode, the switching arm 70 is rotated in the I direction opposed to the arrow J, and later operation is as in the case of the above operation. As a result, the pinch roller engages a shaft of the flywheel through the tape to perform the playback operation in a direction opposed to the direction in the above case.

From AR Mode to FR Mode

Since no operation is required between these modes, a stand by state is held at the same position as that in the EJ mode to the AR mode.

Head Driving Operation

FIGS. 34 to 41 are diagrams showing a head driving operation.

Figure 34:
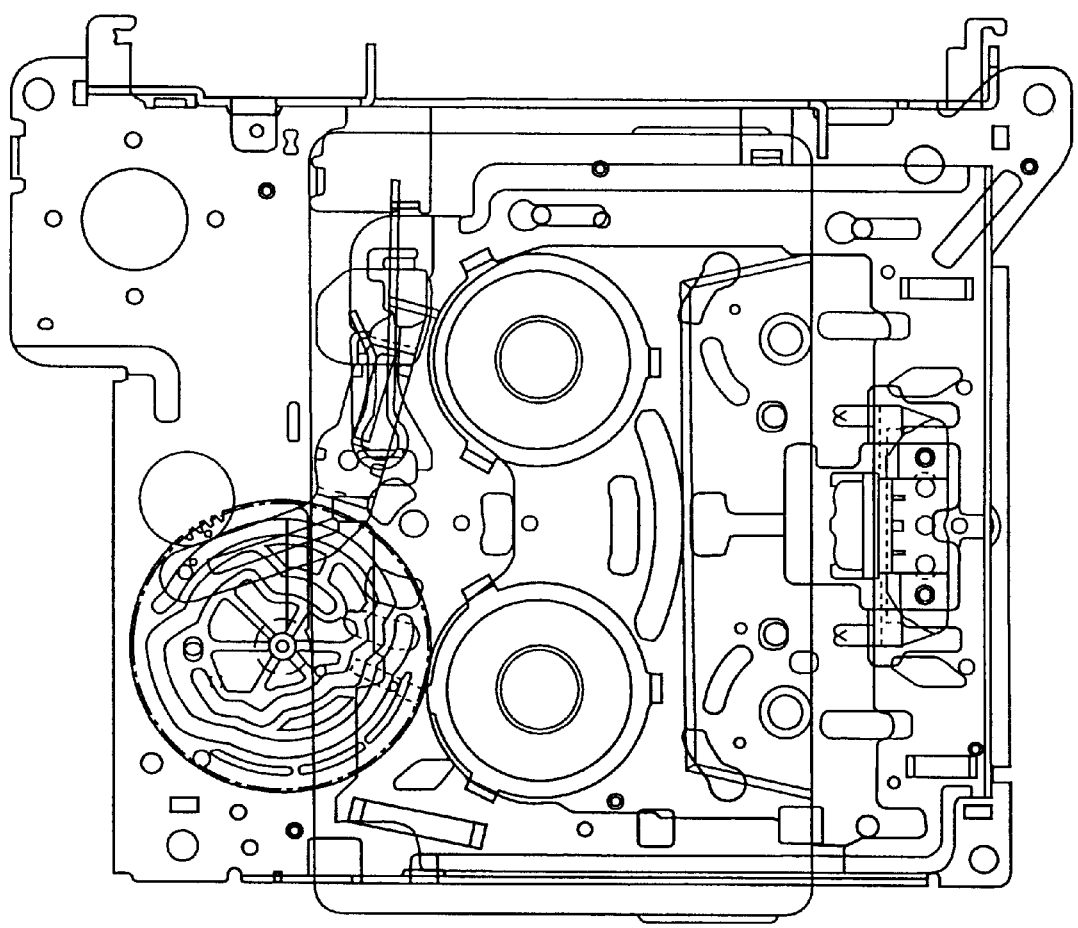
FIG. 34 is an explanatory view for explaining the operation in the embodiment of the cam gear according to the present invention.

EJ Mode (FIG. 34)

The head 4 is positioned farthest from the tape to provide a state where the head stands by outside the cassette tape.

Figure 35:
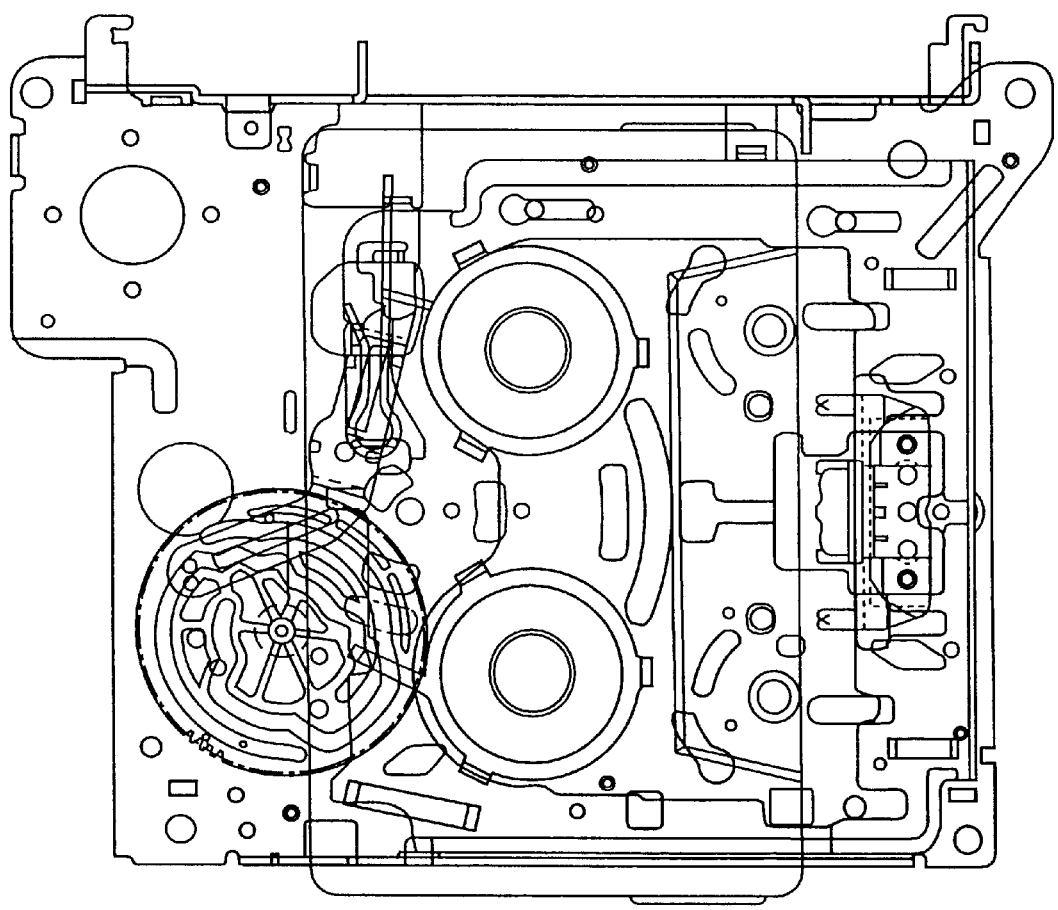
FIG. 35 is an explanatory view for explaining the operation in the embodiment of the cam gear according to the present invention.

STP Mode (FIG. 35)

In order to proceed the next mode, the head 4 is somewhat closer to the tape than would be in the EJECT mode. However, there is the state where the head stands by outside the cassette tape.

In case a rotary head is employed for the DCC or the like, the head 4 is rotated at the position by 180° during an auto-reverse operation so as to enable playback of both sides of the tape.

Figure 36:
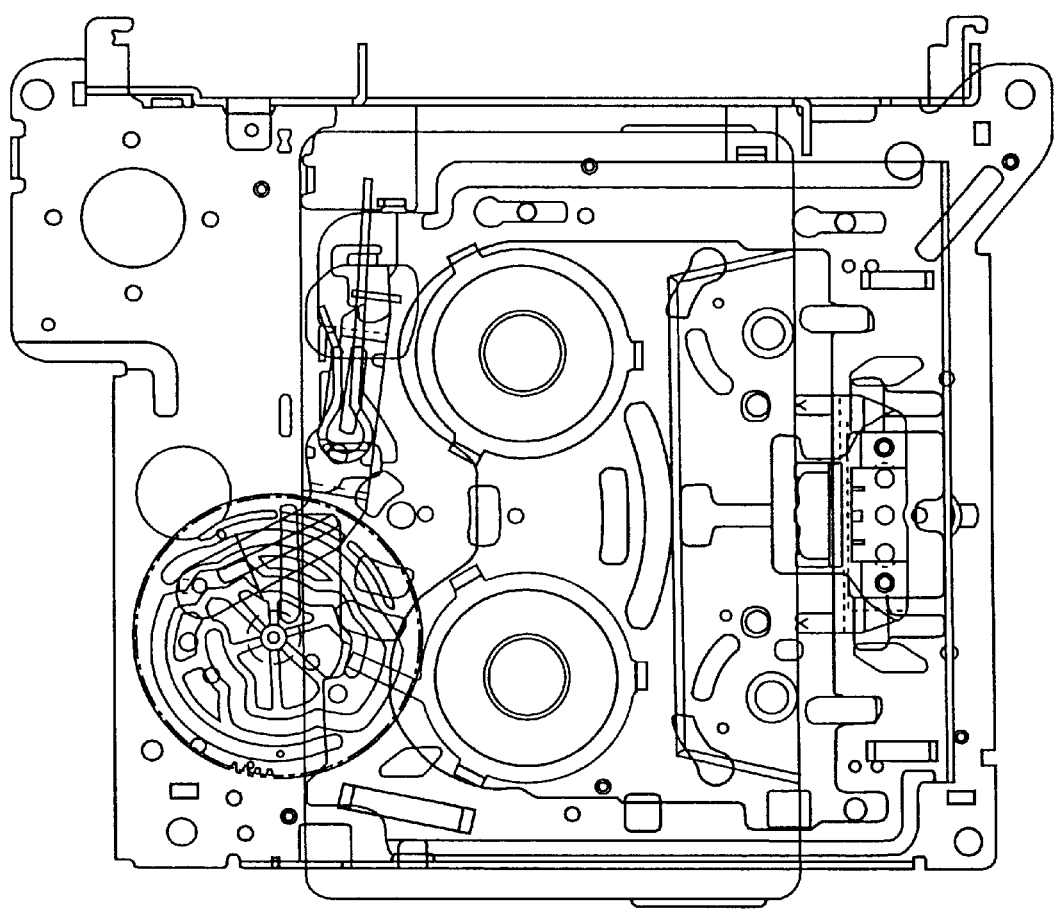
FIG. 36 is an explanatory view for explaining the operation in the embodiment of the cam gear according to the present invention.

FL Mode (FIG. 36)

The driving lever 87 is rotated to engage the claw portion 89 with the spring 90 so as to press the head 4. Consequently, the head 4 further approaches the tape, and slack of the tape is also removed at this position. In case there is a tape setting error or the like during removing the slack, the tape is not correctly set so that the head may contact a cassette tape half. In order to prevent the head from contacting the cassette tape half, the head never enters inside the cassette tape in such a case.

Figure 37:
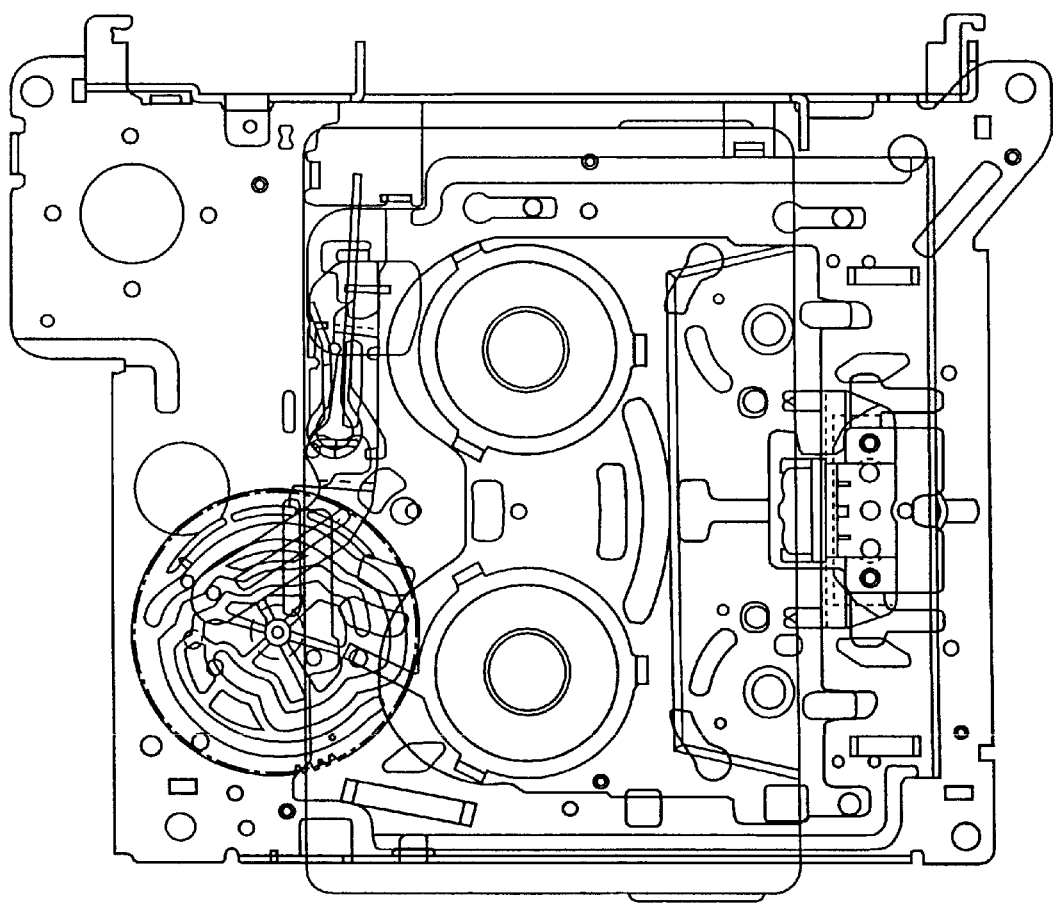
FIG. 37 is an explanatory view for explaining the operation in the embodiment of the cam gear according to the present invention.
Figure 40:
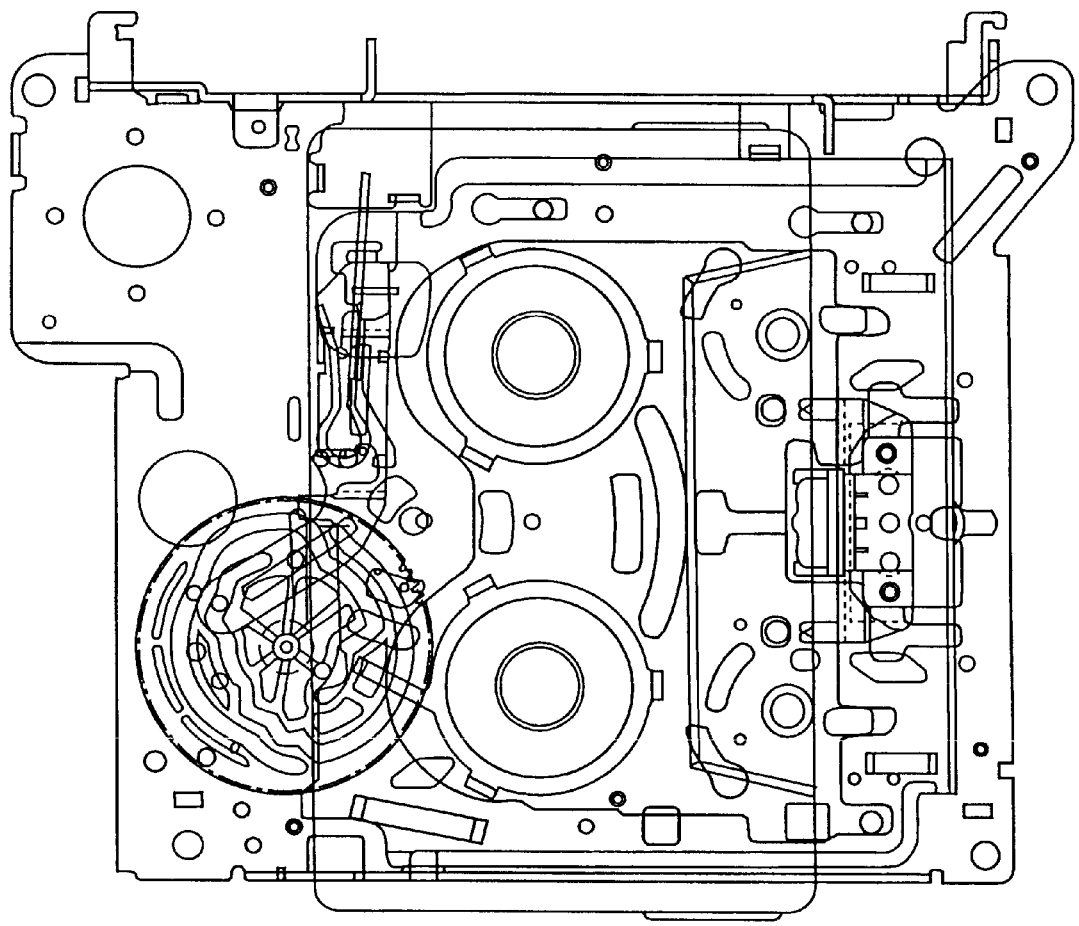
FIG. 40 is an explanatory view for explaining the operation in the embodiment of the cam gear according to the present invention.
Figure 41:
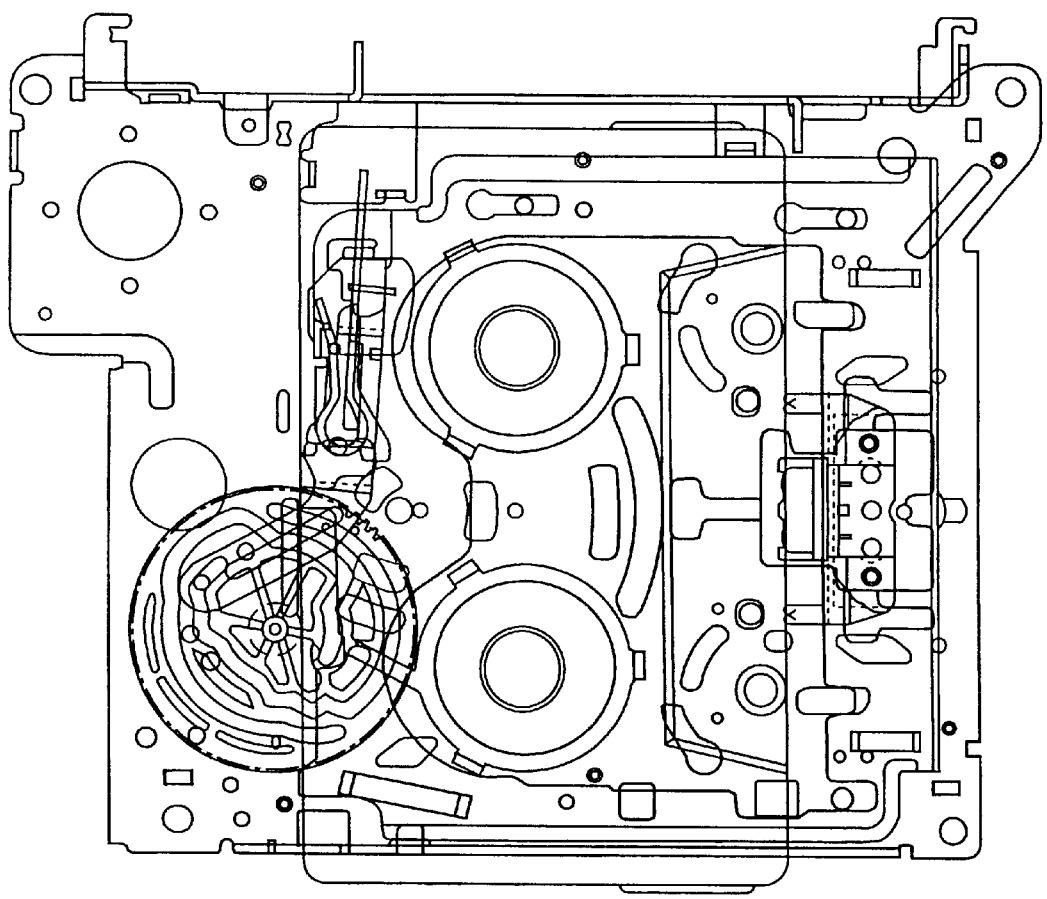
FIG. 41 is an explanatory view for explaining the operation in the embodiment of the cam gear according to the present invention.

AL Mode and AR Mode (FIGS. 37 and 40)

The head base 74 is moved by the claw portion 89 pushing the spring 90, resulting in the head 4 contacting the tape.

Figure 38:
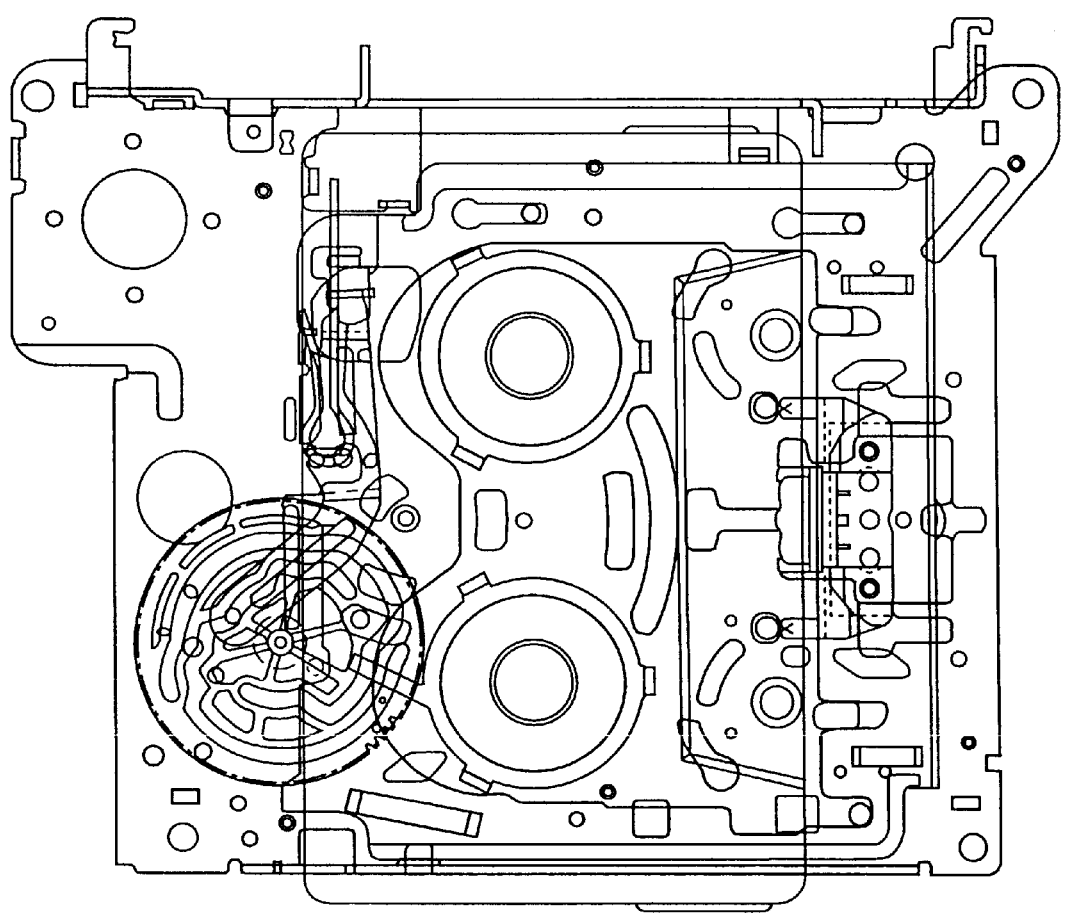
FIG. 38 is an explanatory view for explaining the operation in the embodiment of the cam gear according to the present invention.
Figure 39:
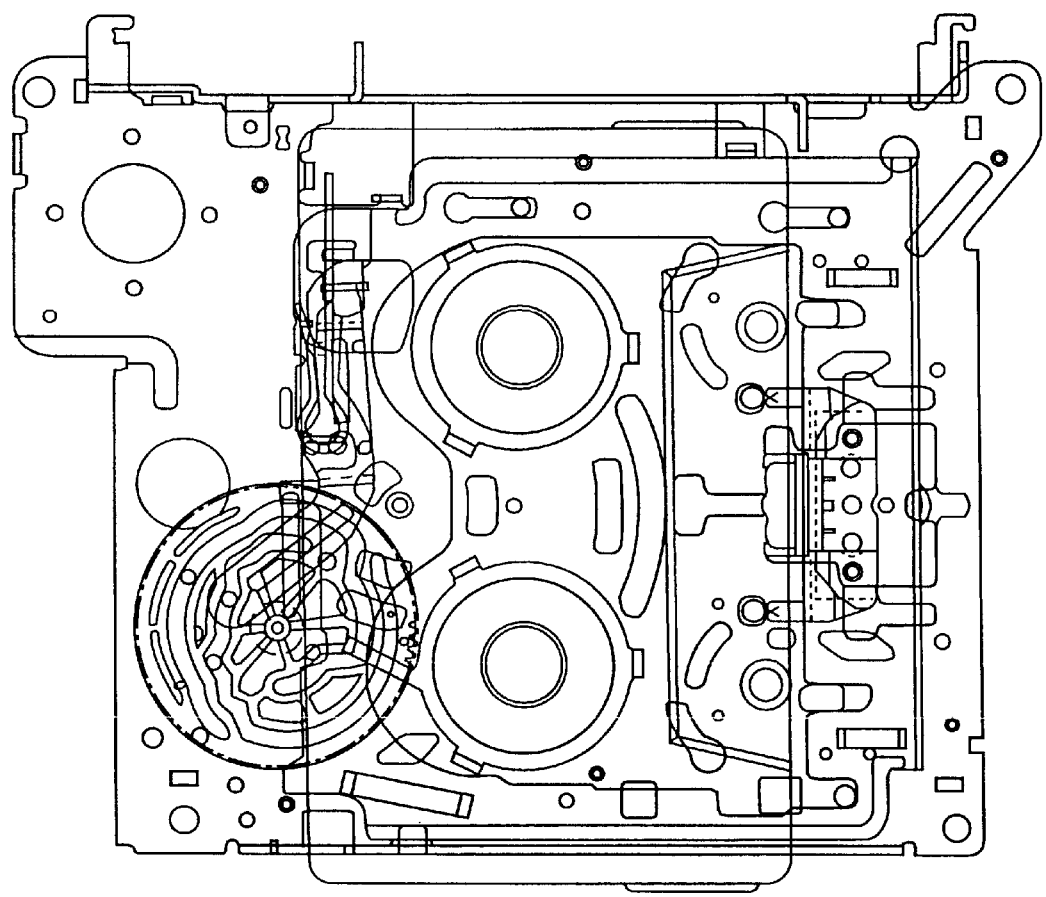
FIG. 39 is an explanatory view for explaining the operation in the embodiment of the cam gear according to the present invention.

RP Mode and LP Mode (FIGS. 38 and 39)

The claw portion 89 further pushes the spring 90 to contact the head 4 with the tape under pressure. At this time, forward movement of the head base 74 is restricted by the pin notches 80c and 80d (see FIG. 6).

FR Mode

The claw portion 89 moves in a direction apart from the spring 90 to push and move the head base 74. Thereby, the spring 90 can be returned to the same state as that in the fast forward mode. In this mode, a distance between the head 4 and the tape is shorter than that between the tape and the head in the fast forward mode.

Selective Operation to Transfer Driving Force to Reel Rest During Fast Forward FIGS. 42 to 49 show the selective operation to transfer the driving force to the reel rest during fast forward for each mode. A description will now be given for each mode.

Figure 42:
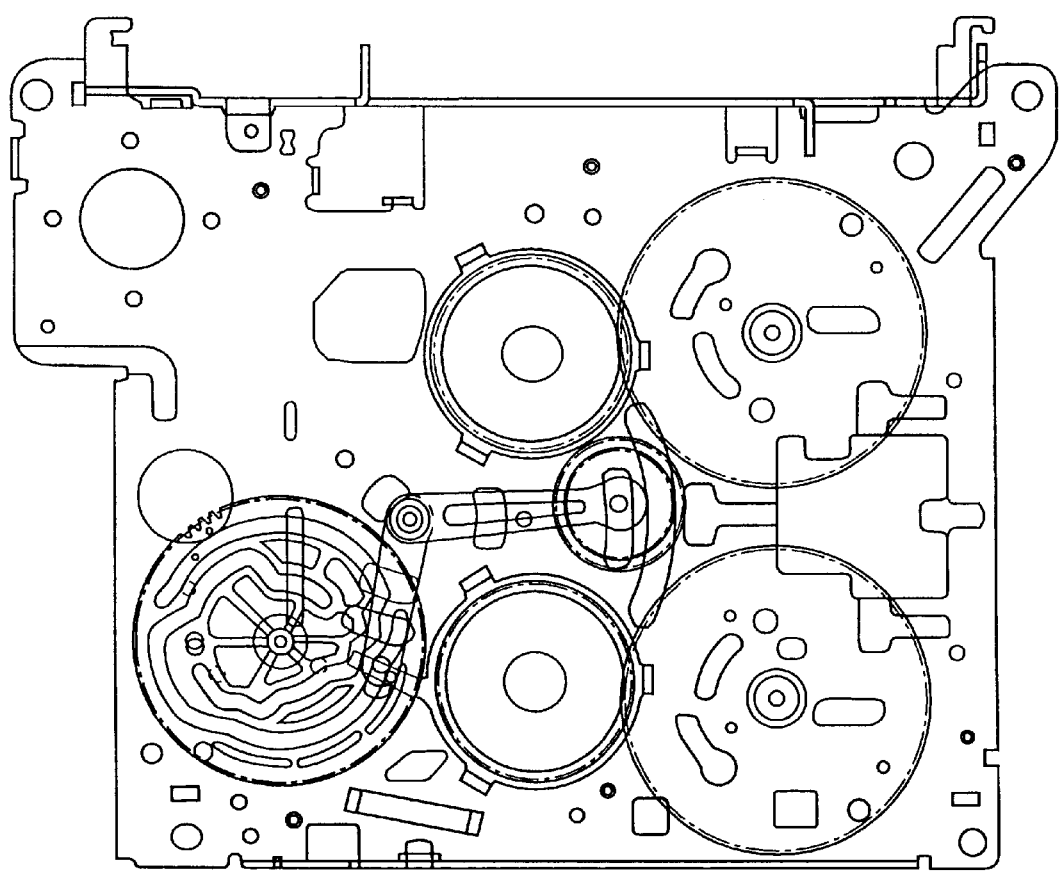
FIG. 42 is an explanatory view for explaining the operation in the embodiment of the cam gear according to the present invention.
Figure 43:
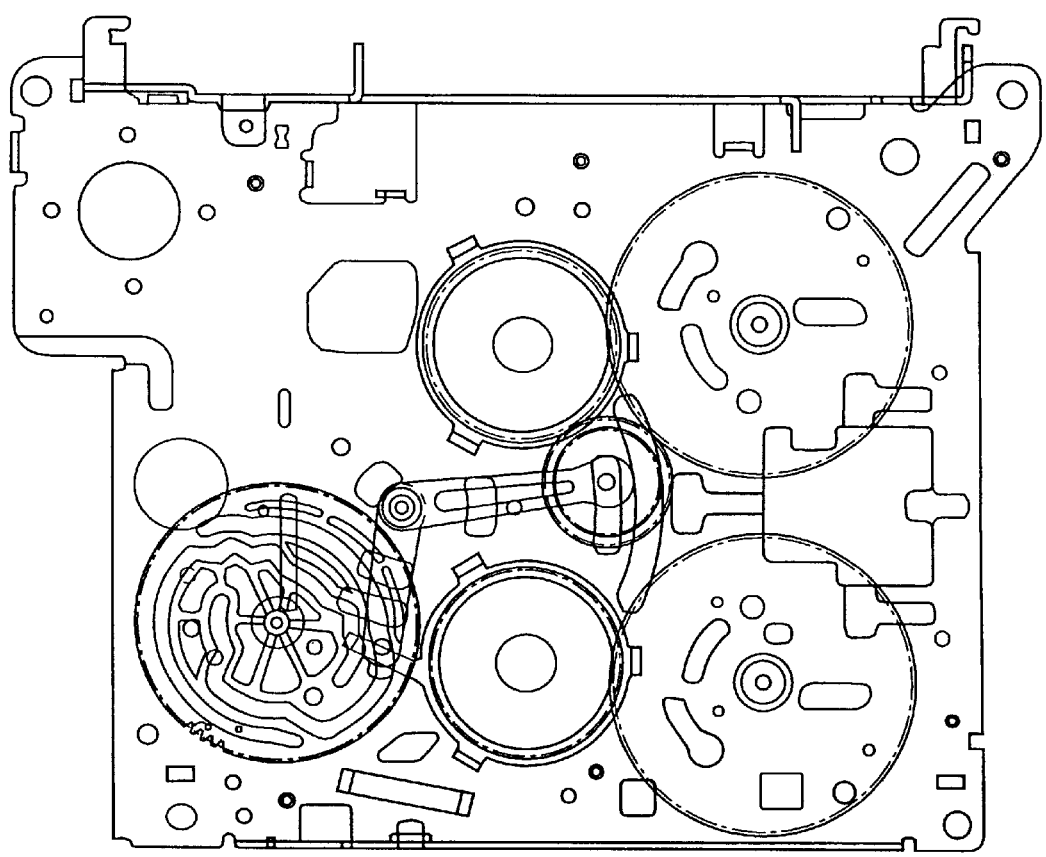
FIG. 43 is an explanatory view for explaining the operation in the embodiment of the cam gear according to the present invention.

From EJ Mode to STP Mode (FIGS. 42 and 43)

The convex portion 123 moves on a groove having substantially the same diameter from the center of the cam gear 30. Therefore, the idler gear 126 attached to the switching arm 124 does not engage any one of the flywheels and the reel rests.

STP Mode (FIG. 43)

In order to proceed to the next mode, after the EJ mode and the STP mode, the switching arm 124 is rotated counterclockwise to move the idler gear 126 closer to the reel rest lower portion 93b, and a large gear of a flywheel 121b.

Figure 44:
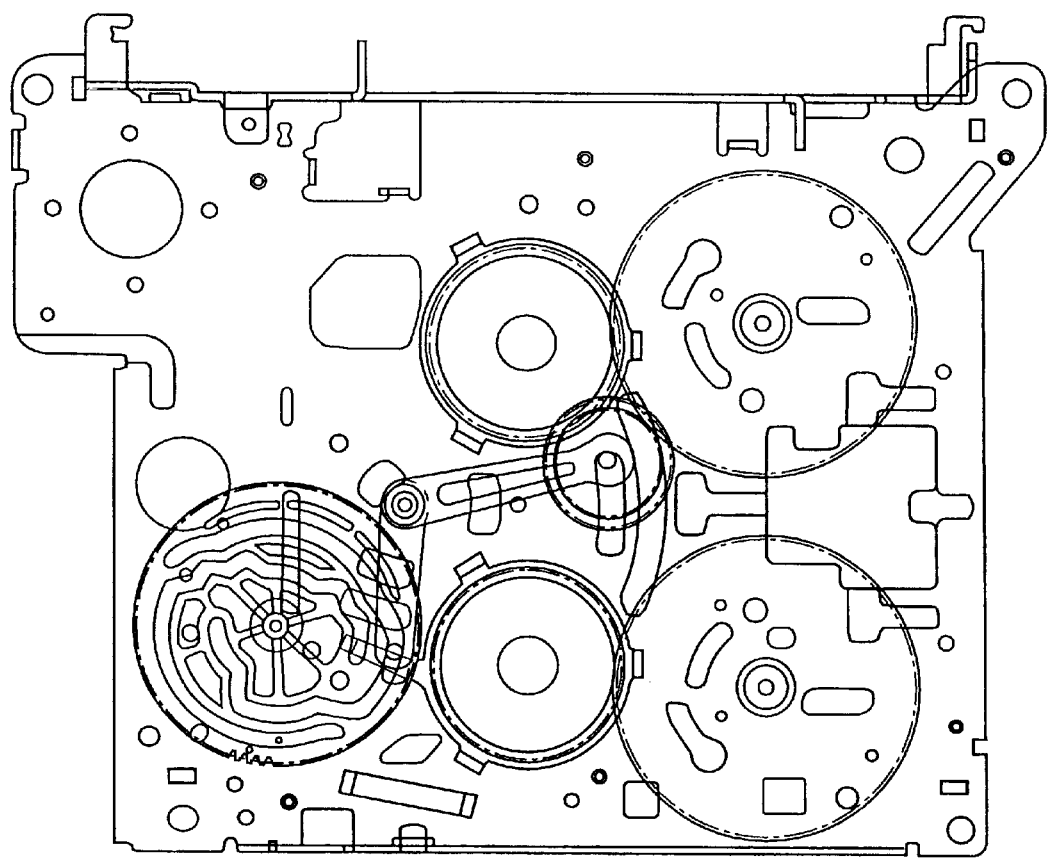
FIG. 44 is an explanatory view for explaining the operation in the embodiment of the cam gear according to the present invention.
Figure 45:
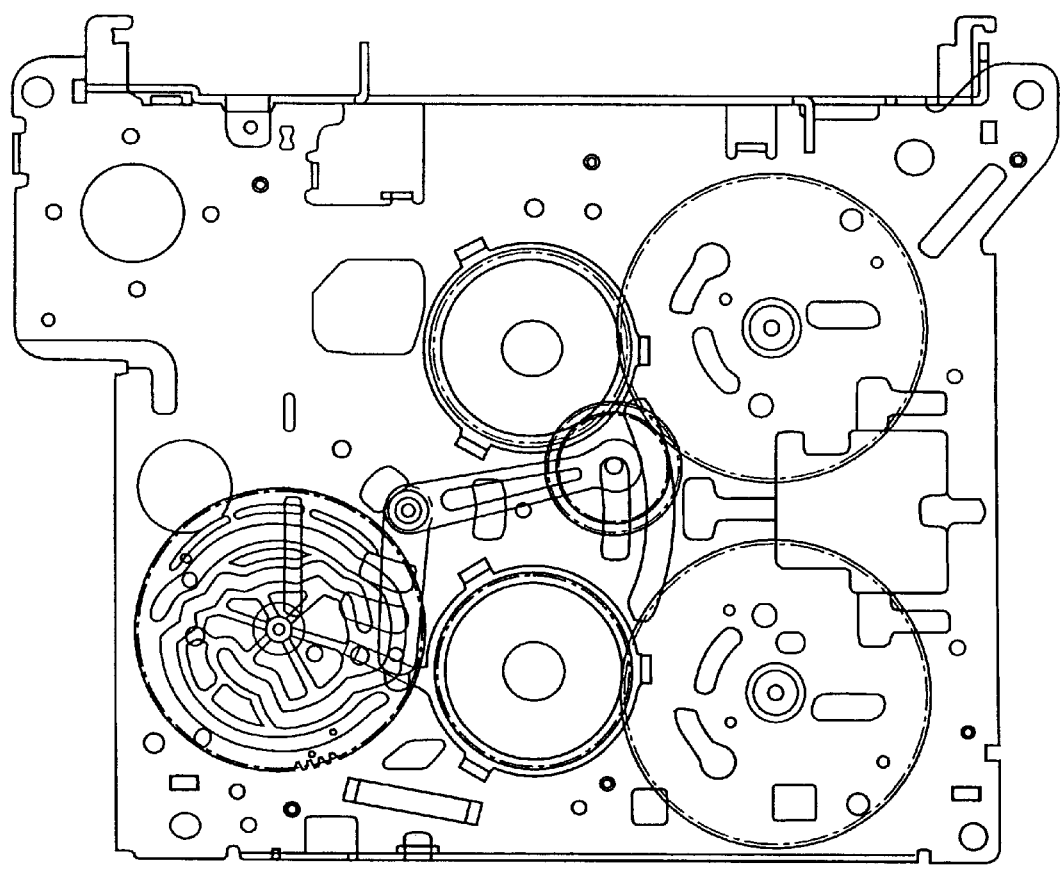
FIG. 45 is an explanatory view for explaining the operation in the embodiment of the cam gear according to the present invention.

FL Mode and AL Mode (FIGS. 44 and 45)

The switching arm 124 is further rotated to engage the idler gear 126 with both the flywheel and the reel rest, and transfer driving force of the flywheel 121b to the reel rest lower portion 93b.

Figure 46:
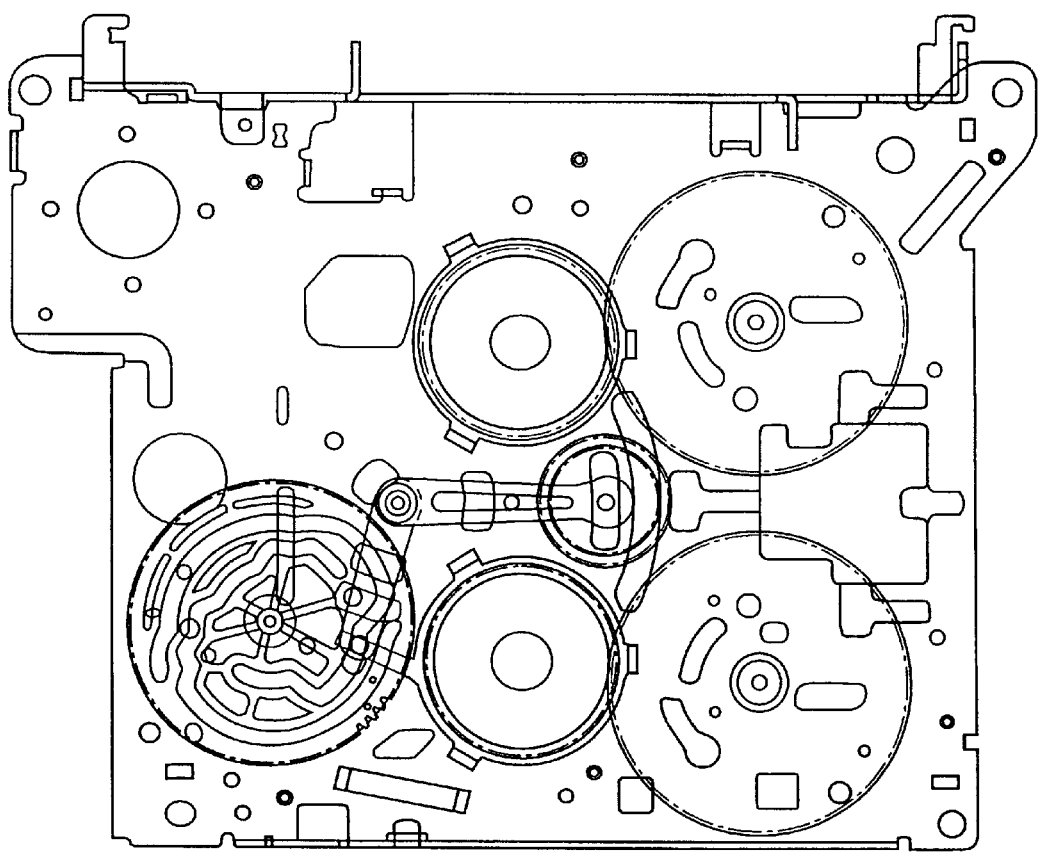
FIG. 46 is an explanatory view for explaining the operation in the embodiment of the cam gear according to the present invention.
Figure 47:
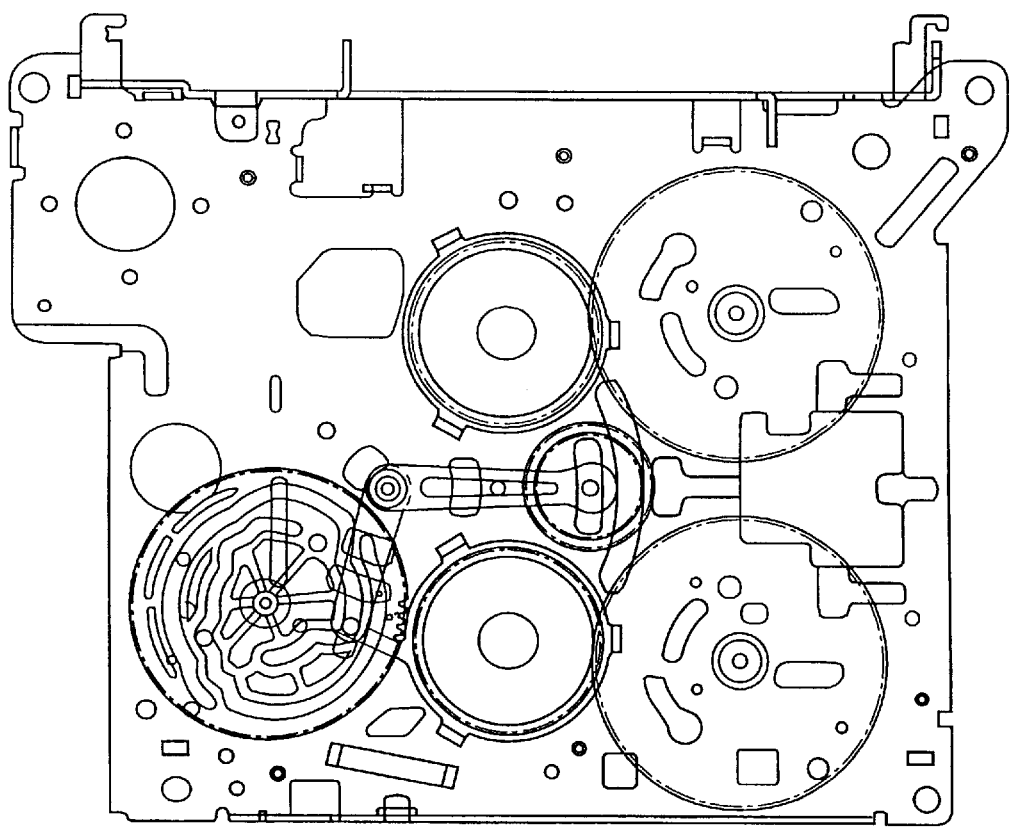
FIG. 47 is an explanatory view for explaining the operation in the embodiment of the cam gear according to the present invention.

LP Mode and RP Mode (FIGS. 46 and 47)

The switching arm 124 is reversely rotated to backward move the idler gear 126 to the same position as that in the EJ mode and the STP mode.

Figure 48:
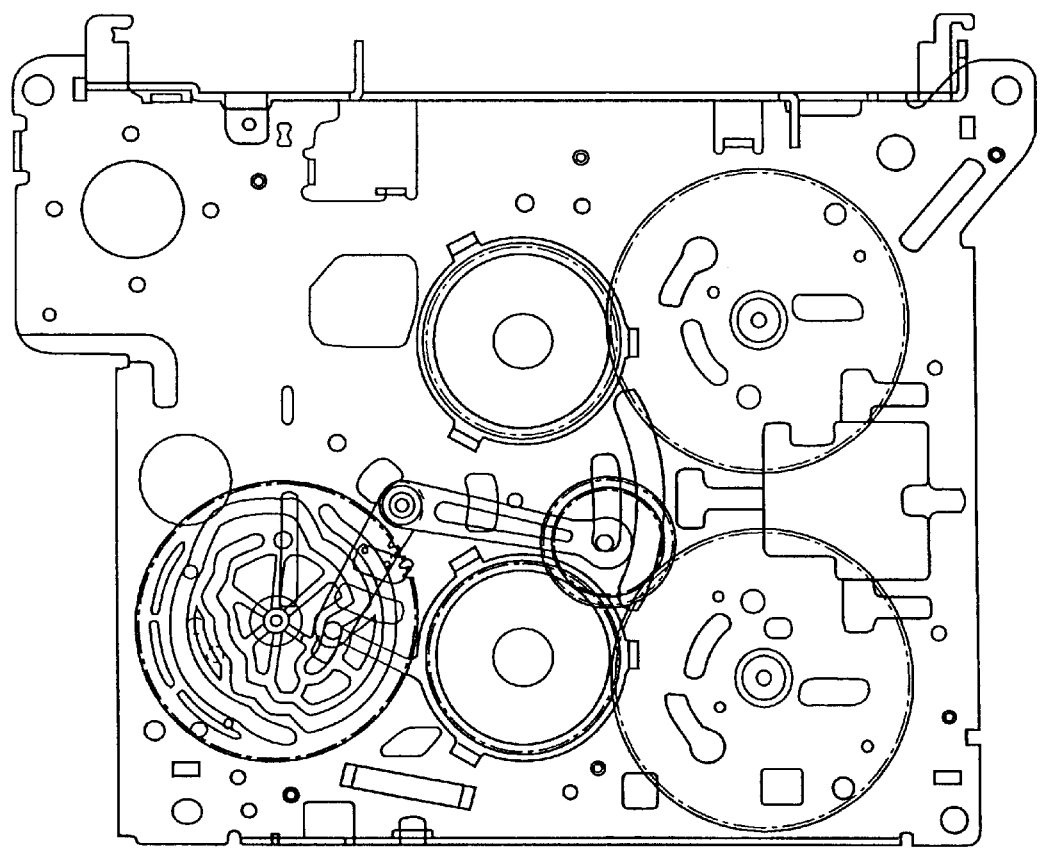
FIG. 48 is an explanatory view for explaining the operation in the embodiment of the cam gear according to the present invention.
Figure 49:
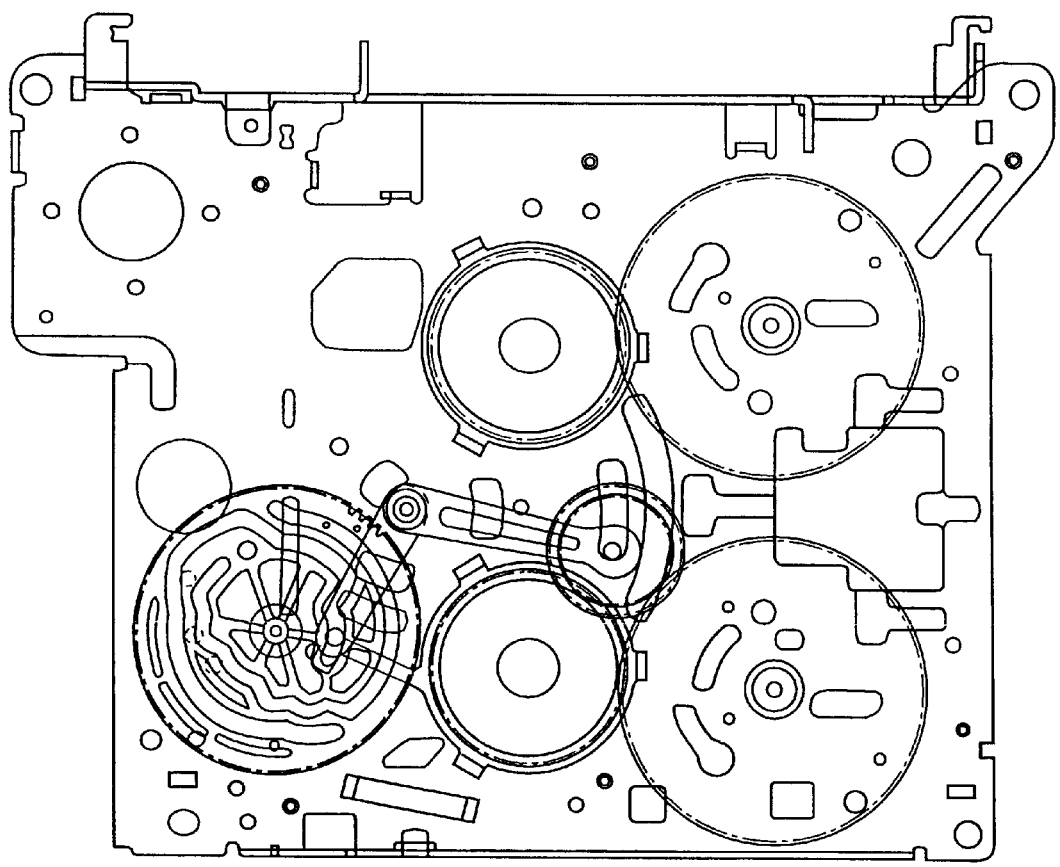
FIG. 49 is an explanatory view for explaining the operation in the embodiment of the cam gear according to the present invention.

AR Mode and FR Mode (FIGS. 48 and 49)

The switching arm 124 is further reversely rotated to engage the idler gear 126 with both of the flywheel 121a and the reel rest lower portion 93a so as to transfer the driving force of the flywheel to the reel rest.

Description of Entire Operation

Figure 50:
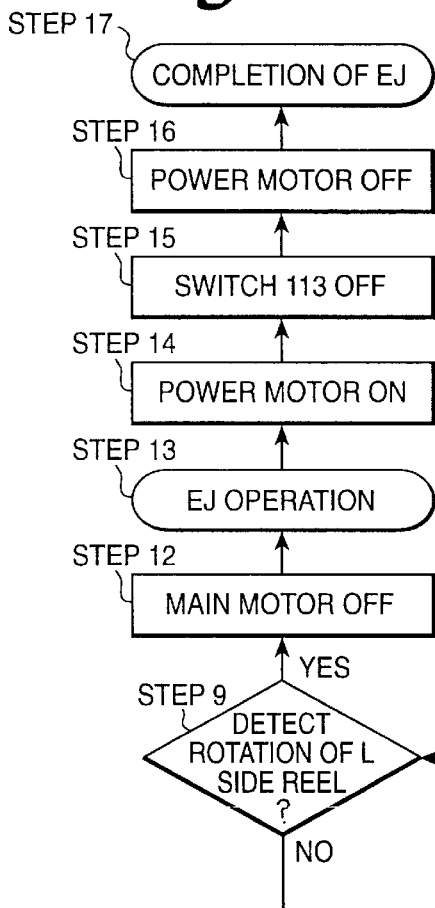
FIG. 50 is a flowchart showing a series of operation proceeding from EJ mode to PL mode in the embodiment according to the present invention.
Figure 50:
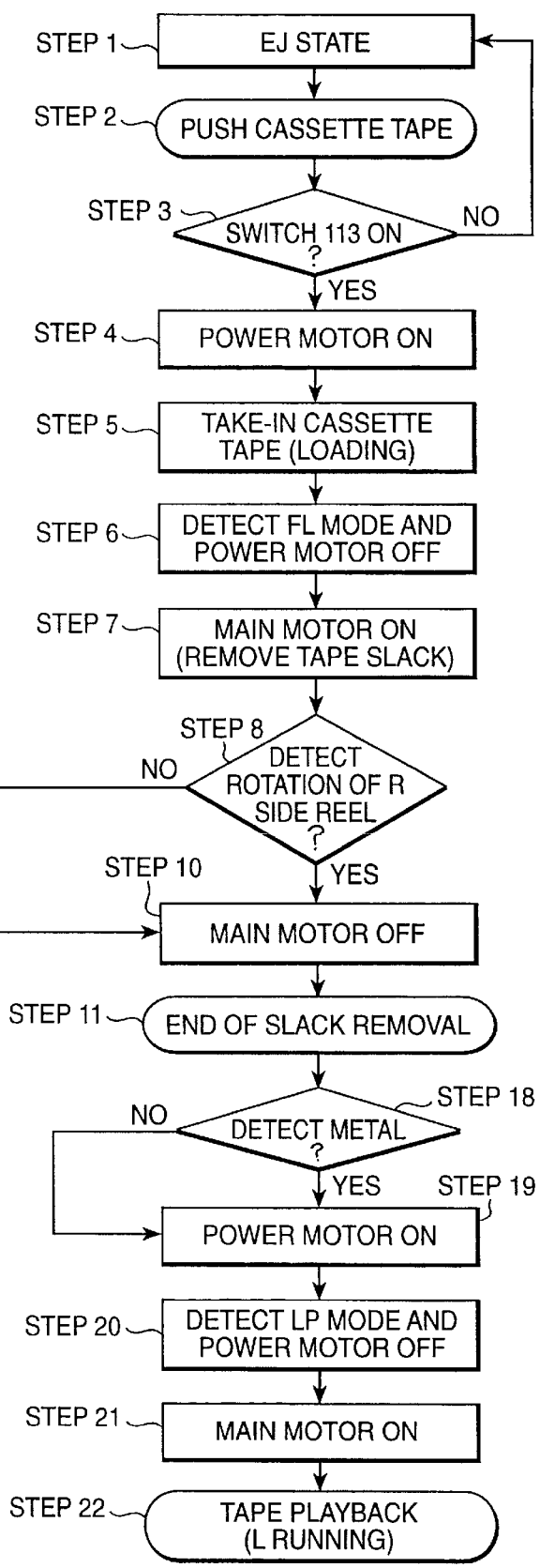
Figure 51:
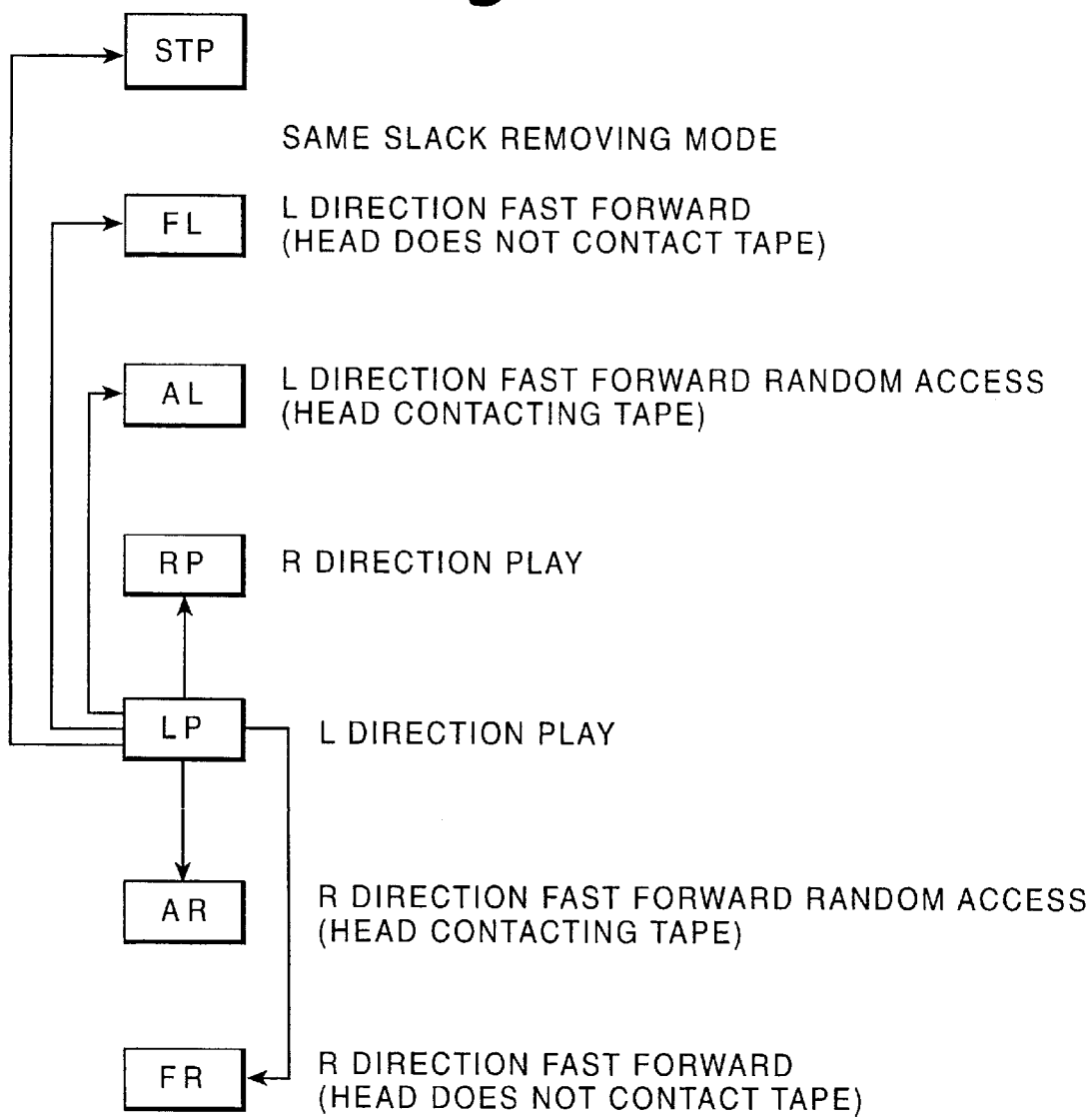
FIG. 51 is a diagram showing mode transition in the embodiment according to the present invention.

FIGS. 50 and 51 show a series of entire operation of the tape player including each operation as set forth above. A description will now be given of the entire operation.

FIG. 50 is a flowchart showing a series of operation proceeding from the EJ mode to the LP mode in the embodiment according to the present invention. The operation from STEP 1 to STEP 5 has been described in the above discussion concerning to the cassette tape carry in/out operation, and a description thereof is omitted. In STEP 6, the FL mode of the cam gear 30 is detected by the mode detecting switch 111 to turn OFF the power motor 120. Subsequently, the main motor 5 is turned ON in STEP 7 to remove the tape slack by the fast forward operation. When any variation occurs in a terminal end detecting pulse serving as output from the rotation detecting sensor 114 of a tape feeding side reel, it is regarded that the slack is completely removed, and the main motor is turned OFF (in STEP 10) and the slack removing operation is ended (in STEP 11). Alternatively, when there is no tape on the feeding side reel, a microcomputer decides depending upon no rotation of both the reels that the terminal end is reached, and the slack removing operation is ended (in STEPs 9, 10, and 11). In case the slack removing operation is not ended even after the elapse of several seconds from a starting time of the tape fast forward operation, it is regarded that the slack removing operation is failed, thereafter ejecting the tape. When the tape is cut off, or the cassette tape is positioned on the reel due to erroneous setting, it is decided that abnormality occurs because the feeding side reel can not rotate though a receiving side reel rotates, resulting in the EJECT operation (in STEPs 9 to 16). In STEP 18, it is decided whether the tape is the metal and high position tapes or the normal tape by detecting whether a switch A is ON or OFF. Thereafter, the power motor is turned ON again, and the power motor is turned OFF at a time when the mode detecting switch 111 detects either the LP mode or the RP mode (in STEP 20). In the above discussion illustrating the four operations, descriptions have been given of the operation of the respective mechanisms with respect to movement of the cam gear 30 during the above operation, and descriptions thereof are omitted. Thereafter, the main motor is turned ON, and the capstans (flywheels) are rotated to provide a playback state (in STEPs 21 and 22).

FIG. 51 is a state diagram showing a state where the operation proceeds from the LP mode.

The operation can proceed from the LP mode to the next mode as follows:

(1) Transition from LP Mode to RP Mode
  In case both the L and R reels are stopped at a terminal end of L playback
  In case the running switching (not shown) is turned ON during L playback
(2) Transition from LP Mode to AL Mode
  In case a random access switch is turned ON to search the next tune (or the tune after next, the third tune, or the like) during L playback (3) Transition from LP Mode to FL Mode In case the fast forward switch is turned ON during L playback In case there is a blank for a period of a predetermined time or more during L playback (blank skip)

(4) Transition from LP Mode to AR Mode

In case a random access switch is turned ON to search a current tune (or the last tune, two tunes before, or the like) during L playback (5) Transition from LP Mode to FR Mode In case a rewind (REW) switch is turned ON during L playback (6) Transition from LP Mode to STP Mode In case a key of a vehicle is turned OFF during L playback The same transition holds true for a case where the operation proceeds from the RP mode to another mode.

Further, as shown in FIG. 19, OVERRUN modes (OR1 and OR2 in FIG. 19) are provided on the respective overrun sides of the EJECT mode and the REWIND mode of a mode switch. Thus, even if the EJ mode and the FR mode are not detected erroneously and passed by, the OVERRUN modes are detected to perform the backward operation (reversing).

Other Embodiments

Figure 57:
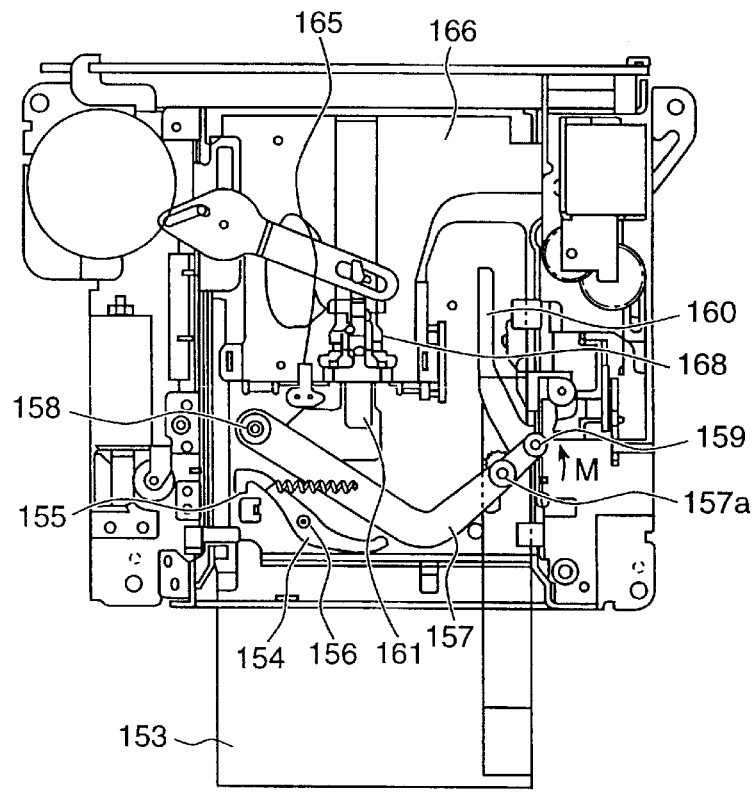
FIG. 57 is a plan view showing another embodiment of a tape player according to the present invention.

FIG. 57 shows a tape player on which the DCC can also be played back and recorded. The tape player is different from the above-mentioned tape player in the cassette tape carry in/out operation, and a description will chiefly be given of the difference.

The DCC is different from the compact cassette in two points that the DCC has no tape rewind through-hole, and that the DCC has a sliding shutter to protect a tape. Consequently, descriptions will now be given of a mechanism of a slider portion for securely holding the cassette tape until the tape is mounted on the reel rest, and of the operation to open the shutter.

When a DCC 153 is inserted, an end 155 of a lever 154 engages a distal end of the cassette tape. Thereby, the lever 154 is rotated about a point 156 to press an arm 157. This pressing force starts rotation of the arm 157 about a shaft 158, and in conjunction with the movement, an engaging portion 159 provided at a distal end of the arm 157 is rotated about a shaft 157a in a direction of the arrow M to engage a notch provided in the shutter of the DCC at the vicinity of an end on the side of a cassette main body. In case of the compact cassette tape, since such a notch is not provided in the cassette main body, the engaging portion 159 only slides on a side surface of the cassette opening side at the position. In case of the engaging DCC, while the engaging portion 159 engaging, the engaging portion 159 is guided by a guide hole 160 to open the shutter by sliding the shutter.

Figure 58:
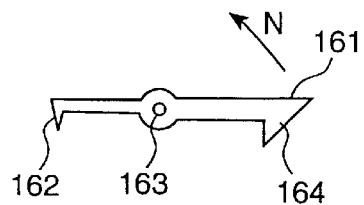
FIG. 58 is a diagram showing an embodiment of a slider portion according to the present invention.
Figure 59:
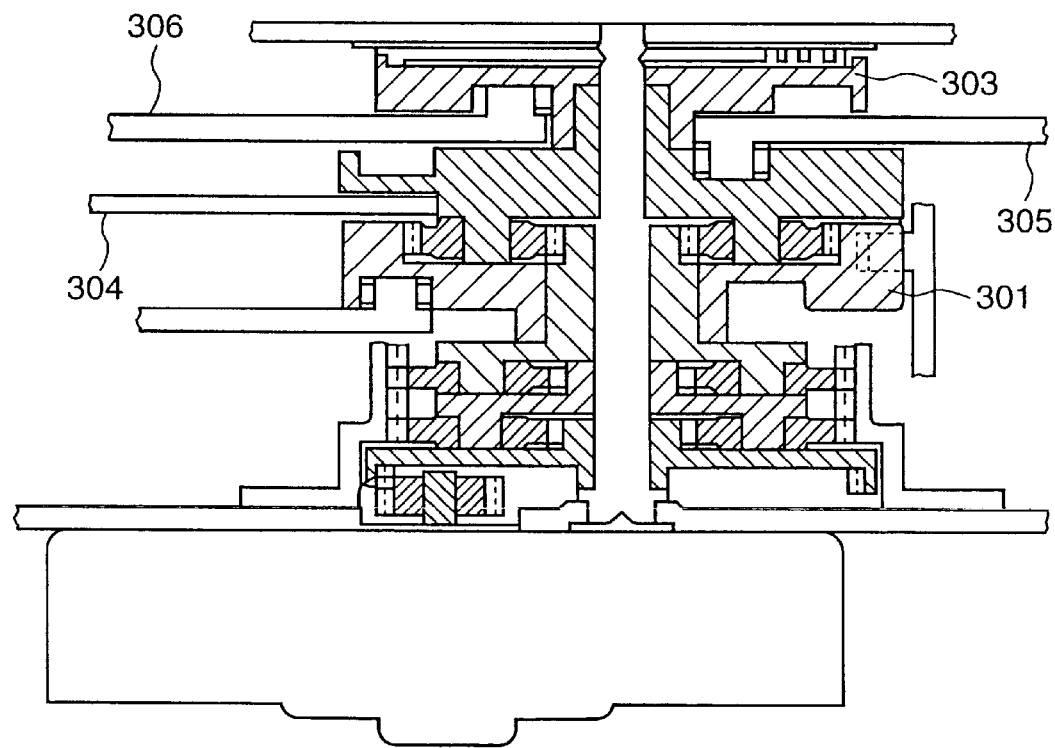
FIG. 59 is a sectional view of a cam device in a conventional tape player.

The slider portion includes a base portion 168 to slide in an elongated hole 167 in a holder arm 166, and a lever 161. As shown in a side view of FIG. 58, a claw portion 164 extends from one end of the lever to engage a hole portion in the cassette tape set forth above, and a claw portion 162 extends from the other end thereof to engage a groove provided in the DCC. In the lever 161, members having the claw portions 164 and 162 are supported by the base portion 168 substantially at an intermediate portion 163 to serve as seesaw or the like.

A holding groove is provided in the DCC to hold the cassette. When the DCC is inserted into a cassette holder, the holding groove first engages the claw portion 164 of the slider 161. When the DCC is further inserted, the claw portion 164 of the slider is released from the holding groove by using a slope portion to slide onto the DCC. Sliding onto the DCC rotates the lever 161 in a direction of the arrow N to downward direct the claw portion 162. The claw portion 162 engages the holding groove of the inserted DCC. In order to ensure the engagement, a peripheral portion of the elongated hole 167 in the holder arm 166 may be formed to become slightly higher, and a guide portion provided for the lever 161 may be slid onto the peripheral portion so as to further direct the claw portion 162 downward. When the DCC is moved to a terminal end of guide, and is lowered in a reel rest direction, the engagement between the holding groove and the claw portion 162 is easily released. Therefore, an elastic member 165 may press the engaging portion between the cassette holder and the holder arm as described in the first embodiment so as not to be bent before the reel rest is mounted into a reel rest inserting hole.

As in the case of the operation set forth above, the playback operation is performed after the cassette is mounted.

INDUSTRIAL APPLICABILITY

As set forth above, according to the present invention, a tape player is provided to operate pins engaging four different grooves provided in one disk-like cam to move in the respective grooves according to rotation of the disk-like cam, a member having a lever working in conjunction with the movement of the pins, for performing a carry in/out operation of a cassette tape engaging the lever by the operation of the lever, a member for a moving operation of a head base, a member for a playback running direction switching operation, and a member for selective operation to transfer driving force to a tape driving mechanism during fast forward. As a result, there are effects in that the one disk-like cam enables the cassette tape carry in/out operation, the head base moving operation, the playback running direction switching operation, and the selective operation to transfer the driving force to the tape driving mechanism during fast forward.

Alternatively, according to the present invention, a first groove for a cassette carry in/out operation, and a second groove for a playback running direction switching operation are provided in a first surface of a disk-like cam. Further, a third groove for a head base moving operation, and a fourth groove for a selective operation to transfer driving force to a tape driving mechanism during fast forward are provided in a second surface. As a result, there are effects in that the grooves in both sides of the one disk-like cam enable the cassette tape carry in/out operation, the head base moving operation, the playback running direction switching operation, and the selective operation to transfer the driving force to the tape driving mechanism during fast forward.

Alternatively, according to the present invention, in four operations including a cassette tape carry in/out operation, a head base moving operation, a playback running direction switching operation, and a selective operation to transfer driving force to a tape driving mechanism during fast forward, the operations are performed according to rotation of a disk-like cam from a starting point in the following order: a cassette tape take-in and cassette tape mounted to tape driving mechanism mode; a tape L direction fast forward mode; a tape R direction playback mode; a tape L direction playback mode; and a tape R direction fast forward mode. As a result, there are effects in that only one disk-like cam enables the cassette take-in and cassette tape mounted to tape driving mechanism mode operation, the tape L direction fast forward operation, the tape R direction playback operation, the tape L direction playback operation, and the tape R direction fast forward operation.

Alternatively, according to the present invention, there is a difference in a groove width between a first groove and a second groove provided in a first surface of a disk-like cam, or between a third groove and a fourth groove provided in a second surface. As a result, there is an effect in that pins can be prevented from erroneously engaging the grooves by different groove widths of the grooves provided in the one disk-like cam.

Alternatively, according to the present invention, a rib is provided for a groove other than first to fourth grooves provided in a disk-like cam. As a result, there is an effect in that grooves in the one disk-like cam can clearly be discriminated.

Alternatively, according to the present invention, when a disk-like cam is rotated by a predetermined angle, in four operations including a cassette tape carry in/out operation, a head base moving operation, a playback running direction switching operation, and a selective operation to transfer driving force to a tape driving mechanism during fast forward, no force is applied to each pin from members for performing at least three of the operations. Consequently, at a predetermined position of a groove, no force is applied to the disk-like cam from the members for performing at least three of the four operations. As a result, there is an effect of easier assembly.

Alternatively, according to the present invention, an overrun portion is provided at each end of first to fourth grooves in a disk-like cam to urge an elastic body used for a member for each operation after the operation. As a result, there is an effect in that the elastic body used for the member for each operation at each end of the first to fourth grooves in the disk-like cam can be urged by the overrun portion after the operation.

Alternatively, according to the present invention, a tape player includes a disk-like cam, a mode detecting switch to detect each mode of the disk-like cam, a mode detecting gear provided for the mode detecting switch to have the same number of teeth as that of teeth of the disk-like cam, and a transfer gear in which two gears having different diameters are coaxially disposed to engage both the disk-like cam and the mode detecting gear. Further, the two gears having the different diameters in the transfer gear have the same number of teeth, and crests of both the teeth have the same angle. As a result, there are effects in that a more compact structure can be provided by coaxially disposing the two gears having the different diameters in the transfer gear engaging both the one disk-like cam and the mode detecting gear, and smooth operation can be expected even if the disk-like cam or the mode detecting gear erroneously engages a wrong gear because the gears are identical in the number of teeth and in the angle of the crest.

Alternatively, according to the present invention, a tape player includes a slide plate moving according to movement of a pin engaging a first groove provided in a disk-like cam for a cassette carry in/out operation, and a detecting lever engaging the slide plate by movement of the slide plate during cassette carry in operation to press a switch for actuating a motor to carry in a cassette. Further, when the slide plate is moved to a predetermined position, engagement between the detecting lever and the second slide plate is released, and repulsion of the switch returns the detecting lever to an original position. As a result, there are effects in that a more compact apparatus can be provided by directly relating the movement of the slide plate to pressing of the switch, and information of the switch can be used even in other modes by returning the detecting lever by the repulsion of the switch at the predetermined position of the slide plate.

Alternatively, according to the present invention, when a cassette tape is mounted on a reel rest, a side surface of the cassette tape engages a detecting lever to press a switch. As a result, there is an effect in that a type of the cassette tape can be discriminated by using the detecting lever.

Alternatively, according to the present invention, a tape player includes a first slide plate having a pin engaging a first groove provided in a disk-like cam for a cassette carry in/out operation, and a second slide plate connected to the first slide plate through an elastic body to move in conjunction with movement of the first slide plate in the same direction as that of the movement so as to move a slider for holding a cassette tape in a direction opposed to the above direction. Since the moving distance of the second slide plate is shorter than that of the first slide plate, the second slide plate is urged by the elastic body at movement terminal end. As a result, there are effects in that a more compact apparatus can be provided by using one disk-like cam, and a stable operation can be realized by applying urging force between the mutual slide plates at the movement terminal end of the slide plate.

Alternatively, according to the present invention, a tape player includes a slide plate moving according to movement of a first pin engaging a first groove provided in a disk-like cam for a cassette carry in/out operation so as to move a slider for holding a cassette tape, a holder arm movably supporting the slider, and vertically moving the cassette tape in a holder by engaging a second pin with a guide hole provided in the slide plate so as to release the cassette tape from a reel rest or mount the cassette tape on the reel rest, and an elastic body whose annular portion is disposed on a convex portion extending from the slide plate, for engaging a first cut-raised portion provided for the slide plate such that one end extending from the annular portion is disposed on extension of the guide hole, and for engaging a second cut-raised portion such that the other end applies elastic force to the one end in a direction of the first cut-raised portion. When the slider is moved, the second pin engages the one end of the elastic body disposed on extension of the guide hole. As a result, there are effects in that a more compact apparatus can be provided by using the one disk-like cam, and elastic force can be applied to a part of an engaging portion between the slide plate and the holder arm.

Alternatively, according to the present invention, a tape player includes a reel pedestal rotated by transferring driving force, a friction member disposed on the reel pedestal, a slip gear contacting the friction member to transfer driving force to the reel pedestal through the friction member, an elastic body urging the slip gear in a direction to press the friction member, and a stopper adjustable pressing force of the elastic body on the friction member. Further, a mark indicating pressing force is put on the stopper. As a result, there is an effect in that operability can be improved by marking the stopper for assembly of the reel rest.

Alternatively, according to the present invention, a tape player includes a reel pedestal rotated by transferring driving force, a friction member disposed on the reel pedestal, and a slip gear contacting the friction member to transfer driving force to the reel pedestal through the friction member. Further, a taper portion is provided for the slip gear at a portion contacting the reel pedestal, and lubricant is applied to the taper portion. As a result, there are effects in that the lubricant can be applied after assembling the reel pedestal, the friction member, and the slip gear, and operability can be improved.

Alternatively, according to the present invention, a reel rest, a mode detecting switch, and a circuit to detect signals from the reel rest and the mode detecting switch are disposed on one base. As a result, there are effects in that a more compact apparatus can be provided, and operability can be improved by disposing the reel rest, the mode detecting switch, and the circuit to detect the signals from the reel rest and the mode detecting switch on the one base.

Alternatively, according to the present invention, a printed-like wired circuit is mounted on a board to provide a circuit to detect a signal, and when the board is mounted on a base, the printed-like wired circuit is removed from a periphery of a board mounting portion provided for the base. As a result, there are effects in that operability and reliability of an apparatus can be improved by removing the printed-like wired circuit from the periphery of the board mounting portion.

Alternatively, according to the present invention, a tape player includes a reel base on which a reel rest is disposed, and a main base on which the reel base is mounted. Further, a hole portion is provided in the main base to pass a cassette tape rewind portion of the reel rest positioned between the reel base and the main base therethrough, and a hollow portion is provided at a periphery of the hole portion in the main base to protect a gear portion for driving the reel rest. As a result, there are effects in that a more compact apparatus can be provided, and entrance of dust or the like into the reel rest can be further reduced by providing the hollow portion for the main base to protect the gear portion of the reel rest.

Alternatively, according to the present invention, a tape player includes a reel base having a printed-like wired circuit to transmit a signal from a reel rest or a mode detecting switch, a main base on which the reel base is mounted, and a belt disposed on a reel base mounting surface of the main base to transfer driving force to a flywheel. Further, a guide portion is provided for a part of the reel base so as not to contact a part of the printed-like wired circuit derived from the reel base in a direction of the main base with the belt. As a result, there is an effect in that reliability of an apparatus can be improved by providing the guide portion so as not to contact the printed-like wired circuit derived from the reel base to the main base with the belt for transferring the driving force to the flywheel.

Alternatively, according to the present invention, a switch is disposed on a guide portion to discriminate a cassette tape. As a result, there are effects in that a space can be more reduced, and a more compact apparatus can be provided by disposing the switch on the guide portion.

Alternatively, according to the present invention, a tape player includes a head base on which a head is mounted for recording and playback of a cassette tape, an elastic body disposed on the head base, and a lever having one end engaging a groove provided in a disk-like cam for moving the head base, and the other end engaging the head base directly or through the elastic body. When the cassette tape is carried in or carried out, the other end of the lever directly engages and presses the head base to urge the head base in a direction to move the head apart from the mounted cassette tape. When the tape is played back, the other end of the lever urges the head base through the elastic body in a direction to press onto the mounted cassette tape. As a result, there is an effect in that reliability of an apparatus can be improved by driving the head base through the elastic body, and continuously urging the head base by elastic force.

Alternatively, according to the present invention, when a cassette is carried in or carried out, the other end of a lever directly engages and presses a head base, and an elastic body concurrently engages the other end of the lever to press in a direction opposed to the pressing direction. As a result, there is an effect in that, when the cassette is carried in or carried out, the head base can be pressed by the other end of the lever directly engaging the head base, and the elastic body can concurrently be pressed in the direction opposed to the pressing direction by engaging the other end of the lever.

Alternatively, according to the present invention, in four operations including a cassette tape carry in/out operation, a head base moving operation, a playback running direction switching operation, and a selective operation to transfer driving force to a tape driving mechanism during fast forward, the operations are performed according to rotation of a disk-like cam from a starting point in the following order: a cassette tape take-in and cassette tape mounted to tape driving mechanism mode; a tape L direction fast forward mode; a tape R direction playback mode; a tape L direction playback mode; and a tape R direction fast forward mode. Further, a distance between a head and a tape in the tape L direction fast forward mode is longer than that between the head and the tape in the R direction fast forward mode. As a result, there are effects in that collision of the cassette tape with the head generated during loading can be avoided, and reliability of an apparatus can be improved by providing the longer distance between the head and the tape in the tape L direction fast forward mode than that between the head and the tape in the R direction fast forward mode.

Alternatively, according to the present invention, a thickness removed portion is provided for a lever having one end engaging a groove provided in a disk-like cam for a selective operation to transfer driving force to a tape driving mechanism for tape fast forward, and the other end including a gear idler which is engagable a flywheel. As a result, there are effects in that the lever can be protected from forced engagement between the flywheel and the gear idler, and reliability of an apparatus can be improved by providing the thickness removed portion for the lever having the one end engaging the groove in the disk-like cam and the other end including the gear idler engagable the flywheel.

Alternatively, according to the present invention, a tape player includes a cassette holder for holding a cassette tape, and a holder arm positioned to be coplanar with the cassette holder when a cassette is inserted into the cassette holder, for providing a predetermined angle at a connecting portion of the holder arm and the cassette holder when the cassette tape is moved to a position to be mounted on a tape driving mechanism. Further, an elastic member urges in a direction in which the holder arm and the cassette holder are coplanar with each other. As a result, there are effects in that the cassette tape can be prevented from being removed before mounting the cassette tape onto the tape driving apparatus, and reliability of an apparatus can be improved by the elastic member urging in the direction in which the holder arm and the cassette holder are coplanar with each other.

What is claimed is:

1. A tape player comprising:
   a first slide plate sliding under guidance from a movable pin engaging a first groove provided in a disk-shaped cam for a cassette tape carry in/out operation;
   a second slide plate resiliently connected to the first slide plate through an elastic body to follow the sliding of the first slide plate;

a slider for holding a cassette tape, said slider movable in an opposite direction to the sliding;

a detecting lever detecting an engaged position of the second slide plate with respect to the detecting lever for a cassette tape carry-in operation; and a switch for actuating a motor, the detecting lever adapted to activate the switch to carry in the cassette tape in response to the detection of the engaged position of the slide plate, wherein when both the first and second slide plates are moved to predetermined positions the detecting lever is biased to return from the engaged position to an original position apart from the second slide plate.

2. A tape player according to claim 1, wherein when the cassette tape is mounted on a reel rest, a side surface of the cassette tape engages the detecting lever to press the switch.

3. A tape player, comprising:

a rotatable cam;

at least one slidable plate interacting with the rotatable cam and capable of performing a sliding movement controlled by a relative rotational position of the rotatable cam with respect to at least one of the at least one slidable plate;

a detecting lever detecting a defined rotational position of the rotatable cam associated with a cassette tape carry-in operation;

a motor for carrying in a cassette tape; and a switch for actuating the motor in response to the detection of the defined rotational position;

wherein at least one of the at least one slidable plate has a notch for engaging the detecting lever for the defined rotational position.

4. The tape player according to claim 3, wherein the detecting lever detects a proximate orientation of at least one of the at least one slidable plate with respect to the detecting lever as an indication of the defined rotational position.

5. The tape player according to claim 3, wherein the at least one slidable plate is coupled by a resilient member to slide together.

6. The tape player according to claim 3, wherein the switch is biased against an engagement of the detecting lever and the slidable plate to promote releasing of the engagement at another defined rotational position of the cam.

* * * * *

UNITED STATES PATENT AND TRADEMARK OFFICE
CERTIFICATE OF CORRECTION

PATENT NO.   : 6,185,064 B1
DATED        : February 6, 2001
INVENTOR(S)  : Nakanishi et al.

It is certified that error appears in the above-identified patent and that said Letters Patent is hereby corrected as shown below:

Title page,
Item [62] is amended to read as follows:
-- Division of Application No. 08/808,313, filed on February 28, 1997, which is a continuation of Application No. 08/313,119, filed on October 13, 1994, which is the national phase of PCT International Application No. PCT/JP94/00312 filed on February 25, 1994. --

Signed and Sealed this

Twenty-third Day of April, 2002

Attest:

JAMES E. ROGAN
*Director of the United States Patent and Trademark Office*

*Attesting Officer*